(12) United States Patent
Bailey

(10) Patent No.: US 8,869,986 B2
(45) Date of Patent: Oct. 28, 2014

(54) SCREENING METHODS AND APPARATUS

(76) Inventor: Marshall G. Bailey, Dubai (AE)

( * ) Notice: Subject to any disclaimer, the term of this patent is extended or adjusted under 35 U.S.C. 154(b) by 46 days.

(21) Appl. No.: 13/456,663

(22) Filed: Apr. 26, 2012

(65) Prior Publication Data

US 2012/0267287 A1 Oct. 25, 2012

Related U.S. Application Data

(63) Continuation-in-part of application No. 13/224,889, filed on Sep. 2, 2011, which is a continuation-in-part of application No. PCT/GB2011/000960, filed on Jun. 24, 2011.

(30) Foreign Application Priority Data

Jun. 25, 2010 (GB) .................................. 1010731.6

(51) Int. Cl.
| | | |
|---|---|---|
| B03B 9/00 | (2006.01) | |
| B07B 1/28 | (2006.01) | |
| B07B 13/16 | (2006.01) | |
| B07B 1/46 | (2006.01) | |
| B01D 21/26 | (2006.01) | |

(52) U.S. Cl.
CPC .............. *B07B 1/4609* (2013.01); *B01D 21/267* (2013.01); *B07B 13/16* (2013.01); *B07B 2230/01* (2013.01); *B01D 21/262* (2013.01)
USPC ............. 209/10; 209/233; 209/235; 209/311; 209/315

(58) Field of Classification Search
USPC .......... 209/233, 235, 250, 268, 269, 273, 275
See application file for complete search history.

(56) References Cited

U.S. PATENT DOCUMENTS

| 2,576,283 | A | | 11/1951 | Chaney | |
|---|---|---|---|---|---|
| RE25,774 | E | | 5/1965 | Hukki | |
| 3,376,976 | A | | 4/1968 | Wallen | |
| 4,446,022 | A | * | 5/1984 | Harry | ............................ 210/388 |
| 4,459,207 | A | | 7/1984 | Young | |
| 4,809,791 | A | | 3/1989 | Hayatdavoudi | |
| 6,170,580 | B1 | * | 1/2001 | Reddoch | ........................ 175/66 |
| 6,244,362 | B1 | | 6/2001 | Williams | |
| 7,703,612 | B2 | * | 4/2010 | Browne et al. | ................ 209/311 |
| 8,113,356 | B2 | * | 2/2012 | Burnett | ......................... 209/315 |

(Continued)

FOREIGN PATENT DOCUMENTS

| DE | 4210770 A1 | 10/1993 |
|---|---|---|
| EP | 1647336 A1 | 4/2006 |

(Continued)

*Primary Examiner* — Terrell Matthews
(74) *Attorney, Agent, or Firm* — Gifford, Krass, Sprinkle, Anderson & Citkowski, P.C.

(57) ABSTRACT

An apparatus (25) for use in screening a liquid and solids mixture feed (2) comprises a conduit (18), including a screening portion (22) that is formed and arranged to divide a liquid and solids mixture feed flowing through the conduit. The feed (2) is divided into a first, cleaned stream (C1) comprising liquid and solid particles of below a selected size limit, and a second, concentrated, stream (24) comprising liquid, and particles above the selected size limit. The apparatus (25) may be a stand alone module, part of a system with other solids and liquids separating equipment or an integral part of a solids and liquid separator such as a shale shaker. Methods of using the apparatus (25) are also described.

18 Claims, 33 Drawing Sheets

(56) References Cited

U.S. PATENT DOCUMENTS

| | | |
|---|---|---|
| 8,556,083 B2 * | 10/2013 | Burnett .................. 209/315 |
| 2004/0206673 A1 | 10/2004 | Peresan |
| 2006/0113220 A1 | 6/2006 | Scott et al. |
| 2007/0131592 A1 * | 6/2007 | Browne et al. ............ 209/399 |
| 2008/0251428 A1 | 10/2008 | Bailey |
| 2010/0089652 A1 | 4/2010 | Burnett |

FOREIGN PATENT DOCUMENTS

| | | |
|---|---|---|
| FR | 1264698 A | 6/1961 |
| FR | 2164609 A1 | 8/1973 |
| GB | 1399938 A | 7/1975 |
| WO | 2003/013690 A1 | 2/2003 |
| WO | 2004/110589 A1 | 12/2004 |

* cited by examiner

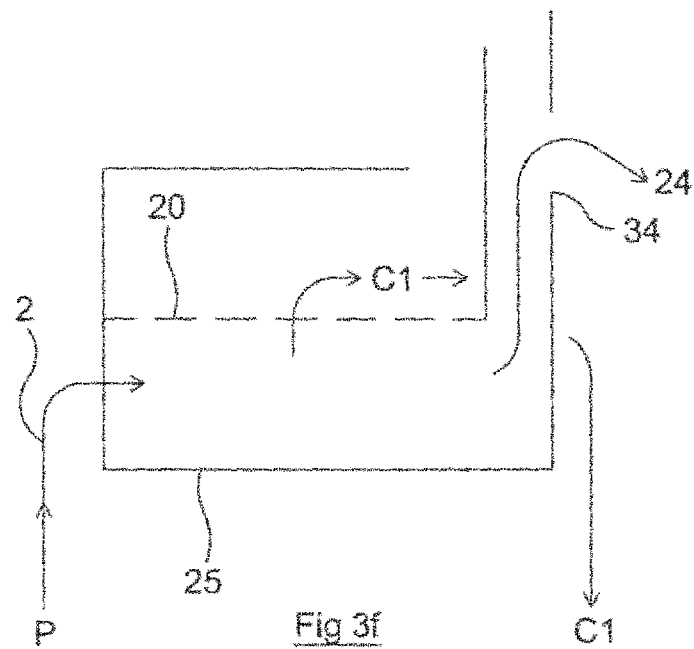
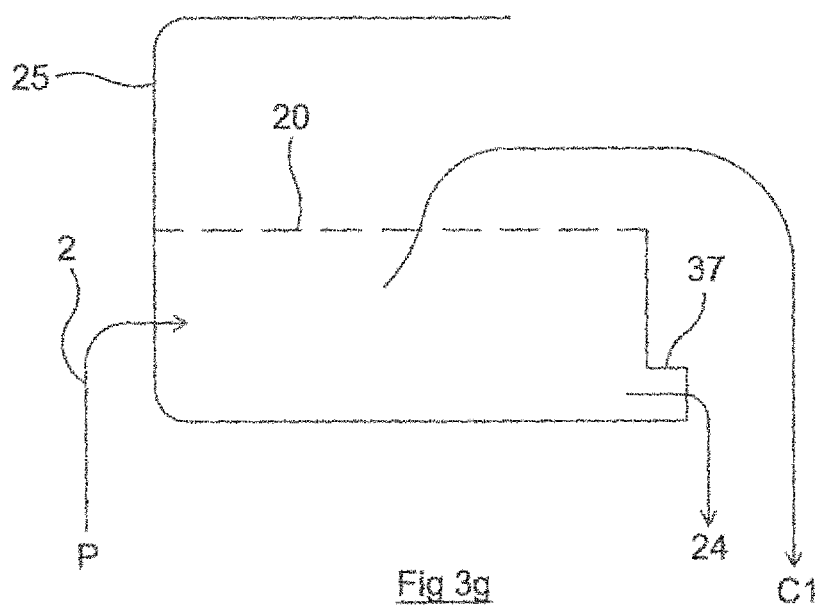

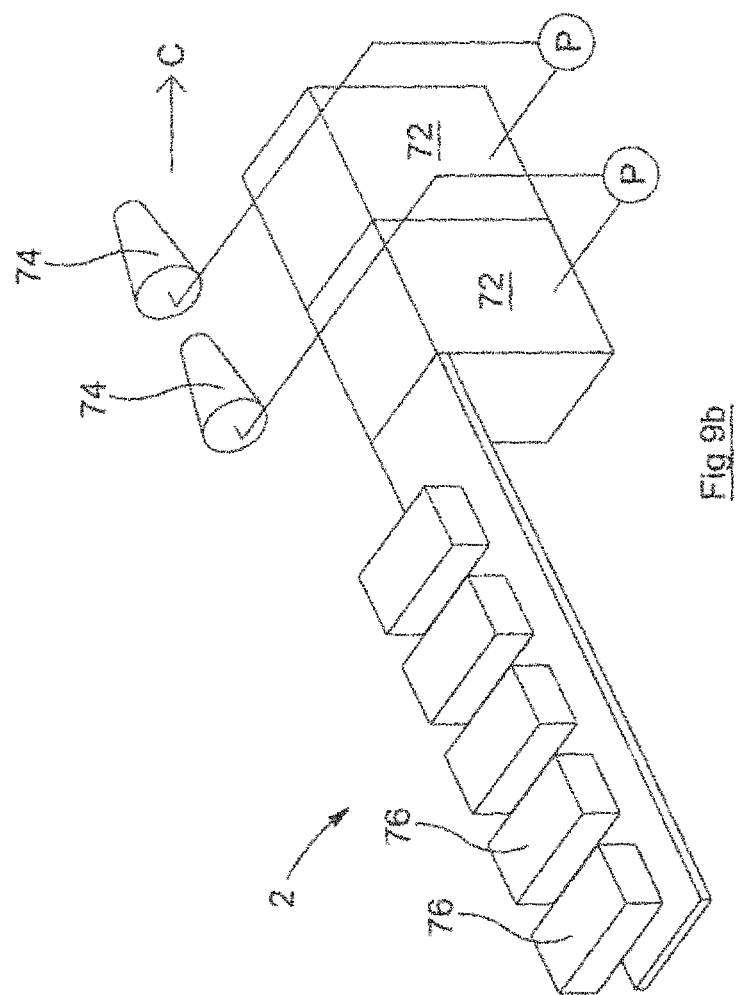

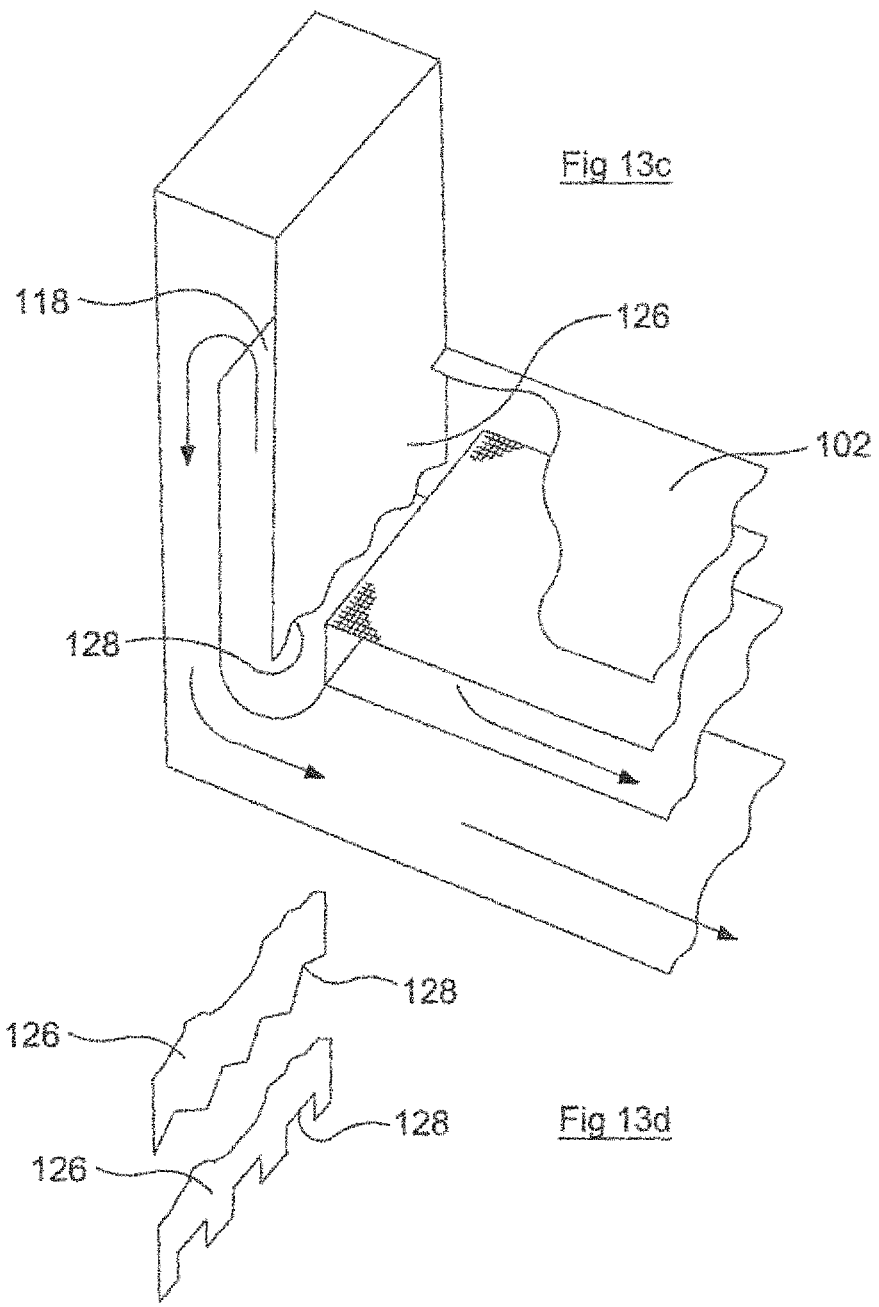

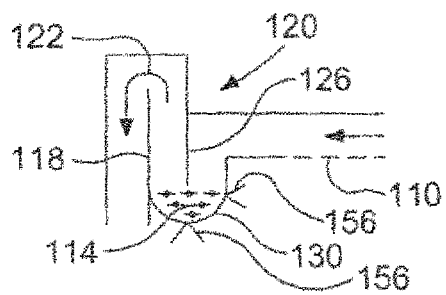
Fig 17a
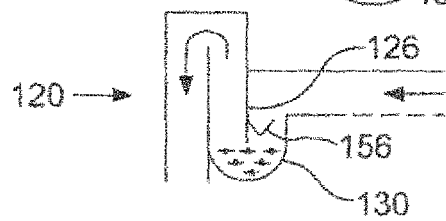
Fig 17b
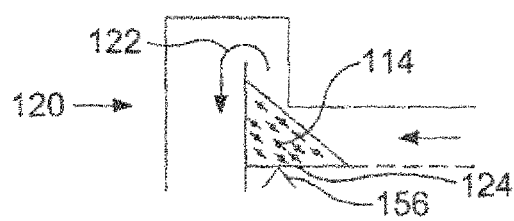
Fig 17c
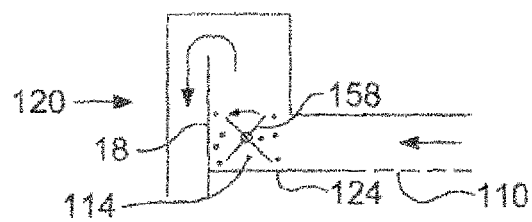
Fig 17d
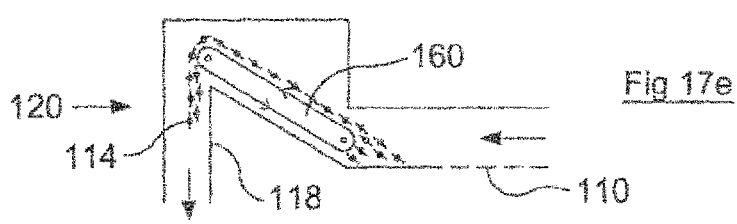
Fig 17e
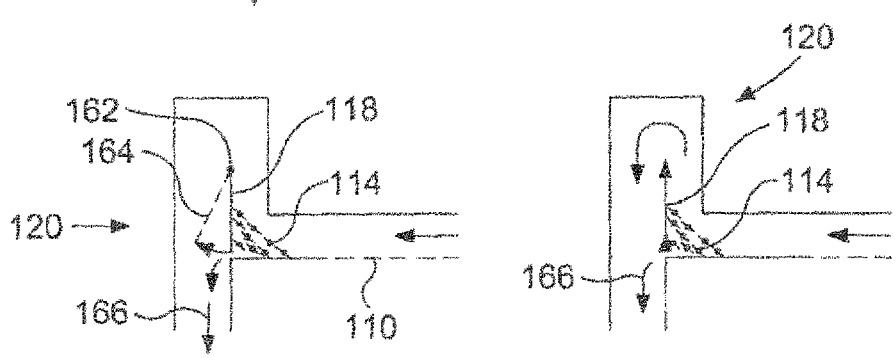
Fig 17f
Fig 17g

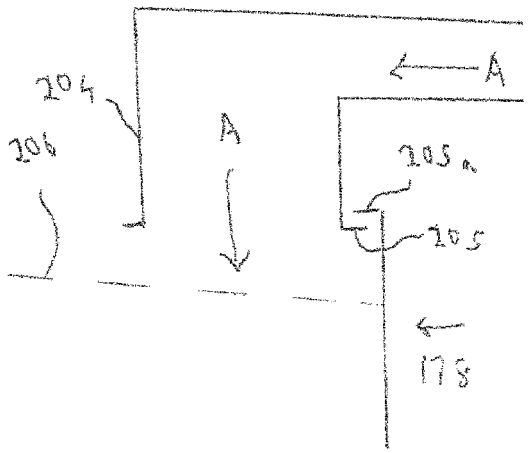
Fig 19d
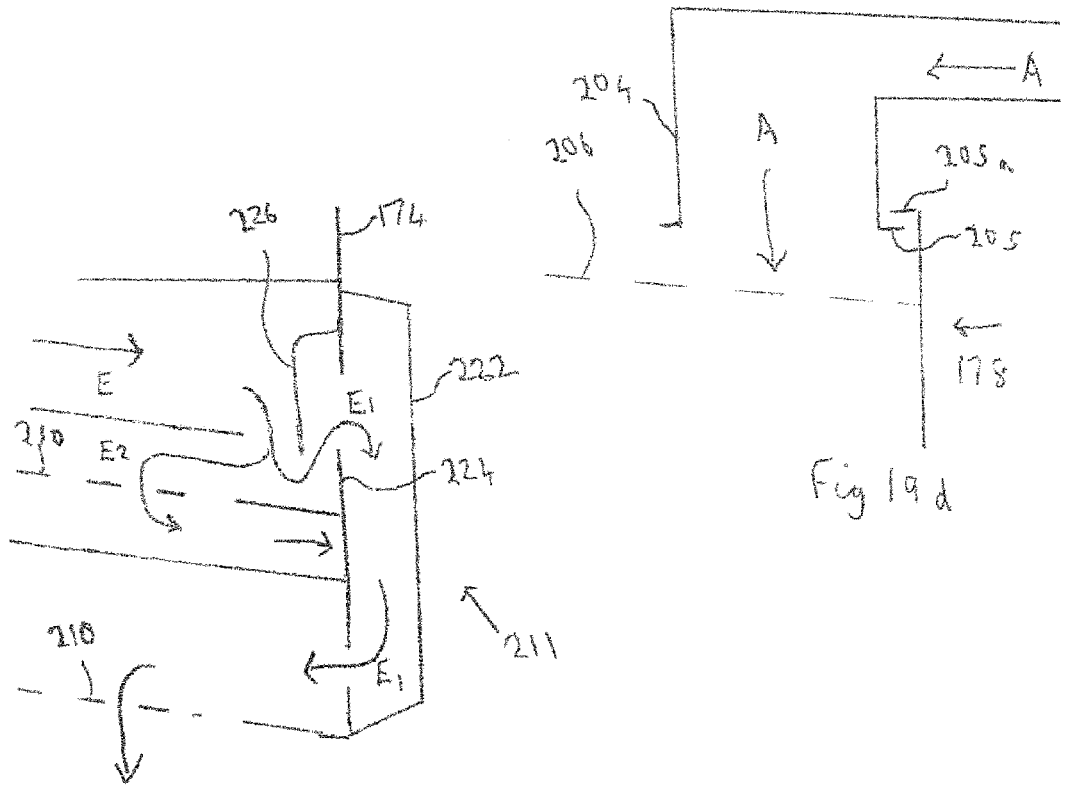
Fig 19a
Fig 19b
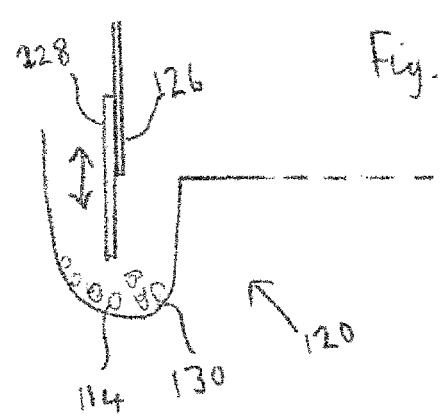
Fig 19c
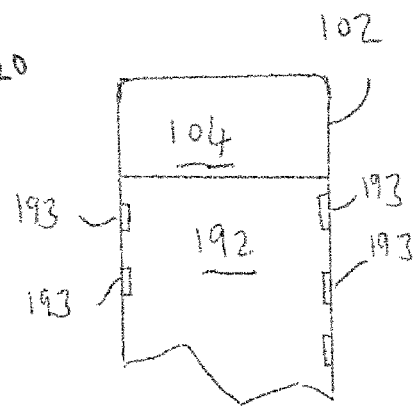

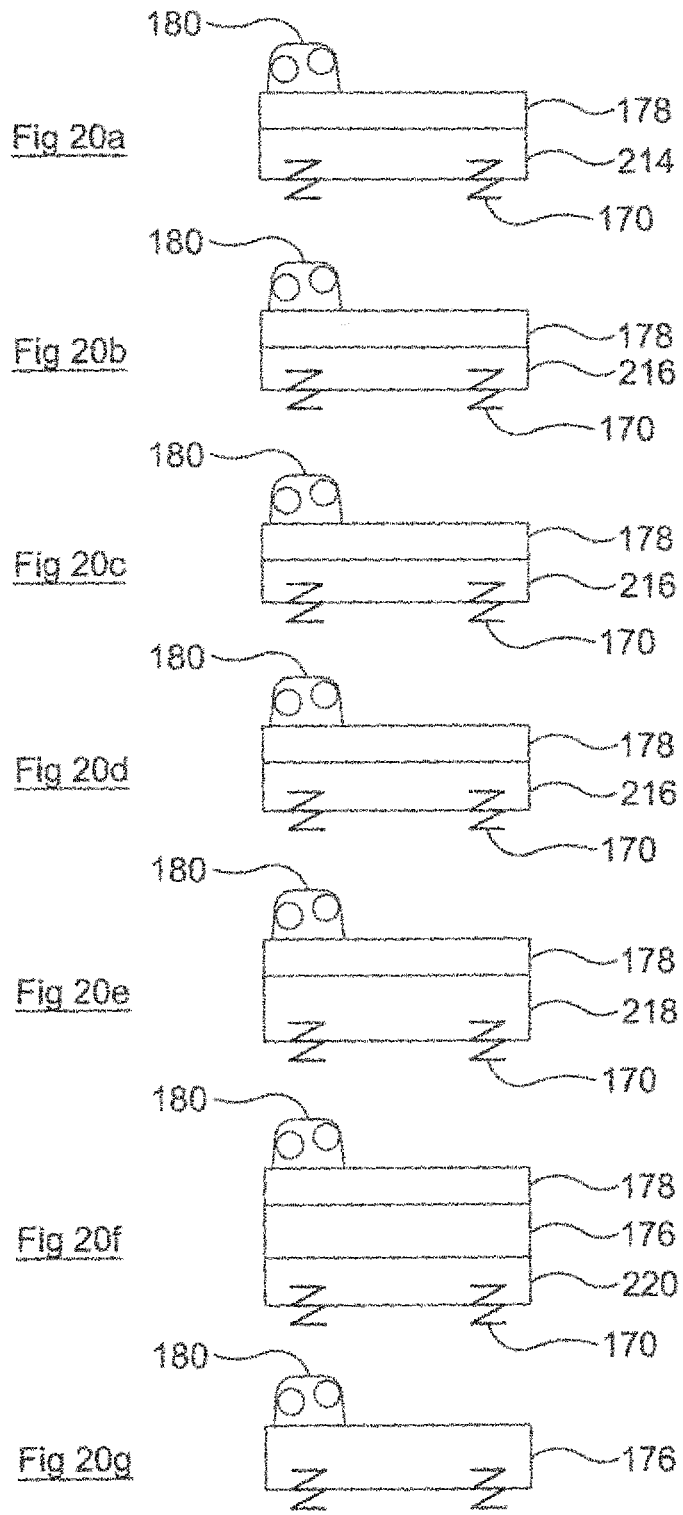

SCREENING METHODS AND APPARATUS

CROSS-REFERENCE TO RELATED APPLICATIONS

This application is a continuation-in-part of U.S. application Ser. No. 13/224,889 filed Sep. 2, 2011, which is a continuation-in-part of International Application No. PCT/GB2011/000960 filed. Jun. 24, 2011, which claims priority of United Kingdom Application No. 1010731.6 filed Jun. 25, 2010.

FIELD OF THE INVENTION

The invention relates to methods used for the separation of drilled solids generated during the process of drilling an oil well, from drilling mud. It is also applicable in wider applications such as mineral processing, dewatering, processing of waste fluid streams, quarrying, pharmaceuticals and food processing. Apparatus for use in the methods is also provided.

BACKGROUND TO THE INVENTION

Screening is used to separate solids according to particle size and or to separate solids from fluids. The solids to be screened may be dry or wet and may often be screened from a flowable solids and liquids mixture (slurry). The process is used in many industries including: mineral and metallurgical processing, quarrying, pharmaceuticals, food and the drilling of oil, water and gas wells. The design of screening equipment varies widely but will generally be of one of two types, either static or moving.

Static screens en include course screens and sieve bends. These are normally mounted at an angle such that solids on the screen roll over it by gravity and in so doing either pass through the screen or roll off it. Static screens are typically used to screen down to 5 mm. Sieve bends may be used to screen finer sizes.

Moving screens are generally described according to the motion of the screen. Types will typically include: revolving rotary screens, shaking screens, gyratory screens, linear screens and high frequency vibratory screens. Moving screen arrangements normally have two elements, the screen panel and the screening machine.

Screen panels will generally be mounted in the screening machine in such a manner that they may be removed and replaced either when worn or damaged or when, a change in separation size is required. Screen panels may be constructed of widely differing materials, including but not limited to, woven wire mesh, wedge wire, moulded plastics, synthetic woven fabrics and drilled plates of either plastic or meta. Screen panels are made with different hole sizes to provide separation at different sizes.

The function of the screen panel is:
To retain solids above screen aperture size on the panel.
To transmit the motion generated within the screening machine to the solids and liquid, such that the fluid passes through the screen and the solids retained on the screen are transported on the screen to a point of discharge from the screen.
To allow fluid and solids under screen aperture size to pass through the screen.
To ideally offer resistance to blinding and plugging of the screen apertures from solids that are of similar size to the screen aperture size.

The screening machine design will vary widely according to the movement that it is required to impart to the screen, panel, the number of screen panels, the method of feeding the panels, the process application, working environment and process capacity required. The screening machine motion will normally be arranged to impart energy to the screen panel such that:
Solids under screen aperture size are moved in such a manner that encourages them to pass through the screen. These solids are termed 'undersize'
Solids that are larger than the screen aperture and as such cannot pass through the screen are retained by the screen and transported off the screen. These solids are generally termed 'oversize'. Any fluid discharged from the screen with the oversize solids is generally termed 'screen overflow'.
Fluids carrying solids are encouraged to pass through the screen. Fluid passing through the screen is generally termed 'screen underflow'.

Moving screens are used for the screening of either dry or wet solids and or the screening of solids from fluids. Dry screening will typically be used for separation of dry solids down to 1 mm diameter. For sizes lower than 1 mm, wet screening will normally be used. This method eliminates dust. Wet screening will normally be the screening of solids from a flowable slurry, being a mixture of solids and a fluid (liquid).

Where a slurry is screened to remove the majority of the fluid from the solids, without any specific need to size the solids, the function of the screen is generally termed 'dewatering'. This term is applied to the function of the machine and will apply to slurries that are made with water or any other liquid as the fluid.

Where slurry is screened to achieve a specific size split the function of the screen is termed 'classification'.

In addition to screening equipment making use of screen panels as described above, other types of solids/liquids separators can be used, for example centrifuges such as decanting centrifuges, to separate a solids/liquids mixture.

Whilst screening machines, especially vibratory screening machines such as the so called 'shale shakers' of the oil well drilling industry are used with success in methods of solids/liquids separation, especially classification, there is a need to improve throughput and effectiveness. This is especially the case where available space is severely limited, for example on offshore oil rigs, and the option of increasing equipment size or the numbers of machines employed may not be available.

During the drilling of an oil well, fluid known as mud is circulated, under pressure, inside the drilling assembly to the drill bit. One of the functions of the drilling mud is to carry the rock cuttings generated during the drilling process at the drill bit, out of the borehole.

The constitution of drilling mud varies according to the mud type. Generally the mud will contain a fluid phase and a solids phase. The solids phase may include a weighting agent such as Barite that is added to the fluid to control the density of the mud. Other weighting agents can be employed. Generally weighting agents are made of materials that are of high specific gravity, typically within the range of 3.2 to 4.4 SG. The weighting agent will normally be an inert material that will have minimum impact on the viscosity and fluid properties of the drilling fluid when added in various concentrations. The size of the weighting agent particles will normally be below 74 microns with the majority of the particles being under 40 microns diameter. As the weighting agent is added to the drilling mud to control the density of the drilling mud during use, it is generally desirable that the weighting agent is not removed from the mud system but retained within it. Other desirable solids can be incorporated into the mud system such as 'Bridging' and 'Lost Circulation Material'. These solids will generally be of within a desirable size range such that they perform the function for which they are designed.

When the drilling mud arrives at the drilling rig the solids fraction of the mud will contain desirable solids and drilled, solids. The drilled solids are generally undesirable solids comprised predominantly of rock but can contain metal fragments. The drilled solids are undesirable as these are generally rock cuttings that if allowed to accumulate at increased concentrations result in undesirable effects on the fluid properties of the mud. As the concentrations of drilled solids in a mud increases the fluid properties are affected until the mud becomes unusable and requires replacement or the addition of new mud to dilute the concentration of drilled solids such that the desired fluid properties are restored. The removal and control of the concentrations of drilled solids is generally regarded as a most important activity in contributing to the successful, safe and economic drilling of an oil well, within the planned time and cost.

The process of removal of drilled solids must remove drilled solids while leaving desirable solids such as weighting material within the fluid. Drilled solids are conventionally removed from the mud using first shale shakers to screen the fluid. Rock cuttings above screen size are removed during screening and the fluid passes into storage tanks for subsequent mechanical and chemical processing, where this is desirable, and ultimate recirculation to the oil well. After screening at the shale shaker additional solids separation techniques can be applied to remove any drilled solids that have passed through the shale shaker, being smaller than the screen size fitted to the shale shaker.

These techniques conventionally include the use of hydrocyclones of various sizes and centrifuges. A large diameter hydrocyclone is conventionally termed a Desander and smaller diameter hydrocyclones is conventionally termed, a Desilter. The terms Sand and Silt used in the context above are geological terms referring to the size of the particle concerned. Sand in generally above 74 microns diameter and silt can range down to a few microns in diameter. Centrifuges can be of varying types and configuration, decanting centrifuges are typically employed to separate fine drilled solids. A combination of decanting centrifuges can be used to recover weighting agents and remove drilled solids.

Solids control equipment typically removes solids within the following size ranges:

| | |
|---|---|
| Conventional Shale shakers | Solids above 74 microns. |
| High efficiency Shale Shakers | Solids above 40 microns. |
| Desanders | Solids between 1000 and 74 microns. |
| Desilters | Solids between 74 and 10 microns. |
| Decanting centrifuges | Solids between 200 and 5 microns. |

When choosing the type of equipment to be employed to remove and control the concentration of drilled solid in the mud the following are generally accepted desirable criteria:
The process should be as simple as possible.
Drilled solids should be removed at the earliest possible opportunity when they are at their largest size.
Pumping, recirculation to the oil well and aggressive handling that results in the fracture of the drilled solid into smaller particles must be avoided, as small solids are significantly more difficult to remove from the mud than large solids.
Drilled solids should not be allowed to be recirculated to the oil well as during recirculation they will be broken down and become increasingly difficult to remove.
The minimum equipment necessary to achieve the function should be employed.
Equipment should be easy to operate for the operators thereof.
The installed system should ideally be of low weight, size and power consumption.
The system should offer high efficiency of separation.
The system should be reliable.
The efficiency of drilled solids removal should be easily measured.

Desanders, desilters and centrifuges suffer from the following undesirable features:
A feed tank containing feed mud is required this is generally large and heavy,
A feed pump is required resulting in high power requirements, maintenance, weight and space.
During pumping of the drilled solid it is normally fractured and reduced in size making it significantly more difficult to remove from the mud.
Basis of separation is by the mass of the cutting not size. Desirable solids such as weighting material are of high specific gravity. Drilled solids are generally of lower specific gravity material within the range of 2.8-2.2 sg. The mass of a weighting agent particle can be similar to the mass of a much larger drilled solid, resulting in the hydrocyclone separating both desirable weighting material and undesirable drilled solids of similar mass. It will be noted that this problem does not occur with screening as the screen separates by size.
Separation efficiency is variable as fluid properties vary.
Separation efficiency is difficult to measure.
Decanting centrifuges capital cost and maintenance cost are high.

Shale shakers are conventionally employed in preference to other equipment due to the following characteristics
No feed tank required.
Equipment is simple for the operator to understand and easy to operate and maintain.
Installed space and weight and typically low.
Power consumption is low.
Basis of separation is size.
Separation efficiency is easily determined being directly relative to the mesh size fitted.
Separation efficiency is not variable with fluid properties provided the fluid passes through the mesh size fitted.

The drilling mud returning to the drilling rig from a well normally contains a low concentration of drilled solids within a large volume of fluid. The drilled solids removal system is thus required to process a large volume of fluid to remove a small volume of drilled solids. Consequently the size of a drilled solids removal system has historically been directly relative to the volume of fluid to be processed and NOT the volume of solids to be removed. The oil industry has previous employed hydrocyclone and screen (e.g. in shale shakers) combinations to concentrate the volume of solids into a smaller volume of fluid. One such typical apparatus is called a mud cleaner. Mud cleaners typically employ hydrocyclone assemblies mounted above a shale shaker or shakers. Mud is pumped to the hydrocyclone, where the mud is split into two streams, the hydrocyclone overflow, comprising cleaned fluid and the hydrocyclone underflow containing fluid and drilled solids that is passed to the shaker for removal of oversize solids. Analysis of the performance of the mud cleaner has demonstrated that low solids removal efficiencies resulted due to the following:

Drilled solids were fractured into smaller particles during pumping to the hydrocyclone resulting in them becoming increasingly difficult to separate.

Separation efficiency was highly variable, dependant on mud fluid properties.

The hydrocylone was easily overloaded with solids. When overloaded drilled solids were returned to the mud system in the cone overflow thus bypassing the separation system.

Monitoring the separation efficiency of the hydrocyclone was difficult and complex.

The analysis also demonstrated that the efficiency of separation achieved by the fine screen element of the mud cleaner was consistently high, determinable and easy to monitor in the field. Historically this analysis led the industry away from hydrocyclone/screen combinations and towards the development of higher capacity shale shakers such as the AX1 Shale Shaker manufactured by Axiom Process Limited.

One or more shale shakers are used depending upon the volume of fluid being pumped and the separation efficiency required. Generally as finer screens are fitted to the shale shaker the process capacity of the shaker decreases while the efficiency of separation of solids increases. Typically screening will take place using screens, generally made of woven wire mesh, of between 10 and 400 mesh. These screens will contain between 10 and 400 wires per inch respectively and aperture hole size will vary according to the weave pattern and diameter of the wire used in the weave.

To achieve the required process capacity and separation efficiency a drilling rig shale shaker installation will typically contain between one and eight shale shakers although some installations can employ more machines. Machines will be employed to work in parallel where the fluid from the oil well is split into multiple streams and processed by an equal number of machines. Installations of shale shakers can thus be appreciable in size.

Alternatively an installation can contain multiple machines working sequentially (in series) each separating at a progressively finer size. Alternatively an installation can contain a combination of machines working in parallel and series.

The need to design a vibratory screening machine to provide the required fluid throughput while transporting solids to the point of discharge from the screen has resulted in conventional machines being of a larger size or in greater numbers than is ideal where space and weight are restricted by either physical or economic factors.

An object of the current invention is to provide methods and apparatus that can significantly increase the processing capacity of a screening system allowing the size of the system to be significantly reduced, relative to a conventional approach, for a given process capacity.

The invention herein relates to a method and equipment for improving the volumetric capacity of wet screening equipment. Typically the equipment will be used for performing a classification function and typically the solids particle size range will be of the order of between 10 mm and 10 microns. However the methods and apparatus may be used for other solids/liquids separations, with particle sizes out with that range.

Improvements to the versatility and throughput of vibratory screening machines are described in WO/2004/110589 (PCT/GB2004/002544—Axiom Process Limited) wherein vibratory screening machines including a stack of screen, assemblies mounted in a vibrating basket for solids/liquid separation are described. The improved machines include a flow distributor arrangement that can allow parallel processing through two screens mounted in a stack thereby increasing throughput. The flow distributor can allow both parallel and series processing and thereby increases the scope of possible operations of a given size of machine. Typically such machines are employed for separating out solids from a solids and liquid feed (used drilling mud) to allow recycling of a cleaned fluid stream, disposal of unwanted solids and in some cases recovery of solids of a selected size range for reuse.

The full contents of WO/2004/110589 are incorporated herein by reference.

Despite the improvements described above there is still a need to further improve apparatus and methods for screening solids and liquids mixtures, especially but not exclusively in drilling operations, for example in offshore environments where space is at a premium and the drive to drill under ever more varied and demanding conditions benefits by the provision, of space efficient, versatile and robust equipment.

DESCRIPTION OF THE INVENTION

According to a first aspect the present invention provides a method of screening a liquid and solids mixture feed, suitable for use in recycling drilling mud, the method comprising:

dividing the feed, by screening, into a first, cleaned stream comprising liquid and solids of below a selected particle size and a second, concentrated, stream comprising liquid and solids above a selected particle size; and directing the second stream to an apparatus for further processing.

The further processing may include separating at least some of the solids from the liquid in the second stream.

The apparatus for further processing may be a screening apparatus such as a vibratory screening machine (e.g. a shale shaker) for example. The shale shaker may separate solids of a selected size from the second stream. Alternatively the second stream may be further divided, for example by a hydrocyclone into further streams with different loads of solids in each. Other options are discussed hereafter.

The division of the feed into the two streams may be accomplished by use of a suitable screen for example a screen of a woven wire mesh, wedge wire, moulded plastics, synthetic woven fabrics or drilled plates of either plastic or metal. The apertures in screening plates may be produced by laser or chemical etching processes or some other suitable method. The screen may be mounted in a suitable screening machine. Both of the two streams are flowable; the first stream can flow or be pumped to a holding tank, or to a further processing step or be recycled directly and reused. The second stream can flow or be pumped to the screening or other solids liquid separation apparatus. The second stream is concentrated in the sense that the amount of solid particles above the selected size has been increased relative to the liquid volume. The first stream removes liquid (and undersize solids) from the stream that is then further processed in the screening or other solids liquid separation apparatus.

The feed may be subject to a pre-treatment before being divided, for example it may be passed through a screen, typically a coarse mesh screen (a "scalping screen") to remove large particles.

Screening apparatus employed to process the second stream may be of any suitable type for the solids/liquid separation intended, for example a centrifuge, such as a decanting centrifuge or a vibratory screening machine (a shale shaker). A combination of different screening apparatus may be employed, for example high efficiency shale shakers followed by centrifuges. In this context the processing of the second stream may include any chosen method or combination of methods of processing that may alter the solids content (in terms of concentration of solids or classification by particle size or particle density). Thus the processing methods may include use of apparatus such as hydrocyclones to further divide the second stream. For example the second stream may be divided into e.g. a third stream containing higher mass particles and a fourth stream containing lower mass particles.

The design of the High Capacity Shale Shaker mentioned above in the Background to the Invention is limited by the need to separate fluid and solids while providing a mechanism for the solids to be discharged from the shale shaker screen, in the application of the current invention separation is achieved in stages. The first stage does not require separation of solids from liquid as it uses screening to separate the fluid into two streams, the first stream being the majority of the fluid volume and solids under screen size, and the second stream being the minority of the fluid volume within which is concentrated the majority of solids above screen size. After processing by the invention the first fluid stream is typically directed to a storage system, (for example the mud storage system when dealing with used drilling mud) for recirculation and the second fluid stream is directed to high efficiency shale shakers, or other liquid solids separation equipment, where fluid and drilled solids are separated.

The advantages of the method of the invention may be summarised as follows:

The use of screening allows all of the advantages of screening separation to be used eliminating the disadvantages or hydrocyclone and centrifuges.

Separation efficiency is easily determined on site, without complex analysis as it is based on size not mass.

The equipment is simple to build, operate, monitor and understand.

The elimination of the need to separate solids and liquids in the first stage allows screening techniques to be employed in the invention that result in previously unobtainable fluid throughputs from any given screen (typically a mesh) area resulting in a significant reduction in machine size.

The size, weight, power requirement and cost of the downstream shale shaker installation (or other screening system, processing equipment or combination of processing equipment) can be reduced.

The process is simple and easy to understand, monitor and operate.

As the process capacity of the invention is significantly higher than conventional screens and the load on downstream shale shakers is reduced the efficiency of solids removal can be increased by the use of finer screens Conveniently the division of the feed into the two streams is carried out as the feed flows along a conduit fitted with a screening portion.

Thus according to a second aspect the present invention provides a method of screening a liquid and solids mixture feed, the method comprising:

providing a conduit, including a screening portion and, formed and arranged to divide the feed flowing through the conduit into a first cleaned stream comprising liquid and solid particles, of below a selected size, and a second, concentrated, stream comprising liquid and particles above the selected size; and passing a liquid and solids mixture feed through the conduit.

The method may include directing the second, concentrated stream to a screening apparatus (or more than one of the same or different types) for subsequent treatment where solids are separated from the liquid of the second stream (or are otherwise further processed using suitable equipment) as described in respect of the first aspect of the invention. However if a solids/liquid separation is not required the conduit may be used simply to concentrate a liquid and solids feed. As a yet further alternative the solids and liquids mixture feed may already have been processed before it is passed through the conduit. For example larger particles may have bee removed by a scalping screen or the feed may have been processed through one or more of a vibratory screening machine (e.g. a shale shaker), centrifuges, hydrocyclones such as desanders, desilters or the like.

A significant advantage provided by the method is that a screening operation is carried out without a requirement for solids handling. The screening operation using the conduit produces two fluid (i.e. flowable) streams of a liquid and solids mixture, by appropriate choice of equipment for a given task.

Avoiding concentrating the oversize solids to the point where they are a solid or semi-solid mass has notable advantages.

The flowable streams can be readily conveyed (e.g. along a pipe by pumping and/or gravity) to their destination for further processing, storage or use. Handling isolated solids, (especially isolated wet solids that are often cohesive i.e. sticky) as occurs with other screening methods requires more complex equipment. By making use of the method of the invention a substantive screening process can be carried out producing two flowable streams. Even if one or even both of the streams produced is to be subject to a further processing including a solids isolating step, the work required on a given stream is reduced in terms of volume of fluid and/or amount of solids to be handled.

It will be appreciated that either of the two streams produced may be of higher value or greater use than the other, depending on the application and the reason for the screening process being carried out. Thus the term 'cleaned' when referring to the first stream as used herein simply denotes the removal of larger sized particles, by the use of the screening portion of the conduit, from the original feed.

Thus the present invention provides an apparatus for use in screening a liquid and solids mixture feed, the apparatus comprising:

a conduit, including a screening portion and formed and arranged to divide a liquid and solids mixture feed flowing through the conduit into a first, cleaned stream comprising liquid and solid particles of below a selected size limit, and a second, concentrated, stream comprising liquid, and particles above the selected size limit.

The apparatus may be used in the methods according to the first or second aspects of the invention. The liquid and solids mixture feed may be a drilling mud composition, in particular a used drilling mud composition comprising drill cuttings.

The conduit may be firmed and arranged to direct the second, concentrated stream to a screening apparatus, or other processing equipment, for subsequent treatment.

Advantages of the apparatus include:

The apparatus may be used as a stand alone module or as an integral part of a screening machine; and The apparatus can be used in combination with existing shaker installations allowing upgrade of existing installations at low cost.

The apparatus may be used ahead of equipment other than shale shakers, such as centrifuges, for example decanting centrifuges. In this application the apparatus will reduce the fluid load on such equipment allowing performance to be improved and or less equipment used.

As an alternative the apparatus may be used after conventional equipment. For example to provide fine screening of a used drilling mud after drill cuttings and larger particles have been removed by shale shakers and/or other processing equipment.

Typically when used ahead of other separating equipment the subsequent processing will involve separating solids from the second stream solids and liquid mixture, for example by use of a vibratory screening machine, a centrifuge or other solids/liquid separations device. The methods described herein have the advantage of reducing the volume of mixture feed that has to be processed by relatively complex, expensive and often bulky screening equipment. The proportion of solids relative to liquid present in the second stream is increased. Thus the equipment that separates the solids from the liquid may be reduced in size for a given volume of feed to be processed.

Screening by the conduit can therefore reduce the overall footprint of screening apparatus employed, for example in oil drilling operations and/or improve throughput. At the same time as the mixture feed is divided into streams that flow (solids dispersed in a liquid) by the method, there is no requirement for extra solids handling operations. The screening portion operates to "pre-screen" the feed in advance of a solids removal step by the screening or other liquid solids separation apparatus.

Advantageously for some applications the conduit may include two or more screens that may be located in the same screening portion or in different screening portions of the conduit. The screens are formed and arranged to operate in a series fashion with successive screens having finer mesh, For example where two screens are used the liquid and solids feed is divided by the first screen into a first cleaned stream (passing through the first screen) and a second concentrated stream not passing through the first screen as described above.

The first, cleaned, stream is then processed further by the second screen which will have a finer mesh than the first. This results in a first cleaned stream that has passed successively through both screens and another concentrated stream, of liquid and solids that has passed the coarser first screen but not the finer second screen. The two concentrated streams produced may be recombined for further processing or use or they may be kept separate and directed (e.g. along separate branches of conduit or pipe) for separate further processing storage or use.

Therefore the methods and apparatus described herein may be used for progressive screening operations without necessarily requiring the use of other processing equipment.

Thus the present invention provides a system for screening a liquid and solids mixture feed, the system comprising:

an apparatus including a conduit, the conduit including a screening portion formed and arranged to divide a liquid and solids mixture feed flowing through the conduit into a first, cleaned stream comprising liquid and solid particles of below a selected size limit, and a second, concentrated, stream comprising liquid, and particles above the selected size limit; and screening or liquid and solids separating apparatus for processing the second stream.

The screening apparatus for processing the second stream may be a screening machine such as a shale shaker or any other type of vibratory screening device. Alternatively hydrocyclones, centrifuges or any other solids and liquids separator may be employed. A combination of screening apparatus of the same or different types may be used in the system. They may operate in series or parallel or some combination of series and parallel.

In an alternative approach the present invention provides a system wherein the liquids and solids mixture feed is processed in the conduit as discussed above but the second stream is not necessarily further processed. This can occur when the system has screening or liquid and solids separating apparatus provided before the apparatus including the conduit and the conduit carries out a final screening operation.

In the field of drilling operations the methods, apparatus and system of the invention can be operated particularly advantageously. Typical drill cuttings and drilling mud streams generally contain a high proportion of liquid to solid. For example during the drilling of an oil well the mud returning to the surface for processing by a shale shaker (vibratory screening machine) will typically contain between 0.1 and 10% by volume of drilled solids that are of a size capable of separation by a shale shaker. The volume of drilled solids to be separated by the shale shaker will thus normally be a relatively small volume compared to the volume of fluid to be processed.

The throughput of screening apparatus employed, such as vibratory screening machines, tends to be limited by the volume of liquid being processed rather than by the solids content. By dividing the feed into the two streams the screening or other liquid solids separation apparatus can be used more effectively, on a concentrated (second) stream of solids and liquids.

The first, cleaned stream may be directed to a tank or other receptacle for subsequent treatment, recycle, reuse or disposal. Alternatively the first stream may be reused, (e.g. where the feed is a used drilling mud, by returning the cleaned stream into a drilling mud stream) immediately after screening in the conduit screening portion. As a yet further alternative the first stream may be directed to further processing equipment, for example a vibratory screening machine where at least some of the solids content may be removed before reuse, recycle or disposal.

The screening portion of the conduit employed in the apparatus, methods and systems described herein may take several different forms. For example the conduit may be a pipe or channel having a screen mesh or other filter material that replaces part of its wall. Screens may be mounted vertically, horizontally or at any angle or combination of angles between vertical and horizontal. The first, cleaned stream or filtrate (liquid together with solids below the mesh size) will pass through the mesh and can be directed to subsequent treatment as desired. For example, by means of a further section (e.g. a branch) of conduit.

Alternatively the conduit may incorporate a secondary, internal conduit (e.g. a pipe) that has a portion of wall replaced by a screen mesh or other screen or filter material. Liquid and undersized solids from the feed passing along the (outer) conduit, passes through the screen mesh and into the internal conduit and is then directed as required.

Multiple internal conduits may be employed and may be formed in any convenient shape or shapes to provide the desired division into the two streams and overall flow rate. For example cylinders, hexagonal prisms or cuboids as illustrated hereafter with reference to specific embodiments.

Where multiple screens operating in series are used in a conduit screens may be for example spaced apart from each other and stacked in a section of conduit. Alternatively series screening in the conduit may be obtained e.g. by having two internal conduits, one inside the other and each having a screening portion.

Multiple conduits such as those described herein may be employed in the method. The conduit or conduits may be of any convenient shape.

For efficient operation of the apparatus the screening portion should operate with minimum downtime, in particular it should be arranged to, as far as possible, avoid blinding or clogging of the screen mesh or other filter material during use. This possibility may be avoided to some extent by the flow of the feed along the conduit constantly washing the screen mesh.

Additional clearing action can be achieved by having at least the screening portion of the conduit subject to vibration. For example by locating the conduit in a "basket" that is mounted on resilient mountings such as springs and vibrated in a similar fashion to that of a typical vibratory screening machine. Typically vibration is by means of a pair of electric motors having eccentric (or eccentrically weighted) shafts turning in opposite directions. The vibration tends to keep particles in the feed mobile or fluidised and can provide a clearing effect, removing particles of solid blocking a screen mesh or other screening material while assisting fluid to flow through the screen. The conduit may also be designed such that the fluid passes through it when in turbulent flow e.g. by the provision of baffles, thus further assisting the passage of oversize solids through the conduit.

It will be readily apparent to the skilled person that the design of the apparatus can be adjusted to provide the desired degree of screening to the first stream and concentration to the first stream and concentration to second stream, for a given expected feed, in a number of ways.

Adjustment of the following factors can be made:
a) The method of entry of the feed to the screen;
b) Employing different methods to avoid settling of solids such as:
  pre-screening using e.g. a scalping screen to remove large particles or a hydrocyclone to remove dense particles;
  providing baffles to obtain turbulent flow;
  adjusting the flow rate across the screen face;
  adjusting the depth of fluid on each side of screen;
  changing vibration characteristics applied to the conduit; and
  changing any one or more of the shape or size of:—the screen, the conduit, and the fluid outlet for concentrated fluid.

For typical operations fluid flow velocities within the conduit may be in an operational range of about from 5 to 500 feet per minute (about 1.5 to 150 meters per minute).

Thus when provided as a stand alone module the apparatus may comprise the conduit with means to vibrate it. The feed may be supplied to the vibrating conduit by means of a conduit or pipe, that may provide the feed from a source such as a head tank or by a pump from a storage tank. The vibrating conduit may be connected to the feed conduit by a portion of flexible pipe or bellows. Similarly the two product streams from the module may be directed onwards for further processing or storage via suitable conduits or piping that may be connected to the vibrating conduit by flexible connections. A stand alone module may also include a scalping screen (that may be vibrated) upstream of the conduit, for removal of large particles that right reduce the effectiveness of the conduit and contribute to reduced conduit screen life.

As an alternative the apparatus may be integrated within further processing equipment, for example may be provided in the basket of a vibratory screening machine, such as a shale shaker. For example the apparatus in a shale shaker basket may provide a first screening to a used drilling mud feed. The cleaned stream may be suitable for reuse directly in drilling mud or may be further processed. The second, concentrated stream is then passed through the screen(s) of the shale shaker to remove the larger sized solid particles and provide further fluid for reuse or further processing. Conveniently the feed may be fed through a scalping screen, to remove large particles before being passed through the conduit. The scalping screen can be provided integral with the basket.

As a yet further alternative the apparatus may be integrated in a basket of a shale shaker or other vibratory screening machine, but may be located after the screens to divide already screened fluid into a cleaned stream and a second, concentrated stream.

Advantageously the screening of the feed effected by the screening portion of the conduit is carried out in an upwardly flowing direction. The fluid that is screened passes upwardly from the conduit through the screen mesh. This approach has the advantage that the screen mesh tends to be kept clear by the action of gravity. Oversize particles held against the screen mesh will tend to fall off, back into the flow of feed towards subsequent screening apparatus. Alternatively filtration through the mesh may be in a downward or lateral direction or in any other suitable direction or combination of directions.

Furthermore where a vibratory action is employed the presence of a layer of screened fluid above the mesh, as described hereafter with reference to a specific embodiment, may be advantageous. The vibrating action can result in a to and fro pumping action in the fluid through from one side of the mesh to the other that assists in keeping both sides of the screen clear of accumulated solids.

Advantageously the screening portion of conduit has a portion of screen mesh or other filter material on an upwards facing portion of wall and the feed is supplied at a slight positive pressure so as to effect upwards filtration through the screen mesh. Even where the screening portion is at any angle supplying the feed at a slight positive pressure so as to encourage its passage through the screen mesh is advantageous.

Conveniently this can be arranged by having a bed conduit with a screening portion that is at a lower height than the inlet end of the conduit, thus producing a pressure (a head pressure) at the screening portion.

Conveniently either the outlet from the conduit may be limited in size, such that a head of fluid creating a positive pressure on the screen is created. Alternatively or additionally the outlet from the conduit may be positioned at a level above the height of the screen such that a head of fluid is created resulting in a positive pressure on the screen. A weir arrangement may be provided as discussed below. In either case the positive pressure on the screen assists flow through the screen.

Fluid throughput is proportional to pressure for a given size of conduit. Typically a head or pressure equivalent to between 50 mm and 2000 mm will be used. The head will be limited by the ability of screening material employed to withstand the load i.e. the operating pressure will be determined by the ability of the screening material to withstand the operating pressure without failing. Where a screening material has the ability to be operated with higher pressure heads above 2000 mm may be used. For example a wedge wire screen will typically be capable of operation at a pressure significantly higher than that of a woven wire screen with a similar aperture size.

In a particularly advantageous arrangement the conduit is mounted in a vibrating basket or is itself mounted on resilient members and is directly vibrated. It has a downwards directed (e.g. vertical) inlet end followed by a generally horizontally disposed screening portion that has a screen mesh replacing a portion, for example an upper portion of conduit wall. The conduit continues by having an upwardly directed (e.g. vertical) outlet end. The end of the outlet end is at a lower height than the inlet and acts as a weir over which the second stream flows and may then be directed to a subsequent screening apparatus. This form of conduit, with an overall 'U' (or 'J') shape provides a robust, relatively simple in construction apparatus. The mixture feed flows around the U by virtue of the head pressure from the inlet end. The head pressure produced by the raised outlet end acts to force liquid and undersize solids upwards through the screen mesh (where it is on an upper portion of conduit wall) to produce the first cleaned stream, that can then be directed as desired, for example to a tank for recycling. Such an arrangement is shown in an embodiment described in more detail hereafter.

Advantageously the height of the outlet end or a weir associated with the outlet end can be variable. This allows the flow rate along the conduit to be controlled so as to obtain the desired amount of screening in the screening portion whilst at the same time maintaining sufficient flow rate to avoid settling out of solids within the conduit. The height of the outlet may be fixed or varied either manually or automatically. If controlled automatically or manually the head of fluid may be varied to increase or decrease the head in order to achieve the required process flow rate of the screen to process the flow arriving at the inlet.

Alternative arrangements are possible. For example the conduit may, have a generally U shape as described above but the screening portion, in the form of a portion of conduit with a mesh panel replacing part of the wall, may be formed on the downwardly directed (inlet) end or on the upwardly directed (outlet) end. In either case the pressure produced by the head will force liquid and undersized solids outwardly through the mesh panels or other filter material employed.

Alternatively the conduit may be L shaped with the inlet end above the screen and the discharge end below the screen. The rate of discharge is controlled by a size of the discharge orifice. The orifice may be fixed size or variable. If variable it may be manually controlled or controlled by an automated control system such that a head of fluid is maintained within the conduit and the resulting pressure assists flow of the fluid through the screen. If controlled automatically or manually the head of fluid may be varied to increase or decrease to achieve the required process flow rate of the screen to process the flow arriving at the inlet.

Alternatively the solids and liquid mixture may be pumped into the conduit at a pressure that is suitable to assist flow through the conduit and the screening action.

The outlet from a conduit supplied by a pump may be over a weir the height of which may be adjustable or fixed. In this arrangement the head of fluid created by the height of the weir assists flow across the screen and thus the rate of processing of the fluid while the rate of pumping controls the velocity of fluid in the conduit. According to this arrangement the fluid velocity can be controlled to ensure that no settling of solids occurs within the conduit and all solids are carried forward to the conduit outlet. Control of the height of the weir may be manually or automatically adjustable. If automatically control is employed a suitable control system may be employed to adjust either the height of the weir, thus controlling the pressure of fluid on the screening portion of the conduit and consequently the process rate through the screen. Alternatively the pumping rate may be adjusted to ensure adequate fluid velocity is maintained within the conduit. Alternatively both the height of the weir and the input rate are controlled to allow optimisation of process rate and velocity for a given feed mixture.

Alternatively the solids and liquid feed may be pumped into the conduit at a pressure suitable to assist flow across the screen and the outlet from the conduit arranged with an orifice of variable or fixed size. The position of the orifice may be either above or below the screen. In this arrangement the pressure within the conduit is maintained at a level suitable to effect flow through the screen by a combination of input rate and the size of outlet orifice. The pump rate and pressure may be fixed or variable either manually or by an automated method. The orifice size may be fixed or variable either manually or by an automated method. Advantageously adjustment of the pump rate, pressure and orifice size may be automated to effect optimum operation of the system. The pressure employed may typically be equivalent to the head pressures discussed above with respect to apparatus including a weir and/or an inlet above the height of the screening portion.

When used for oil well drilling operations the first stream comprising screened cleaned fluid will typically be, but is not limited to, between 20 and 80 percent by volume of the total flow arriving at the shale shaker or other solids/liquids separator, from the oil well This stream having been processed is directed to the mud storage system where it may be subjected to further processing by equipment such as centrifuges or chemical processing prior to recirculation to the oil well.

The second, concentrated, stream will typically be, but is not limited to, between 20 and 80 percent by volume of the total flow arriving at the shale shaker from the oil well. This stream is passed to, for example, a shale shaker for screening where fluid and drilled solids above screen size are separated. Drilled solids are rejected and processed fluid is directed to the mud storage system where it may be subjected to further processing by equipment such as centrifuges or chemical processing prior to recirculation to the oil well. The volume of fluid to be processed by the shale shaker is significantly reduced and the size of the shale shaker can be reduced proportionately.

The two stage process described herein—first screening the mixture in the conduit and then carrying out a solids liquid separation—allows techniques to obtain high fluid throughput to be adopted in the design of the first stage equipment without the need to separate solids into a separate stream from the fluid. This allows significant flexibility in the design to be adopted. A design can be adopted that allows a large proportion of the fluid arriving from e.g. a well to be processed through a screen of small physical size (the screen on the screening portion of the conduit). The remaining fluid, the second stream, in which the solids above screen size are concentrated, can be processed by a second stage screen or other screening/liquids and solids separation machine such as a centrifuge, that is physically smaller than that previously used for single stage processing.

This two stage approach allows the overall volumetric process capacity of a screening machine to be significantly increased resulting in a smaller machine, the requirement for fewer machines, a smaller installation, a lighter installation and/or significantly increased efficiency of separation.

Screen lift is an economic factor in the operation of solids separation equipment it has found that screen life of fine meshes can be relative to the volume of solids to be separated by the screen. A method of reducing the volume of solids to be separated by a fine screen is to pre screen the fluid reaching the fine screen with meshes that remove coarser solids leaving the fine mesh to remove only a limited quantity of the solids contained in e.g. mud returning from an oil well in process of being drilled. The process of removing solids with progressively finer screens may be referred to as 'Progressive Screening'. To achieve 'Progressive Screening' a number of conduits may be arranged in series such that each conduit is fitted with a progressively finer mesh and the two fluid streams exiting each conduit are each screened with progressively finer meshes.

As an alternative the invention may be employed after fluid containing solids, (for example returning for processing from an oil well being drilled), has initially been processed with progressively finer meshes using conventional equipment and methods. Employment of the invention in this manner allows coarser solids to be removed prior to the invention acting to concentrate the finer solids into a smaller volume of fluid for subsequent processing. This approach has the advantage that the process capacity of conventional equipment is highest when removing coarse solids and lowest when removing fine solids. Employing the invention to process pre screened fluid extends fine screen life while significantly reducing the volume of fluid to be processed by the equipment further downstream of the invention.

Further Aspects of the Invention

According to a third aspect the present invention provides an apparatus for use in screening a liquid and solids mixture feed, the apparatus comprising:

a conduit, including a screening portion and formed and arranged to divide a liquid and solids mixture feed flowing through the conduit into a first, cleaned stream comprising liquid and solid particles of below a selected size limit, and a second, concentrated, stream comprising liquid, and solid particles above the selected size limit;

wherein an outlet for the second concentrated stream from the screening portion is in the form of a weir assembly;

the weir assembly comprising:

a trough in fluid communication with said screening portion and having a bottom wall disposed at a lower height than the bottom wall of the screening portion; and an outlet over which the second concentrated stream flows in use, The division of the feed into the two streams may be accomplished by use of a suitable screening the screening portion of the conduit, for example a screen of a woven wire mesh, wedge wire, moulded plastics, synthetic woven fabrics or drilled plates of either plastic or metal. The apertures in screening plates may be produced by laser or chemical etching processes or some other suitable method. Both of the two streams are flowable; the first stream can flow or be pumped to a holding tank, or to a further processing step or be recycled directly and reused. The second stream can flow or be pumped to the screening or other solids liquid separation apparatus. The second stream is concentrated in the sense that the amount of solid particles above the selected size has been increased relative to the liquid volume. The first stream removes liquid (and undersize solids) from the first stream that can then be further processed in screening or other solids liquid separation apparatus as required.

The screening portion of the conduit employed in the apparatus, described herein may take several different forms. For example the conduit may be a pipe or channel having a screen mesh or other filter material that replaces part of its wall. A screen may be of a mesh mounted on and/or tensioned across an apertured support plate. Screens may be mounted vertically, horizontally or at any angle or combination of angles between vertical and horizontal. The first, cleaned stream or filtrate (liquid together with solids below the mesh size) will pass through the mesh and can be directed to subsequent treatment as desired. For example, by means of a further section (e.g. a branch) of conduit.

Alternatively the conduit may incorporate a secondary, internal conduit (e.g. a pipe) that has a portion of wall replaced by a screen mesh or other screen or filter material. Liquid and undersized solids from the feed passing along the (outer) conduit, passes through the screen mesh and into the internal conduit and is then directed as required.

Multiple internal conduits may be employed and may be formed in any convenient shape or shapes to provide the desired division into the two streams and overall flow rate. For example cylinders, hexagonal prisms or cuboids.

Multiple screens operating in series (successive screening through increasingly finer meshes) may be used in a conduit. Screens may be for example, spaced a part from each other and stacked in a section of conduit. Alternatively series screening in the conduit may be obtained e.g. by having two internal conduits, one inside the other and each having a screening portion. Where successive screening is carried out in a conduit suitable outlets are provided for the flows from each stage of screening as exemplified hereafter with reference to a specific embodiment.

The screening portion of the conduit may be generally horizontally disposed. This arrangement is advantageous, for example, when the apparatus is fitted as part of the processing equipment in the basket of a vibratory screening machine such as a shale shaker. The apparatus can then be conveniently fitted in a stack of screen decks such as commonly used in shale shaker technology. The screening portion may be provided in the form of a replaceable screen assembly, for example in the form of a wire mesh mounted on an apertured support plate. A support frame may be employed to support a mesh or a mesh on an apertured support plate. The screen assembly is releasably fixed in place as part of a wall, typically a generally horizontally disposed bottom wall, of the screening portion of conduit. A replaceable screen assembly may conveniently be held in place by means of inflatable seals (pneumatic seals) such as are often used for fixing and sealing screen assemblies of normal screen decks in shale shaker technology. The seals may also act to tension the screen.

Advantageously a baffle is provided above the trough of the weir assembly and disposed across the horizontal direction of flow of the second concentrated stream in the screening portion. Typically the trough extends across the width of the screening portion of the conduit. The trough will generally have a rounded bottom wall, for example a generally U or a generally part cylinder cross section to provide a smooth flow path.

Advantageously the apparatus according to the third aspect of the invention includes vibratory means. The vibratory means vibrates the conduit and its contents, aiding both the screening of the first cleaned stream through the screening portion and also in keeping solids flowing through the conduit and over the weir in suspension. The vibratory means may be connected directly to or be installed within the weir assembly or may be connected directly to or be installed within the conduit. Conveniently when the apparatus is used in a shale shaker as part of the basket, the vibratory means may be the vibratory drive used to vibrate the shale shaker basket. Where such an arrangement is used additional vibratory means may also be provided for the weir assembly or conduit.

According to a fourth aspect the present invention provides a weir assembly for an apparatus for use in screening a liquid and solids mixture feed, the weir assembly comprising:

a trough formed for being in fluid communication with a screening portion of a conduit according to the third aspect of the invention and having a bottom wall disposed at a lower height than the bottom wall of the screening portion; and an outlet over which the second concentrated stream flows in use.

Advantageously a baffle may be provided above the trough and disposed across the horizontal direction of flow of the second concentrated stream in the screening portion.

The weir assembly according to the fourth aspect has notable advantages when employed as the outlet for a screening portion of a conduit. A weir including a trough has notable advantages, especially but not exclusively when used with a horizontally disposed screening portion. The trough, especially in combination with a baffle has been found to provide a self clearing action to act against a concentration or even a build up of solids that can occur as the flow along the conduit is directed up over the outlet of the weir. Further benefits are found especially where the screening carried out by the conduit is carried out by fitting a mesh screen to the bottom wall of the screening portion. In such an arrangement increased solids concentration at the screen can cause rapid wear of a screen due to their weight on the mesh and the agitation of the solids mass against the mesh caused by both liquid flow and vibration, if the conduit is being vibrated, to improve the screening action. With a weir assembly incorporating the trough wear on the screen is greatly reduced, greatly reducing screen cost, downtime and improving reliability. The benefits of the weir assembly are described in more detail hereafter and in connection with other aspects and specific embodiments of the present invention.

As an alternative a weir assembly without a trough may be employed, i.e. a conventional weir. If this is done when the screening portion has a mesh screen fitted to the bottom wall of the horizontally disposed screening portion, then the problems associated with concentrated solids damaging the mesh screen can be avoided by not providing mesh adjacent to the weir. The bottom wall of the screening portion near the weir can be of a solid plate. Such an arrangement constitutes a fifth aspect of the present invention. In this form of assembly a baffle on the weir assembly is optional, but may be advantageously employed across the horizontal direction of flow of the second concentrated stream in the screening portion to restrict the cross section area of flow (resulting in increased velocity) and/or increase turbulence in the flow to assist in solids clearance.

It will be appreciated by the skilled person that the dimensions and geometry of the flow path, through conduit and weir assemblies, will be sized so as to obtain sufficient velocity, with the operating pressure applied, to achieve satisfactory flow of the first stream, including its solids loading, along the conduit and out over the weir outlet Vibratory means such as discussed above may be employed with a weir assembly of the fifth aspect of the invention, to aid screening and flow. Other means of avoiding possible solids build up at the weir assemblies of the invention are described hereafter and with reference to specific embodiments.

In an advantageous arrangement the apparatus according to the third aspect of the invention is mounted in a vibrating basket or is itself mounted on resilient members and is directly vibrated. It may have a downwards directed (e.g. vertical) inlet end followed by the generally horizontally disposed screening portion that has a screen mesh replacing a portion, for example an upper or a lower portion of conduit wall. The conduit continues by having an outlet in the form of the weir assembly of the fourth aspect of the invention described above.

The second stream flows over the weir assembly outlet and may then be directed to a subsequent screening process. This form of conduit, with an overall 'U' (or 'J') shape provides a robust, relatively simple in construction apparatus. The mixture feed flows around the U by virtue of the head pressure from the inlet end. The head pressure produced by the raised outlet end acts to force liquid and undersize solids through the screen mesh to produce the first cleaned stream, that can then be directed as desired, for example to a tank for recycling. As an alternative the 'U' (or 'J') shape conduit may have a weir assembly in accordance with the third aspect of the invention.

In an advantageous arrangement, an apparatus according to the third aspect of the invention, in particular in the U or J shaped conduit form described above, can be provided as one processing stage in the basket of a vibratory screening machine, as part of a stack of screening stages. The other stages in the stack will typically be of more conventional screen assemblies ('screen decks') where separation of solids from a solids and liquids stream is carried out in the known manner i.e. typical 'shale shaker' operations. The provision of an apparatus according to the third aspect of the invention as one of a stack of superposed screening stages can provide a particularly compact and versatile arrangement.

Thus according to a sixth aspect the present invention provides a processing module for use in the basket of a vibratory screening machine, the processing module comprising an apparatus according the third aspect of the invention or an apparatus according to the fifth aspect of the invention.

Advantageously the processing module is provided as a detachable module for optional use in the basket of a vibratory screening machine, the vibratory screening machine being adapted for the optional use of the module and/or other processing modules.

Thus according to a seventh aspect the present invention provides a modular vibratory screening machine (in particular a shale shaker) comprising a basket formed and arranged for mounting, or a basket constructed from processing modules selected from: a processing module according to the sixth aspect of the invention, a top screen or scalping deck, a conventional single deck screening module, a dual deck screen module, a dual deck screen module with a flow distribution system allowing parallel or series processing on the two screens, a dual deck screen module with a flow distribution system switchable between allowing parallel or series processing on the two screens, a multiple deck screen module having three or more screens in a stack, a multiple deck screen module having three or more screens in a stack with flow distribution system, and a flow distribution module for fluid interconnection between screen decks and/or between modules.

Alternatively the processing module may be provided as an integral part of a basket of a vibratory screening machine, typically with a replaceable screen assembly comprising a screen that can be removed for repair and replacement as required. Thus according to an eighth aspect the present invention provides a vibratory screening machine, in particular a shale shaker, a basket of the vibratory screening machine comprising an apparatus according to the third or the fifth aspect of the invention described herein. The basket will typically comprise further superposed screening stages such as one or more screen decks which may have associated flowback pans.

In a modular machine according to the seventh aspect of the invention, the flow distribution system or flow distributor, when provided, may be an integral part of a module containing two or three screen deck arrangements or may be provided as a separate module for optional fitting when two or three decks (or more) are in use. When not required the optional flow distribution module may be replaced by appropriate blanking off or other sealing means so that the screen decks fitted may operate in the normal series processing fashion. A flow distribution system may take the form of those described, for example in WO/2004/110589. In such a flow distribution system flow of solids and liquid may be divided for parallel processing by means of a weir at one end of an inclined upper screen deck, with one portion of the flow passing over the weir and directed to a lower screen deck and the other portion of the flow remaining for filtration through the upper screen deck. Where such an arrangement is provided immediately after a module according to the sixth aspect of the invention, the flow rate to the weir is typically high. Advantageously a deflector plate or baffle is provided in front of the weir to modulate the flow over the weir hereafter with reference to a specific embodiment.

The shale shakers according to either the seventh or the eighth aspect will also include the usual functional components, as appropriate for the use, such as the drive unit to provide vibratory action; a feed chute or other inlet for a liquid and solids feed; outlets for the screened product and separated solids as required; support springs for the basket and a base for the unit as a whole. For example in a machine with two superposed screen decks, fitted below a processing module according to the sixth aspect, that may operate in series to provide progressive screening through successively finer meshes, solids of a selected size collected on the upper of these two decks, may be directed via an outlet for recycle to the fluid or to further processing, i.e. selected size solids may be recovered for reuse.

Typical screening modules, for example a scalping deck or other screen decks modules will comprise a screen assembly or screen assemblies and may include a corresponding flowback pan or pans such as are well known in the art. For example the screen assemblies described in WO2003/013690 (Axiom Process Limited), incorporated herein by reference, may be used. The modules will include appropriate inlets and outlets for interconnection with other modules and/or to accept a feed or discharge a filtrate or separated solids.

The modules can be made demountable and interchangeable by providing suitable releasable fastenings between the vibratory basket and the selected module. For example the basket may be provided with flanges running along the side of its walls onto which corresponding flanges of a module sit. The corresponding pairs of flanges are then bolted together or otherwise secured by suitable fastenings.

As an alternative the basket itself may be made up of one or more modules, selected for the intended use. The modules are stacked one above the other, in the appropriate order for the use, to form the basket; typically sitting on springs mounted on a base. The modules may be fixed together by bolting or otherwise securing corresponding flanges, running along the sides of module walls. The vibratory drive unit may then be bolted onto the topmost module typically, for example a scalping screen deck.

Turning now to the third and fourth aspects of the invention in more detail, various optional features will be described for the weir assembly.

The baffle may comprise or may be a plate directed downwards towards the trough and disposed across the horizontal direction of flow of the second concentrated stream. It acts to direct the flow firstly down into the trough and then, where the weir outlet (typically defined by a wall over which the stream flows) extends to a height above the bottom edge of the baffle, defines a channel up out of the trough for the flow. Advantageously the baffle extends downwards at least to the height of the bottom wail of the screening portion.

More advantageously the baffle extends downwards to below the height of the bottom wall of the screening portion, i.e. the baffle extends into the trough of the weir assembly. This ensures that the flow through the weir assembly is more positively directed downwards into and then upwards out of the trough. Baffles may be height adjustable, for example removable and replaceable with a baffle of a different height or by the provision of a sliding portion of baffle that may be fixed at a selected height with respect to the bottom of the trough. An adjustable in use baffle may be employed to aid clearance of a blockage. Adjusting the baffle height as processing continues alters the flow rate and/or pressure and/or the flow characteristics (turbulence) in the apparatus especially in the weir assembly. This can act to free a blockage.

The weir outlet is typically defined by a wall over which the second concentrated stream flows. The height of the weir outlet may be fixed or adjustable to allow adjustment of for rate. The weir may be adjustable in width. Other means of adjusting the flow rate out of the weir can include having a weir outlet that is in the form of an orifice whose size (cross section area) is adjustable. The pressure in the conduit and out over the weir outlet wall can also be varied, for example by adjusting the fluid head at the inlet to the conduit or by providing a feed into the conduit via a pump that can provide variable pressure to the system.

After passing over the weir the second, concentrated, stream may be simply directed downwards for example onto a screen deck for a further screening operation. However for example when an apparatus is a module used in the basket of a vibratory screening machine, it may be convenient to direct the flow passing over the weir, by means of a flowback pan, to an end of the basket distal to the weir, where further processing (e.g. screening) can occur.

In some examples the weir assembly may be formed as a "closed to atmosphere" fluid path with the screening portion when in use. The stream flows from the end of a flooded screening portion into the through, up over the weir outlet, and downwards into a subsequent conduit, all closed to atmosphere, until at least the stream is below the height of the bottom wall of the trough. This arrangement can provide a siphon effect around the weir assembly which can assist in preventing solids build up in the trough.

The screening portion may screen through a mesh or other suitable screening material provided on the bottom wall of the screening portion. Thus the screening action providing the first, cleaned stream may be by a downwards filtration from the conduit through the mesh, in the application PCT/GB2011/000960 discussed in the Background to the Invention section above, upwards screening through a mesh out of the screening portion of the conduit is noted to have certain advantages in terms of for example avoiding blinding of the screening material and reducing wear on the mesh.

However, when employed as a processing module in a stack of screening assemblies mounted in the basket of a vibratory screening machine a generally downwards filtration can be advantageous as all filtered fluid streams (filtrates) in such machines normally proceed downwards, typically onto a flowback pan for further processing or directing out of the machine, or straight down to a sump or other holding tank. By employing the downwards filtration the processing module a standard or substantially standard basket and associated equipment may be used with little or no modification. This benefit is even greater where the processing module is to be used in a modular vibratory screening machine of the invention. After a downwards processing step a flowback pan may be used to direct the filtrate (first stream) out of the machine for reuse or further processing as desired, The screening portion of the conduit may be an open channel i.e. without a top wall, however an arrangement where the screening portion of conduit is a pipe (i.e. substantially closed or closed apart from inlet end, outlet end and passage through the screen) is advantageous as the dimensions of the conduit then affect the pressure and velocity and hence flow rates there through. Where a mesh or other suitable screening material is provided on the bottom wall of the screening portion, ensuring that the unscreened solids and liquid mixture is kept flowing along the conduit helps to prevent screen blinding.

For use as a processing module in the basket of a vibratory screening machine, according to the sixth aspect of the invention a particularly convenient form of the apparatus according to the third aspect of the invention may take the following form i.e. the apparatus may comprise the following features: It has a downwards directed (e.g. vertical) inlet end followed by a generally horizontally disposed screening portion that has a screen mesh replacing a portion of, preferably all or substantially all of the bottom wall of a generally rectangular in cross-section section of conduit, that is substantially closed or closed apart from outlet, inlet and screen mesh i.e. a rectangular in cross section pipe having a bottom, two side and a top walls.

Other cross section shapes may be employed in such a processing module but a rectangular form is convenient when fitting the process module as part of a vibratory screening machine such as a shale shaker.

Conveniently the top wall or a portion of the top wall of the pipe may be employed as a flow back pan or flow directing tray for a liquid and solids mixture feed (e.g. arriving from a previous screening operation) to direct the feed into the inlet end. Alternatively a separate flow back pan may be provided for directing flow to the inlet end, either as part of the module or as part of the previous screening apparatus.

The conduit is substantially closed or is closed apart from the outlet, inlet and screen mesh. Advantageously the pipe may be provided with at least one other passage or aperture to allow a portion of the feed to enter the conduit without passing through the inlet end as described in more detail hereafter with reference to a specific embodiment.

The passage or passages, typically in the top wall of the pipe, increase the flow into the screening portion of the conduit and can help to avoid flooding of a processing stage above caused by insufficient flow through the inlet end. At the same time the flow into the conduit via the passages increases flow therein and can aid in avoiding blockages. Advantageously passages are positioned at an edge of the conduit parallel to the general direction of flow (e.g. in the top wall and at the edge(s) with the side walls of a rectangular cross section pipe). This arrangement tends to prevent the flow passing through the passages from falling directly onto a screen of the screening portion where it may increase wear or cause damage. The flow will tend to run down the sides of the conduit as it mixes with the larger flow from the inlet end and/or will tend to be directed at edges of the screening portion where, typically, screen supports or tensioning devices are located i.e. screening material such as relatively delicate wire meshes are not present.

A flow back pan may be provided below the bottom wall of the conduit to direct the first stream (filtrate) passing through the screening portion, for example to an outlet from a screening machine.

The conduit continues by having an outlet in the form of the weir assembly of the second aspect of the invention described above. Preferably the weir assembly includes a baffle that extends downwards to below the height of the bottom wall of the screening portion. The second stream flows over the weir assembly outlet and may then be directed to a subsequent screening process, for example by a flowback pan provided below a flowback pan for the first stream. The mixture feed flows around the U shape by virtue of the head pressure from the inlet end. The head pressure produced by the raised outlet end also acts to force liquid and undersize solids through the screen mesh to produce the first cleaned stream, that can then be directed as desired, for example to a tank for recycling. The head pressure also acts to flow the second concentrated stream around the weir assembly and over the weir outlet.

As an alternative to the above the weir assembly of the processing module may be provided in accordance with the fifth aspect of the invention, or even may take the form of a conventional weir without the bottom wall of the screening portion near the weir being of a solid plate.

In a preferred configuration vibratory screening machines, in particular shale shakers, according to either the seventh or the eighth aspects of the invention may comprise a stack of the following items, in order from the top of the basket; a scalping screen deck; a processing module in accordance with the fourth aspect of the invention, that may be of the preferred form discussed above; and a further two screen decks, stacked one above the other and provided with a flow distributor to allow series or parallel processing.

Typically such a machine may include one or both of the following features:

A flow back pan provided below the scalping screen that directs filtrate from the scalping screen into the downwardly directed inlet end of the processing module. Advantageously the flowback pan is formed to prevent filtrate from the scalping deck dropping directly onto the screen of the screening portion, but directs the flow into an inlet from where it flows along the conduit past the screening portion.

Flowback pans for both the first and second streams from the processing module. The flowback pan for the first stream directs that flow out of an end of the basket from where it may be directed further for recycle or further processing. The flowback pan for the second stream directs that flow to one end of the upper of the two screen decks, where the flow distributor is located.

Other configurations may be adopted depending on the anticipated processing work. For example a flow distributor that allows only series processing through the two screen decks or the provision of only one screen deck below the processing module. For further example the provision of only one screen deck or of more than two screen decks below the processing module.

BRIEF DESCRIPTION OF THE DRAWINGS

Further preferred features and advantages of the present invention will appear from the following detailed description given by way of example of some preferred embodiments illustrated with reference to the accompanying drawings in which:

FIGS. 3*d* to 3*g* illustrate schematically father apparatus of the invention;

FIGS. 9*a* and 9*b* illustrate schematically prior art screening systems;

FIGS. 19a, 19b, 19c and 19d show in schematic detail optional features of a vibratory screening machine; and FIG. 20 show various options for a modular vibratory screening machine.

DETAILED DESCRIPTION OF THE INVENTION WITH REFERENCE TO SOME PREFERRED EMBODIMENTS

Prior art

Figure 1A:
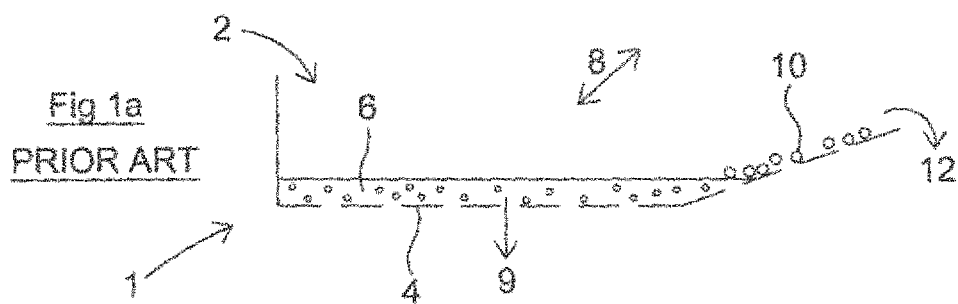
FIGS. 1 (*a* to *c*) illustrate schematically the operation of prior art vibratory screening machines.

A typical (prior art) vibratory screening machine is shown schematically in FIG. 1a and indicated by the reference numeral 1. The general method for dealing with solids/liquid separation is as follows.

The solids and liquid mixture feed (slurry) 2 is fed onto a screen 4 as a relatively thin layer or pool 6. The screen may be a wire mesh or made of other suitable screen material. The action of gravity and the vibratory motion 8 (that may be applied in a number of ways such as are well known in the art) assists undersize solid to pass through the screen together with liquid, as a screened slurry 9. The vibratory motion 8 causes oversize solids 10 to 'walk up' the screen and be conveyed to the oversize discharge 12.

Classification difficulties can arise where the solids contained in the fluid that are under screen size do not reach the screen face and hence pass through the screen. These undersized solids will be discharged together with the oversize solids. If the fluid fails to pass through the screen and reports to the oversize discharge 12 it will generally carry undersize solids with it, consequently reducing classification efficiency.

A key requirement is that the screen apertures remain open to allow solids to pass through the screen. A common problem experienced is screen 'blinding'. This occurs when solids become trapped in the apertures of the screen. When 'blinding' occurs the number of apertures in the screen is reduced, the effective size of the apertures is reduced and the process capacity of the screen is reduced. The performance and often the operating life of a screen suffering 'blinding' will be different from a screen that is not 'blinded'.

In conventional equipment multiple methods of eliminating or reducing blinding are employed. Typically these may include but are not limited to: the use of shaped apertures, wedgewire screen construction, layered wire meshes, the screen motion and frequency of screen vibration.

Other problems that can limit the efficiency of this type of screening apparatus include agglomeration of the oversize solids 10. Oversize solids can form agglomerations or a thick bed of solids on the screen 4 face that contain, trap or act as a filter to trap undersize material. Generally it is recognised that once an agglomeration or bed of dewatered or partially dewatered solids is formed, any undersize solids in the agglomeration or bed can be trapped inside the agglomeration and will thereafter report to the oversize fraction. To counteract this tendency low feed rate may be employed or liquid sprays may be used to break up agglomerations.

Historically machines of this type have been constructed as a compromise between the need to enhance fluid throughput, provide sufficient screen area to achieve the required throughput and transport solids from the screen face. Typically prior art machines have incorporated features such as illustrated schematically in FIGS. 1b and 1c.

Figure 1B:
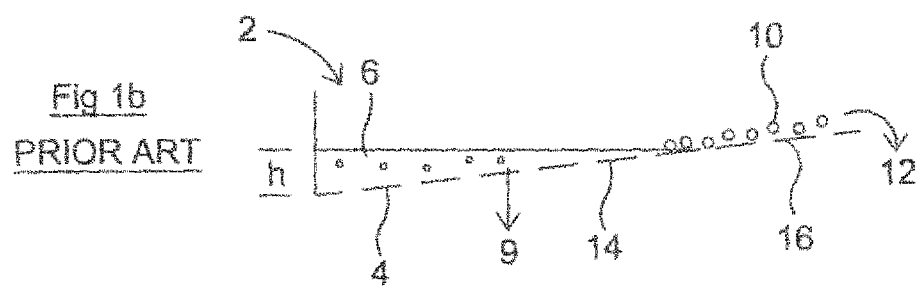
Figure 1C:
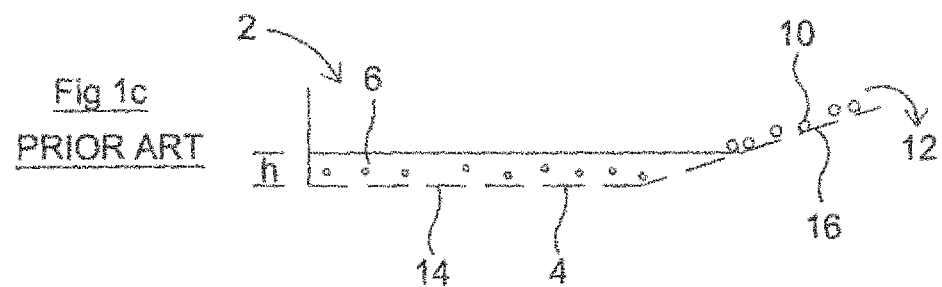

The machine 1 of FIG. 1b has a screen 4 inclined at a screen angle of typically between 0 and 15 degrees. As the screen angle is increased the depth of the pool 6 increases and the screen throughput increases as a consequence (an increased head [indicated by h] of feed). However as the angle of the screen increases the speed of transport of solids 10 up the screen face to the point of discharge generally reduces, The section 14 of the screen 4 that is processing the feed 2 is generally referred to as the fluid pool. The length of the fluid pool will typically be between 20 and 70 percent of the screen length. The section of the screen that is drying the oversize solids 10 retained on the screen and transporting those solids to the screen discharge 12 is termed the beach 16. The length of the beach will typically be between 20 and 60 percent of the screen length. Typically the fluid content of the solids discharged (the dryness of the oversize solids) will be affected by the length of the beach 16.

FIG. 1 shows an arrangement similar to that of FIG. 1b except that the screen 4 has a generally horizontal section 14 where the fluid pool 6 collects, before the inclined beach 16.

In addition to the above some machines have incorporated multiple screen decks with feed mechanisms that allow the feed stream to be split between the decks, and can allow series or parallel processing of the slurry on those decks.

The New Method

Figure 2A:
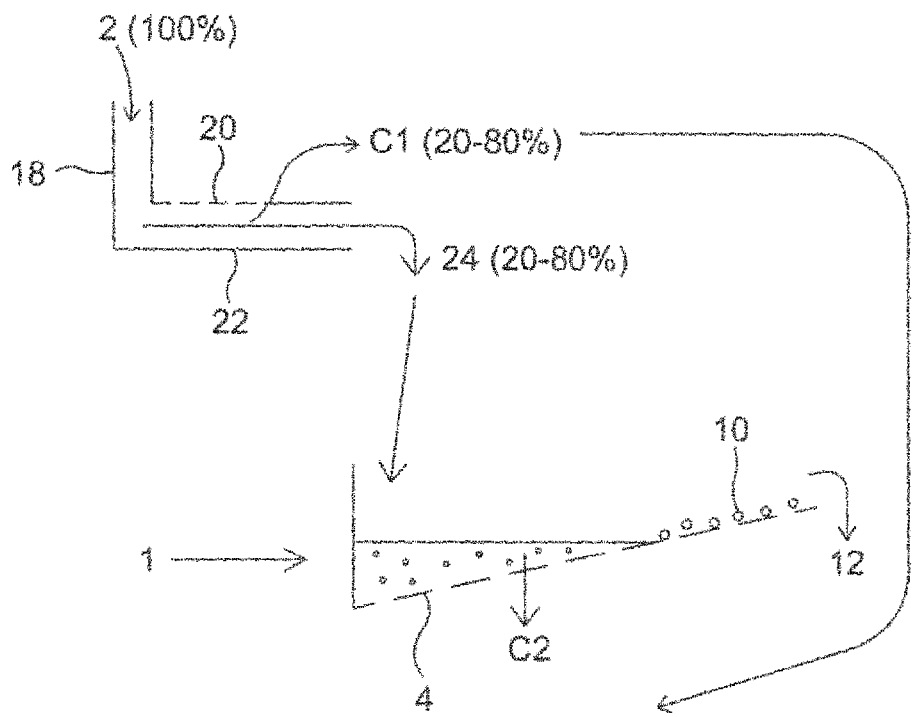
FIGS. 2*a* and 2*b* illustrate schematically use of apparatus of the invention in combination with a vibratory screening machine.
Figure 2B:
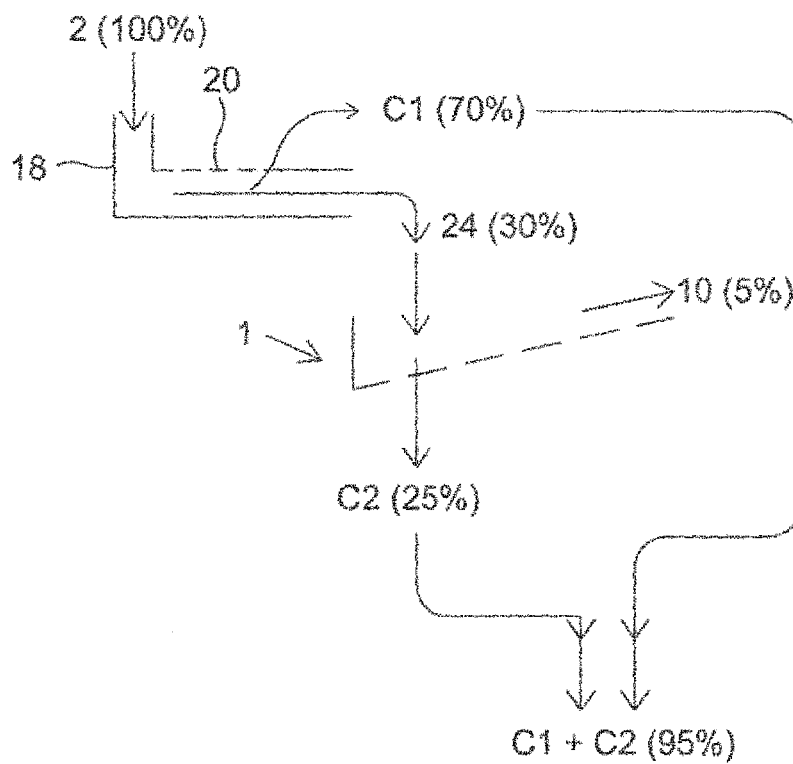

The new method is illustrated schematically in FIGS. 2a and 2b. FIG. 2a shows a vibratory screening machine 1 of the same general form to that shown in FIG. 1. A feed 2 of oil well drilling mud and drill cuttings is being processed. The % figures indicate a typical breakdown of the range of volume of the feed that may be processed in each stream (indicated by arrows).

Before the feed 2 is fed onto the machine 1 it is passed through conduit 18, where as indicated by arrows a first, cleaned or screened, stream C1 is separated off by passing through the screen 20 of a screening portion 22 of the conduit 18. The screen 20 has a mesh sized so that the first stream C1, in this example, is suitable for recycling directly to the drill mud supply tank (not illustrated) used for more drilling operations. i.e. the particles passing through screen with the accompanying liquid are of a suitable size for reuse as drilling mud components.

The remaining feed 2 constitutes a second stream 24 that is relatively concentrated in terms of larger particles (oversize with respect to screen 20) vs. liquid content. the remaining feed is directed to the vibratory screening machine 1 where the second stream is screened on the screen 4 as described above with respect to the prior art. The oversize (with respect to screen 4) particles of solids 10 are discharged for disposal at the end of the screen 4 and the screened liquid and undersize (with respect to screen 4) solids form a cleaned stream C2 that can be added to first stream C1 for reuse.

The volume of feed 2 passed through shale shaker 1 is therefore greatly reduced allowing the shale shaker to be smaller in size and/or allowing the use of fewer shale shakers to process a given fed 2.

The % by volume of the various streams produced and processed in a typical oil well drilling operation is indicated in FIG. 2b. As can be seen the oversize solids 10 represents only about 5% of this volume. The concentration in the second stream 24 to a mixture of about 25% liquid (plus undersize solids) and 5% oversize solids allows much more efficient throughput in the shale shaker 1.

Figure 3A:
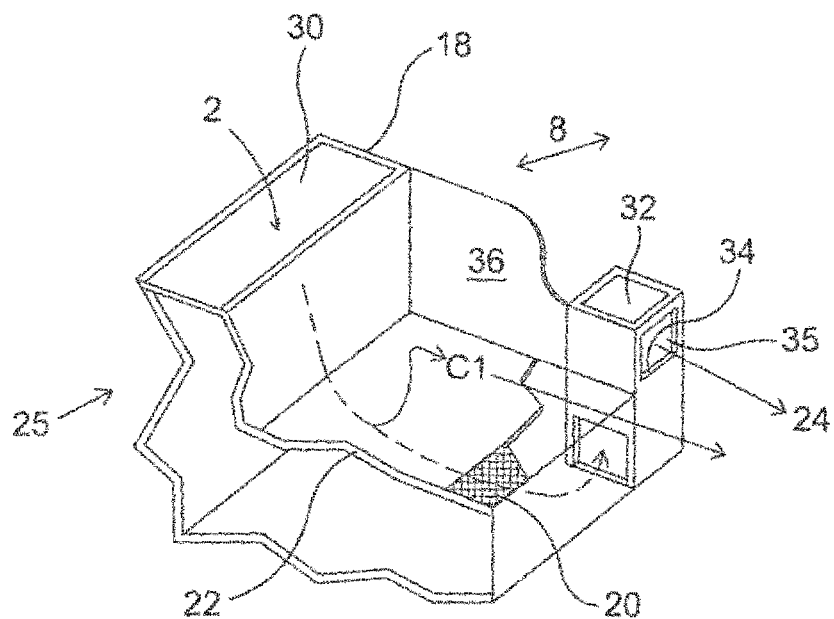
FIGS. 3*a*, 3*b* and 3*c* illustrate schematically apparatus of the invention.
Figure 3B:
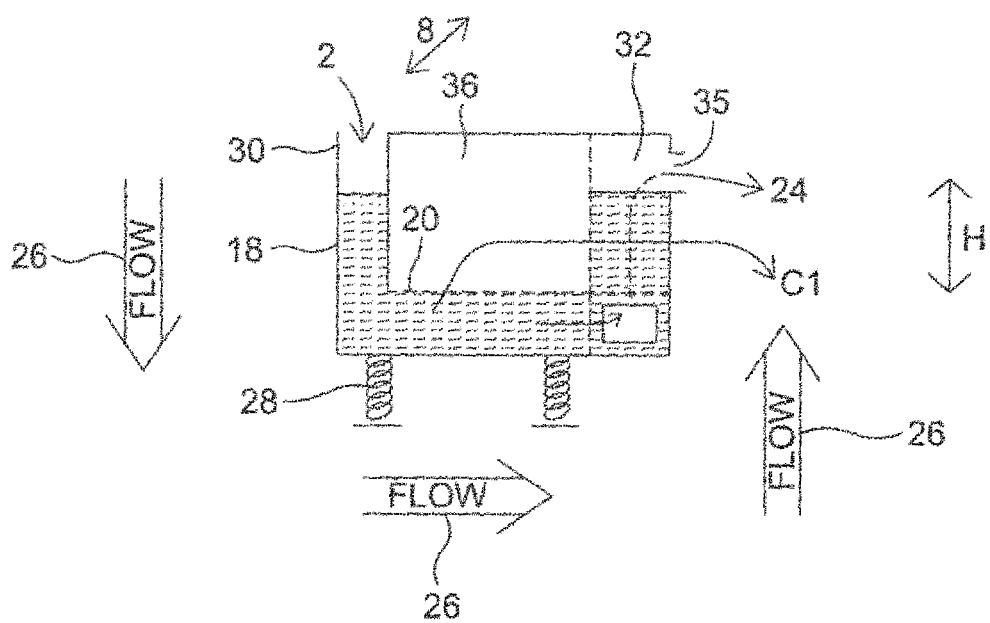
Figure 3C:
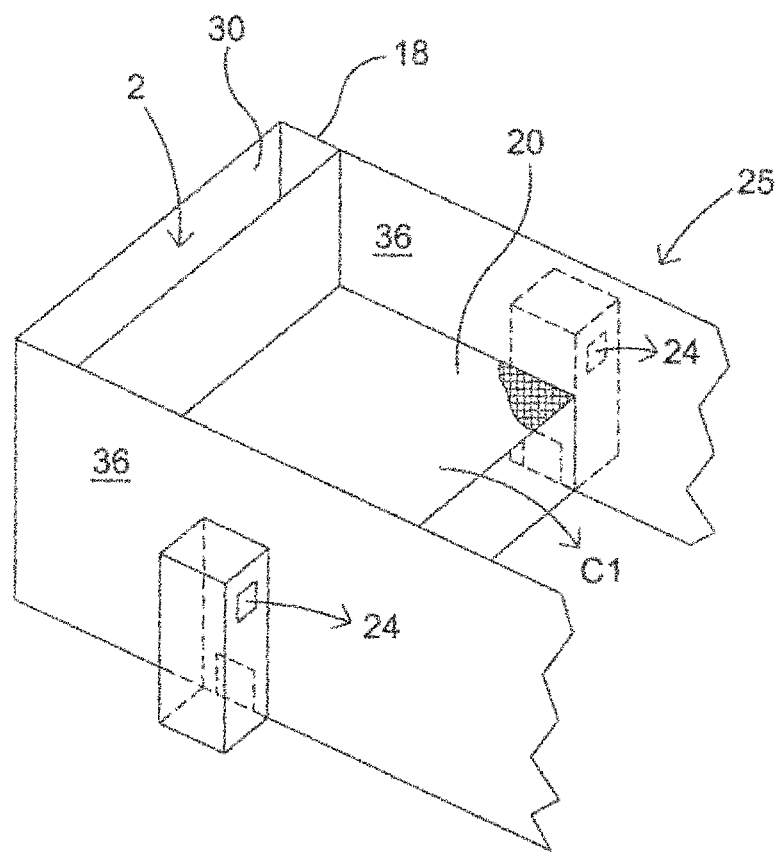

FIGS. 3a to 3c illustrate an example apparatus 25 including a conduit. In this case the apparatus is in the form of a stand alone module. The module may be used as part of a system of the invention. However similar arrangements may be used as part of an integrated machine that carries out additional processing. The conduit 18 is shown in perspective view, partially cut away to allow viewing of the internal structure in FIG. 3a and in cross section elevation in FIG. 3b. A perspective view is shown in FIG. 3c.

The conduit 18 forms a box like structure or basket, with a U shaped flow path 26, indicated by the arrow marked FLOW, for the feed 2 and consequent second stream 24, when viewed in elevation (FIG. 3b).

The apparatus 25 is mounted for vibration on mounts such as springs 28 and is vibratable by any means such as well known in the art. As an alternative to a separate vibrating arrangement the apparatus may be mounted together with a screen or screens in a vibrating basket such as fund in a typical shale shaker. In such an arrangement the apparatus 25 may be an integral part of flow dividing apparatus that directs slurry to selected screens in a stack for parallel or series processing such as described in WO2004/110589 (Axiom Process Limited).

A solids and liquids mixture feed 2 passes down the vertical inlet end 30 to the generally horizontally disposed screening portion 22 fitted with mesh 20 (only partially shown) for upwards filtration of the feed 2, resulting in first stream C1 containing liquid and solids of below the mesh 20 size, and second stream 24. Second stream 24, typically between 20 and 80 percent by volume of the feed 2, then passes up through two outlet ends 32 at either side of the screening portion 22 and over their associated weirs 34 (bottom edges of slots 35 in the outlet ends) from where it is directed for further processing (liquids and solids separation) typically in a shale shaker or assembly of shale shakers. Only one each of the outlet ends 32, weirs 34, slots 35 and side walls 36 are shown in FIG. 3a due to the cut away.

Side walls 36 and the inlet end 30 contain flow C1 so that after passing through the screen 20 it is directed out of the basket between the two outlet ends 32. As it has already been processed through screen 4, C1 may be passed to the mud system for reuse or if required subjected to chemical or further mechanical processing.

High volumetric throughput is achieved by screen 20 due to the head of fluid and vibratory action acting on the screen. The head of fluid results from the differential in height H between the screen 20 and the weirs 34, The design of outlets 32 is an important feature of the invention. The dimension of these ducts must be such that the velocity of the liquid/solids mixture of the second stream 24 during operation is sufficiently high for the solid to be carried forward over weirs 34. These can be readily determined from a consideration of the expected relative densities of the particles, the liquid employed, the flow rate into the inlet end 30 and simple tests. Advantageously the height H is made adjustable, for example by the provision of moveable plates (not shown) that can partially cover the slots 35 in the outlet, ends 32.

Figure 3D:
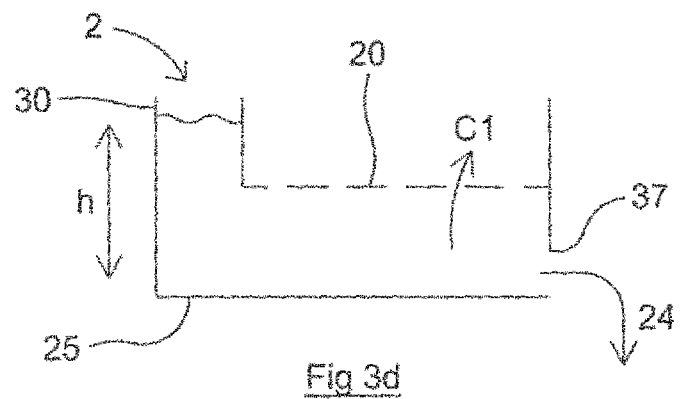

Alternative conduit designs are possible. FIG. 3d shows schematically in elevation an alternative apparatus 25. The conduit is arranged with the inlet end 30 above the screen 20 and having a discharge orifice 37 located below the screen 20. The rate of discharge is controlled by a size of the discharge orifice 37. The orifice may be fixed size or variable. If variable it may be manually controlled or controlled by an automated control system such that a head of fluid h is maintained within the conduit and the resulting pressure assists flow of the fluid through the screen 20. If controlled automatically or manually the head of fluid h may be varied to increase or decrease to achieve the required process flow rate of the screen to process the flow 2 arriving at the inlet In an alternative embodiment of the invention shown in FIG. 3e the apparatus 25 may be configured with two layers of screen 20, 20a. In this example the apparatus is arranged similarly to that in FIG. 3d, making use of orifice discharges 37,37a, but two (or more) screen stages may be obtained when making use of weir arrangements as in FIGS. 3a, 3b, 3c.

Figure 3E:
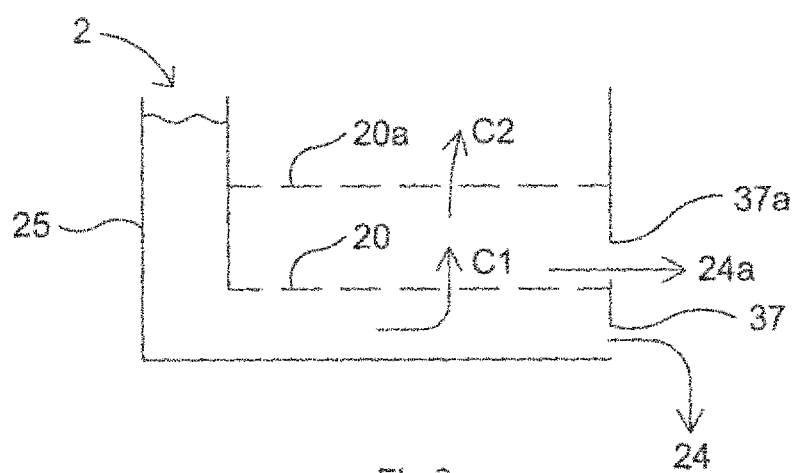

In FIG. 3e the feed 2 passes through initial screen 20 creating a partially cleaned fluid stream C1 a proportion of which then passes finer screen 20a to produce cleaned stream C2. The fluid and solids passing the first screen 20 but not the second stream 20a form a further second stream 24a. The cleaned stream C2 passing the two screens 20,20a may be e.g. passed for recirculation to an oil well or be subject to further processing. Second stream 24a passing the first screen 20 but not the second screen 20a may be either passed for recirculation to an oil well, subject to further processing or recombined with the stream 24 not passing either screen. The aim of this arrangement may be to protect the fine screen 20a and increase its operating life.

Additionally second stream 24a will contain particles classified in size between the two screen mesh sizes. These screens 20,20a may be selected so that the particles in second stream 24a are of a desirable size range for reuse. For example the two screens 20,20a may be used to select desired particulates such as lost circulation material for recycling into an oil well drilling mud.

The apparatus 25 may be fitted with more than two layers of screens 20 producing multiple fluid streams that may be either recombined or processed in any combination as suitable to the application.

FIG. 3f shows schematically an alternative arrangement where the apparatus 25 is fed by a pump P. A weir 34 (that may be fixed or variable height) is also employed. The combination of weir 34 and pump P allows control of the velocity of the feed through the conduit and the rate of the flow through screen 20.

FIG. 3g shows a similar arrangement to that of FIG. 3f except that the second stream 24 exits apparatus 25 by an orifice 37 (fixed or variable) rather than over a weir.

Figure 6:
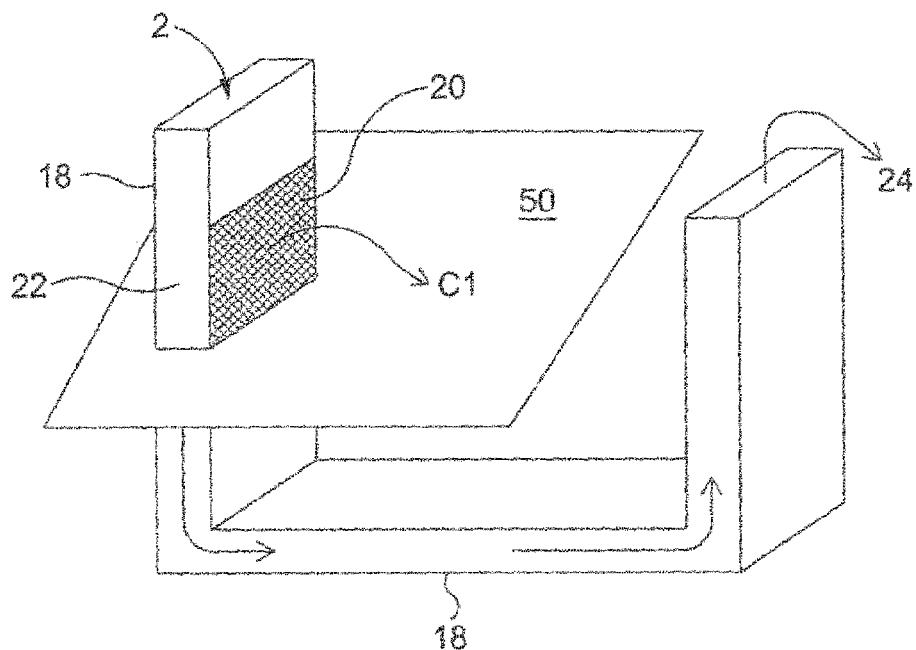
FIGS. 6 and 7 illustrate schematically alternative conduits.
Figure 7:
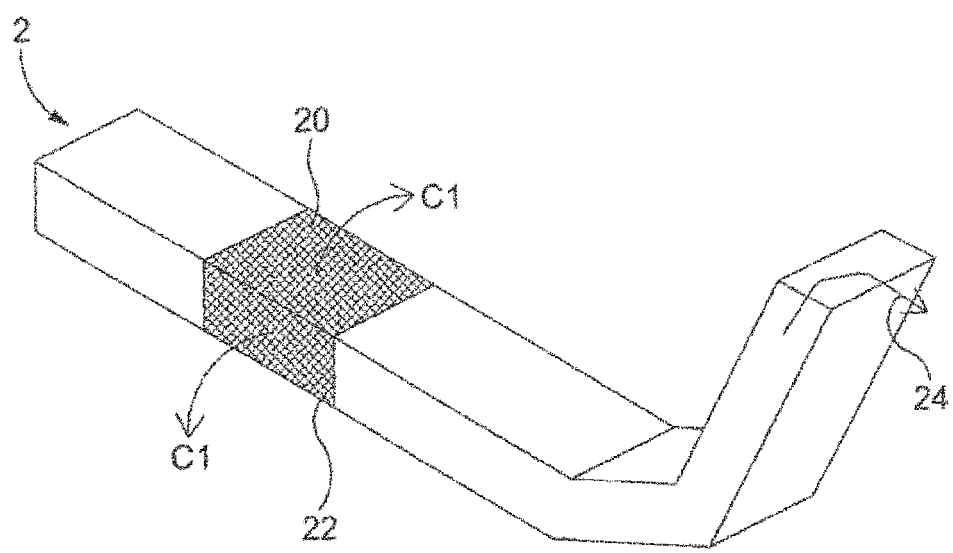

Further examples of conduit arrangements are shown in FIGS. 6, 7 and 8 as described hereafter.

Apparatus such as that shown in FIG. 3 can be operated as a stand alone unit or integrated in to a screening machine such as a vibratory screening machine.

Many alternative configurations are possible and schematic illustrations of these are shown in FIG. 4 with apparatus 25 shown accepting feeds 2 and dividing them into cleaned first streams C and concentrated second streams 24. The screens in apparatus 25 are not shown in these schematics, for clarity. Also not shown are details of shale shaker machines, for example flow back pans that may be provided between screens mounted in a stack to control direction of screened fluid.

Depending on the nature of the feed, it may be desirable to screen large solids out of the feed, prior to processing. A screen to remove coarse particles is normally referred to as a scalping screen. An apparatus such as the arrangement of FIG. 3 can be operated with or without a scalping screen to remove relatively coarse particles from the feed 2.

Figure 4A:
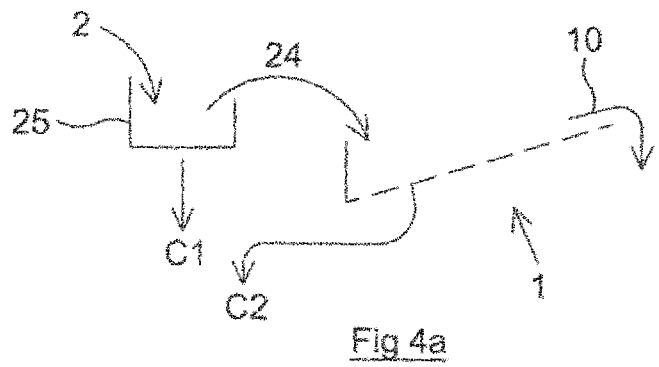
FIGS. 4*a* to 4*m* illustrate schematically apparatus of the invention in use with vibratory screening machines.

FIG. 4a shows the arrangement as in FIG. 2a where no scalping screen is used, the feed 2 is processed in the apparatus 25 containing the conduit. The second stream 24 is then processed through a shale shaker 1 in this example.

Figure 4B:
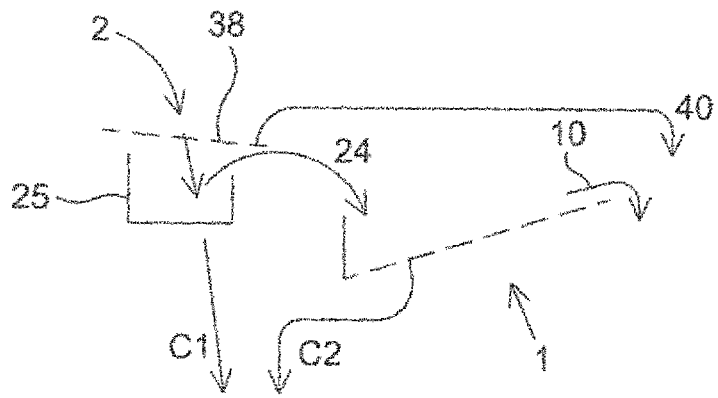

In FIG. 4*b* a scalping screen 38 is fitted before the apparatus 25 that includes the conduit. In this example the solids 40 from the scalping screen are combined with the solids (oversize 10) from the screening apparatus 1, but they may be kept separate if required.

Figure 4C:
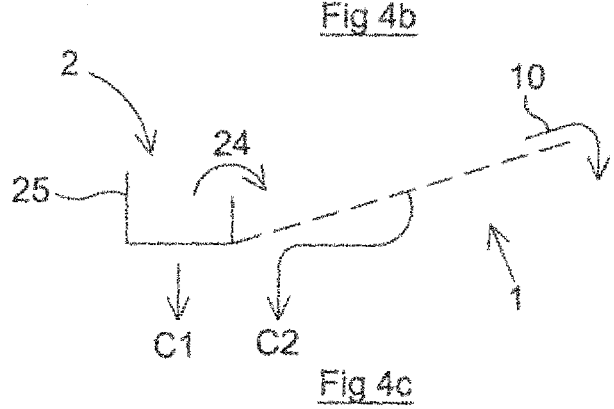

In FIG. 4*c* the apparatus 25 containing the conduit is integral with a single deck shale shaker machine 1. For example a single basket or container that is vibrated may contain both apparatus 25 and the screen (or screens) of the vibratory screening machine 1.

Figure 4D:
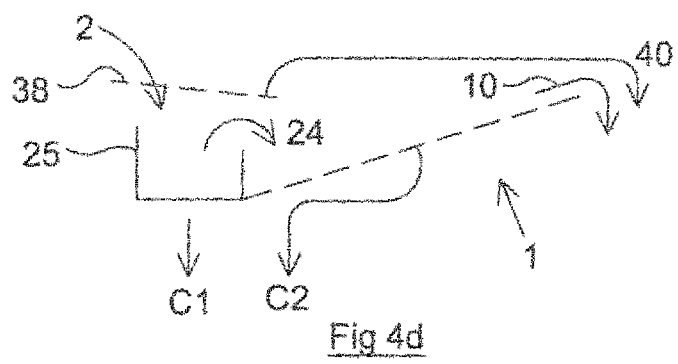

In FIG. 4*d* an integral arrangement as in FIG. 4*c* is shown but also including a scalping screen 38 to screen large particles in advance of processing through apparatus 25.

Figure 4E:
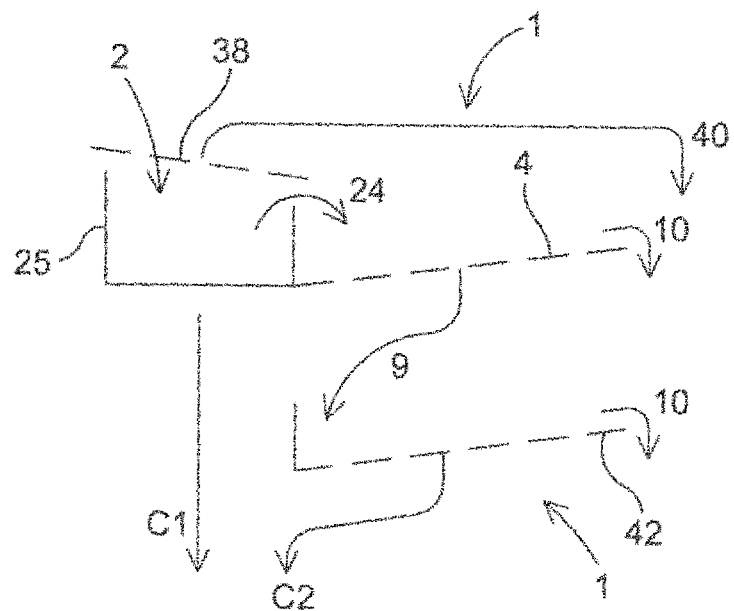

In FIG. 4*e* the arrangement is as in FIG. 4*d*, including a scalping screen 38 but with a second screen 42 fitted below the first screen 4 of the screening machine 1. The scalping screen 38 is optional. The second screen 42 may be provided as an integral part of the machine 1, in this example below and in the same vibrating basket as first screen 4. Alternatively the second screen 42 may be provided in a separate vibrating basket or even in a separate machine. The second screen 42 is operating in series with the first, receiving the screened slurry 9 and screening it again to produce the second cleaned stream C2. Generally the second screen 42 has a finer mesh than the first 20. Further screens 42 may be fitted in a stack of screens if required (typically a total of three in a stack).

Figure 4F:
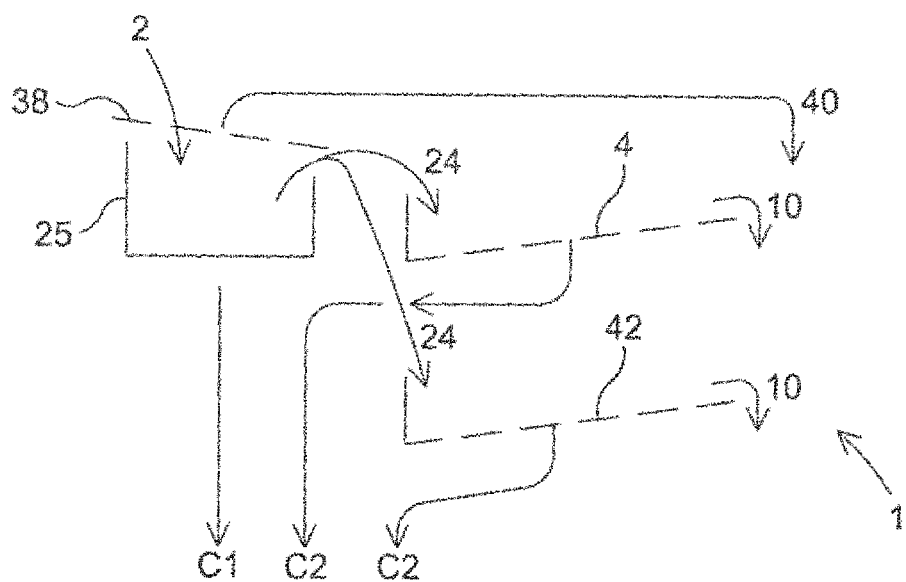

In FIG. 4*f* the arrangement is as shown in 4*e* except the two screens 4 and 42 of the screening machine 1 are operating in parallel with the second stream 24 (concentrated with oversize solids) being divided onto both screens 4 and 42, each of which produces a C2 cleaned stream. Parallel processing has the advantage of increasing throughput in the machine 1 as the screen area employed is doubled. As with FIG. 4*e* the scalping screen 38 is optional. Also as with FIG. 4*e* the two screens 4, 42 are provided as a stack in a single screening machine, fitted with suitable flow divider to allow parallel processing. Alternatively the screens 4, 42 may be in separate vibrating baskets or even in separate machines 1.

Conveniently the arrangements of FIGS. 4*e* and 4*f* can be obtained with one set of equipment by providing a screening machine 1 that includes a flow directing arrangement that is switchable—either dividing second stream 24 to the two screens 20 and 42 acting in parallel (FIG. 4*f*) or directing all to the first screen 20 and then directing the resulting screened slurry 9 to the second screen 42 for a series operation (FIG. 4*e*). A screening machine with such a switchable flow distributor is described in WO2004/110589 (Axiom Process limited).

Figure 4G:
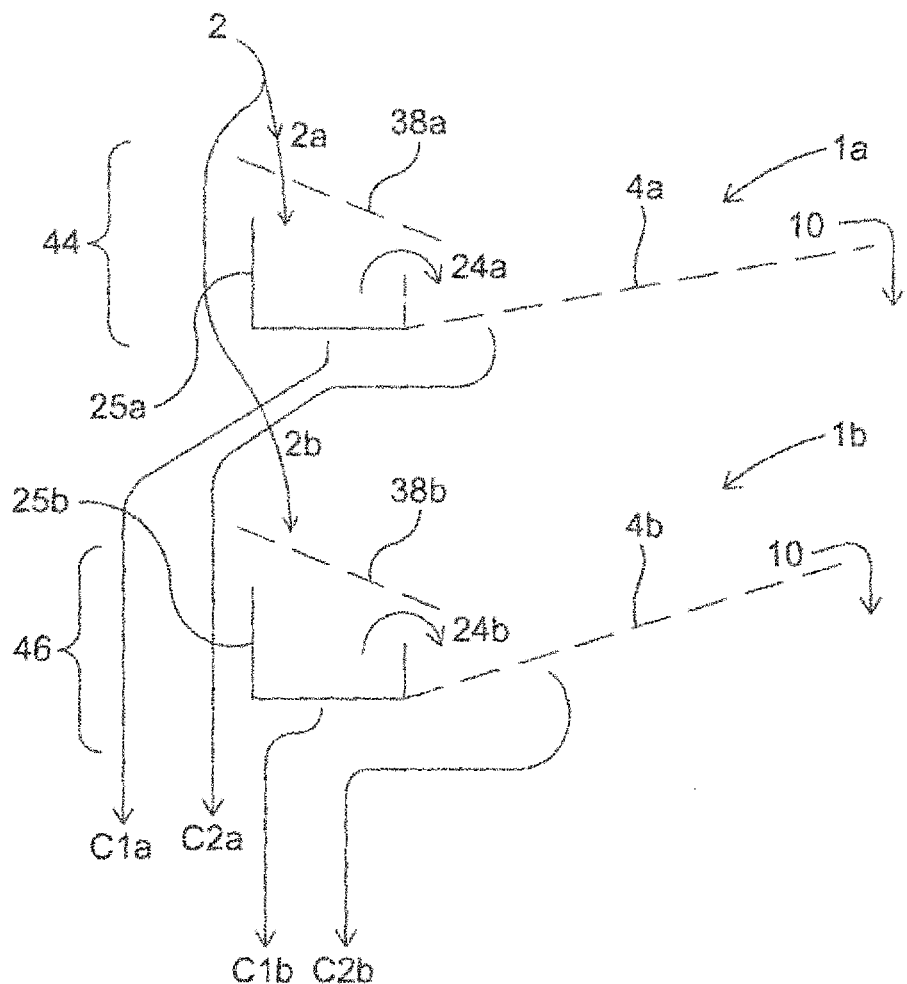

FIG. 4*g* shows schematically a composite arrangement where two arrangements (two modules 44, 46) such as shown in FIG. 4*d* are provided. The feed 2 is divided into two streams 2*a* and 2*b* for processing in parallel through each apparatus 25*a* and 25*b*. Optional scalping screens 38*a* and 38*b* are shown in this example but the solids flow from them is omitted for clarity. The second streams (24*a*, 24*b*) from each apparatus 25 are processed through the corresponding screening machines 1*a* and 1*b*. Thus cleaned streams C1*a*, C1*b*, C2*a* and C2*b* are produced. This arrangement can conveniently be provided as a single integral apparatus with side by side or vertically stacked apparatus 25*a*, 25*b* and screens 4*a* and 4*b* mounted together in a single vibrated basket or container or in a adjacent pair of baskets. Multiple screens in stacks may be provided as in FIG. 4*e* and parallel or series processing through them may be used.

Figure 4H:
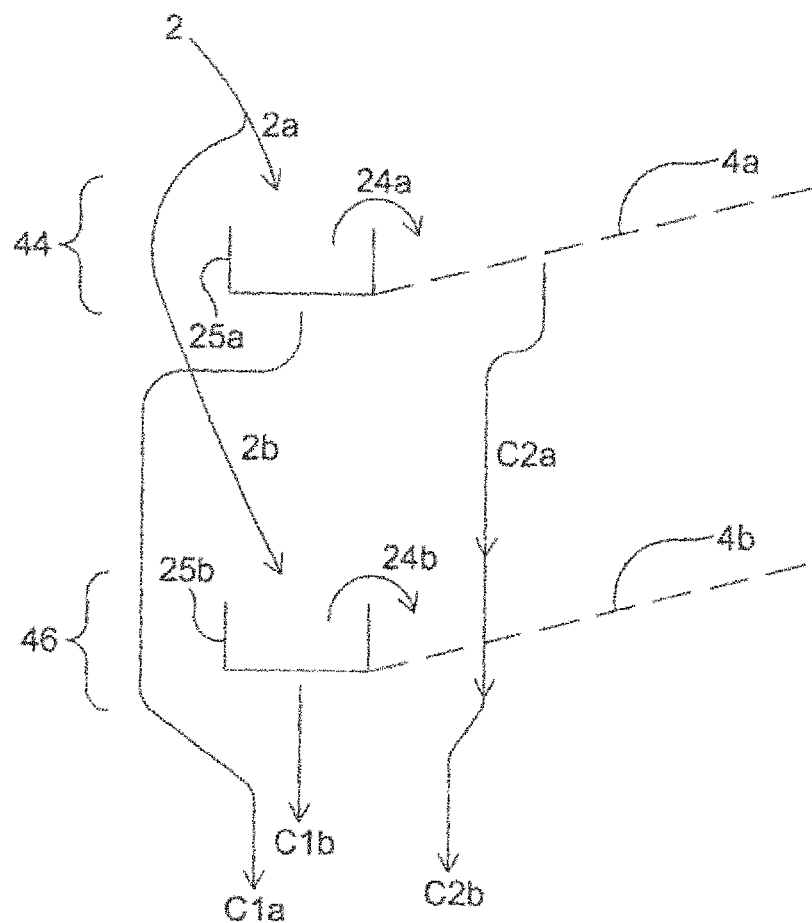

The two modules may be operated with the screens 4*a* and 4*b* in parallel as illustrated in FIG. 4*g* or in series as in FIG. 4*h* (optional scalping screens not shown). In 4*h* the cleaned stream C2*a* from the screen 4*a* of the first module 44 being processed further in the second module 46 (with a finer screen mesh 4*b* used). In this arrangement the two apparatus 25*a* and 25*b* are fitted with a mesh 20 (not shown for clarity) that is as fine as that of screen 4*b*. This ensures that all the cleaned streams (C1*a*, C2*a*, and C2*b*) are processed through a mesh of the same size. Advantageously screen 4*a* may be coarser than screen 4*b*. Coarser screens generally have a longer life. At the same time as the feed to fine screen 4*b* (stream C2*a*) has been first passed through 4*a* the life of screen 4*b* will also be extended.

It will be appreciated that other arrangements are possible, for example a two module arrangement may be used with the modules 44, 46 operating in parallel with each other as in FIG. 4*g* or they may be operated in series with all the feed 2 directed to the first module 44 and the resulting cleaned streams C1*a* and C2*a* combined, and used as the feed for the second module, flowing into apparatus 25*b*.

Figure 4I:
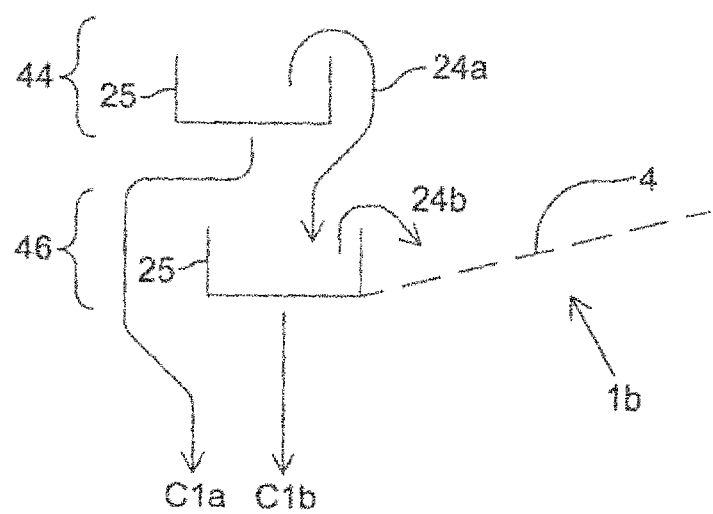
Figure 4J:
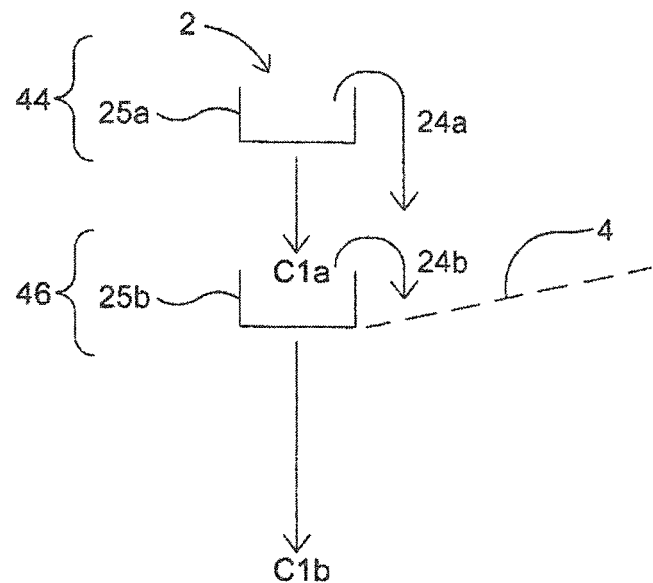

An alternative two module arrangement is illustrated in FIG. 4*i*. Module 44 contains only an apparatus 25*a* from which the cleaned stream C1*a* is passed to a storage tank for reuse and second stream 24*a* is fed to the apparatus 25*b* of the second module 46 for dividing again into a cleaned stream C1*b* and a second stream 24*b* that is processed through screening machine 1*b* that in this example is an integral part of module 46.

Alternative two module arrangements are shown in 4*j* and 4*k*.

In 4*j* modules 44 and 46 are used to process feed 2 in series, producing one cleaned stream, C1*b* and both second streams 24*a* and 24*b* are directed to vibrating shale shaker type screen 4 provided in the second module 46.

Figure 4K:
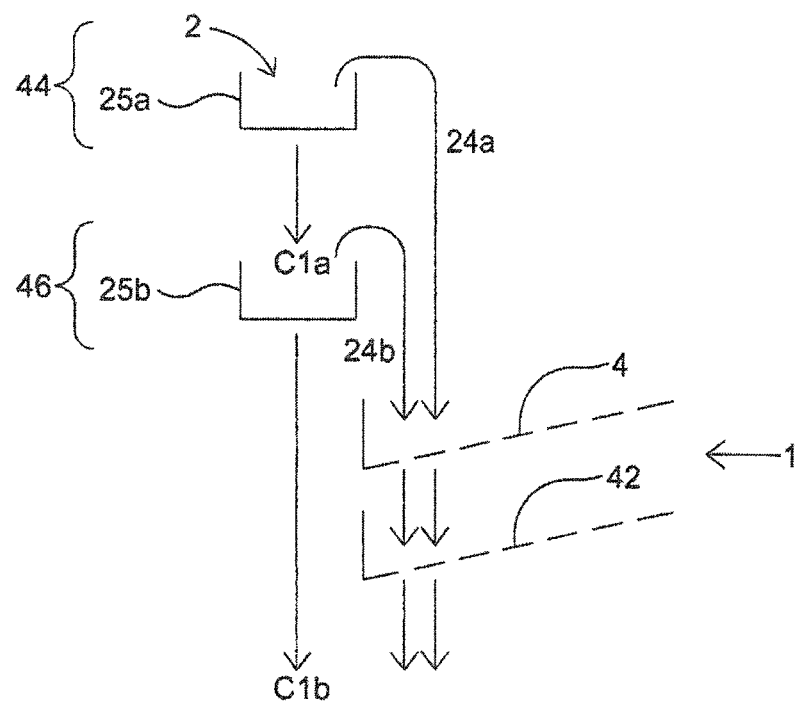

In FIG. 4*k* modules 44 and 46 are used in series and 24*a* and 24*b* second stream flows are then processed in series through successive screens 4, 42 of a separate shale shaker 1.

Figure 4L:
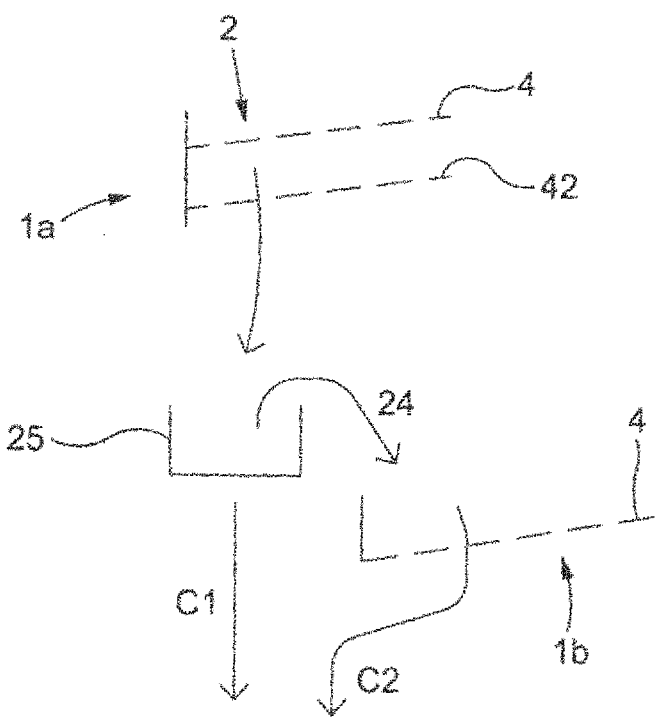

FIG. 4*l* shows schematically a use of the apparatus 25 after a solids and liquid feed such as a used drilling mud from an oil well has been processed through a shale shaker stage. The feed 2 has been progressively screened through two screens (coarse and finer) 4 and 42 of a shale shaker 1*a*. The feed, free of large particulates is then processed through apparatus 25. The second stream 24 produced from apparatus 25 is then screened through a (finest) mesh in shale shaker 1*b*. The two cleaned streams C1 and C2 can be combined if desired. This approach reduces the load on the finest screens employed in the process, (the screen in apparatus 25 and the screen in shale shaker 1*b*) by first removing the larger particles in shale shaker 1*a*.

Figure 4M:
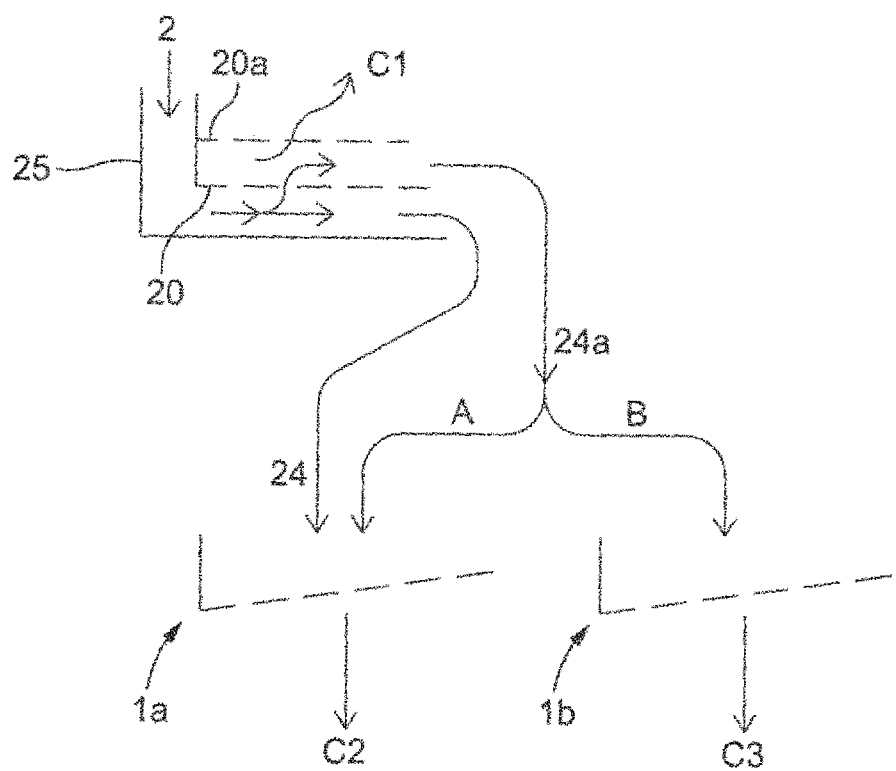

FIG. 4*m* shows schematically the use of an apparatus 25 with 2 screens (e.g. as described in FIG. 3*e*) producing two concentrated second streams 24 and 24*a*. The details of the outlet system of 25 are not shown for clarity. The apparatus 25 produces cleaned stream C1, fluid and solids passing through both screens 20 and 20*a*. The second stream 24 not passing through screen 20 is processed in shale shaker 1*a* to produce cleaned stream C2. The second stream 24*a* passing through screen 20 but not screen 20*a* may be processed (following path A) together with stream 24 in shale shaker 1*a*, contributing to cleaned stream C2.

Alternatively stream 24*a* follows path B and is processed in shale shaker 1*b*, producing cleaned stream C3. This allows the classified solids (sized between screens 20 and 20*a*) of stream 24*a* to be collected separately for reuse if desired.

The cleaned streams C1, C2, C3 may be combined for reuse.

In general any combination of apparatus 25 of the invention may be operated in series or parallel with any combination of screens operated in series or parallel either as an integrated machine or with the apparatus 25 and screens as separate machines.

Different combinations of screens (different aperture/mesh sizes) may be used with any combination of machines 25.

Figure 5:
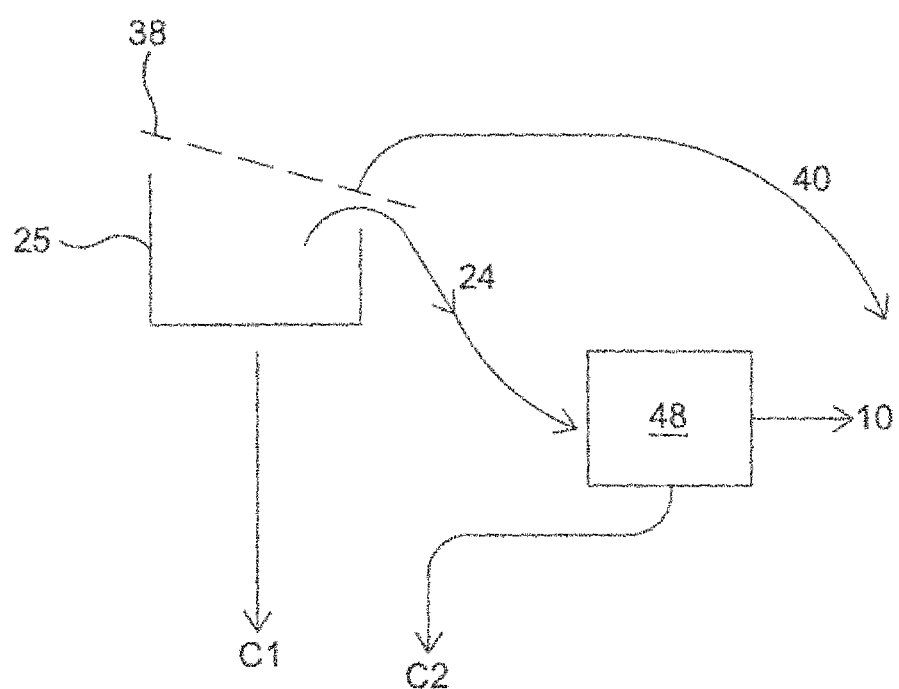
FIG. 5 illustrates schematically apparatus of the invention in use with a centrifuge.

The apparatus 25, for example as shown in FIG. 3 may be used to concentrate the solid in a fluid stream to be passed downstream of the invention to process equipment other than screening apparatus. Decanting centrifuges and screen bowl centrifuges are commonly used to process oil well drilling mud. These machines can be expensive and be limited in their volumetric capacity. As demonstrated in FIG. 5 the invention may be employed ahead of such equipment (e.g. centrifuge 48) to reduce the fluid volume that is required to be processed by that equipment. The equipment (e.g. centrifuge 48) is required to process a fluid stream of significantly reduced volume into which solids above screen size are concentrated. Combinations of centrifuges or other solids/liquids separators may be used, in series or parallel as with vibratory screening machines. Thus apparatus 25 may be employed with trains of centrifuges operating in series or parallel.

FIG. 6 illustrates schematically an alternative conduit design to that of the apparatus 25 of FIG. 3. In FIG. 6 the conduit 18 has a screen 20 that is in a vertically disposed screen portion 22. The feed 2 flows down the conduit past the screen 20 where a first stream C1 passes out onto a plate 50 from where it can be directed, for example by side wails (not shown) as desired, for example to a holding tank (also not shown). The second concentrated stream 24 passes round the U shaped path defined by the conduit 18 and may be processed further by a screening machine.

FIG. 7 illustrates schematically a yet further alternative conduit design to that of the apparatus 25 of FIG. 3. In FIG. 7 the conduit 18 has a screen 20 that is in a downwardly angled screen portion 22. The feed 2 flows down the conduit past the screen 20 where a first stream C1 passes out from where it can be directed, for example by falling into a second conduit (not shown) as desired, for example to a holding tank (also not shown). The second concentrated stream 24 passes round the U shaped path defined by the conduit 18 and may be processed further by a screening machine.

Figure 8A:
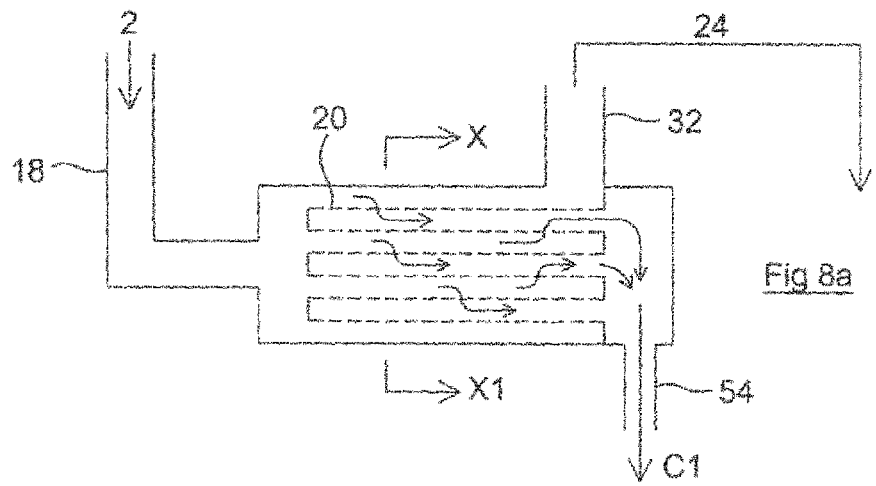
FIGS. 8*a* to 8*e* illustrate schematically alternative conduits.
Figure 8B:
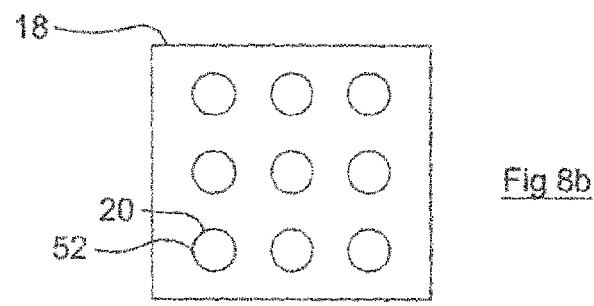

FIG. 8a shows in schematic elevation a conduit 18 provided with an internally located screen 20, in this example a series of circular cross section pipes 52 (see cross section along X-X, FIG. 8b). The pipes include screens 20 as at least part of their walls. As the feed 2 passes through the conduit a first cleaned stream C1 is formed by screening through the screens of the pipes 52 and exits the conduit 18 via the branch 54. The second concentrated stream exits the conduit via the outlet end 32 of the conduit 18 for further processing as desired.

Figure 8C:
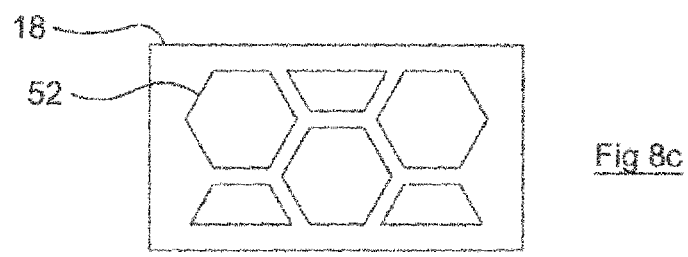
Figure 8D:
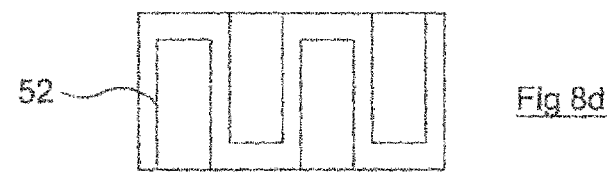
Figure 8E:
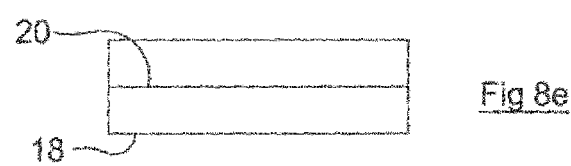

FIGS. 8c and 8d are cross section schematics as in FIG. 8b but illustrating alternative pipes 52. In FIG. 8c they are hexagonal, in cross section, in FIG. 8d rectangular. Designs such as these may be used to adjust the flow rate through the screens 20, depending on the amount of screen 20 surface area desired for a given application. Similarly FIG. 8e shows a simpler arrangement where a screen 20 divides the available volume of the conduit screening portion in two.

Figure 9A:
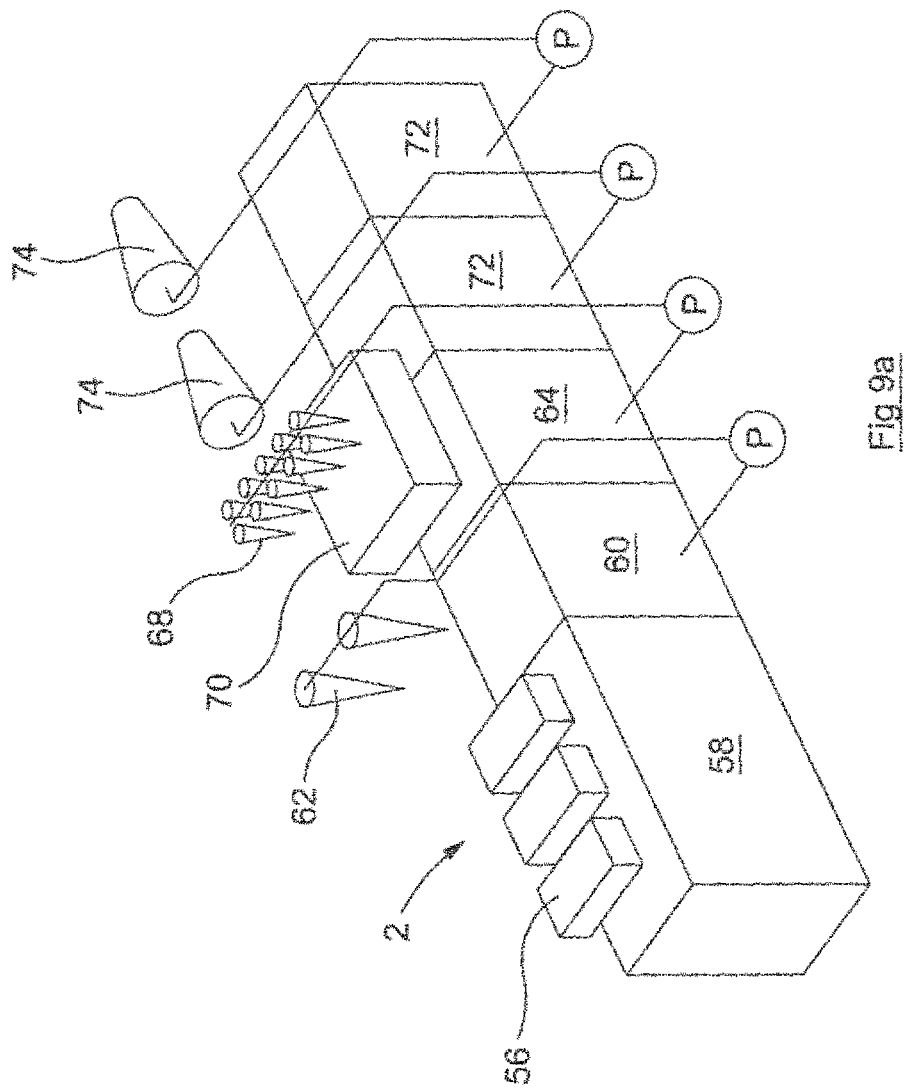

FIGS. 9a and 9b illustrate prior art screening systems such as are used in oil well drilling operations to clean drilling mud for reuse.

Figure 10:
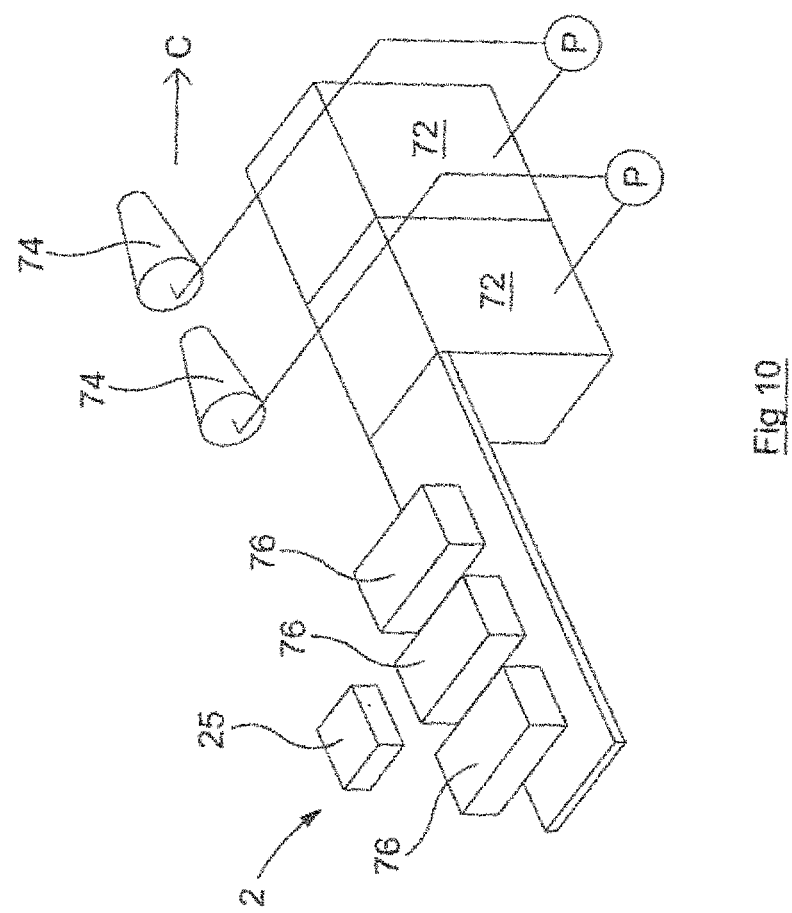
FIG. 10 illustrates schematically a screening system of the invention.

The following description for FIGS. 9 and 10 follows the cleaned stream C through each stage of the system; at each stage solids removed are discarded. Pumps are indicated by P in these figures.

In FIG. 9a the system includes low efficiency shale shakers (typically using up to 100 mesh screens) 56 (three required in this example) that process the feed 2 from a drilling operation. The screened feed is passed into a shaker holding tank 58 and then passed to a desander holding tank 60. It is then pumped to desander hydrocyclones 62 from where the cleaned stream passes to a desilter tank 64. The cleaned stream is then passed through a mud cleaner comprising a set of hydrocyclones 68 and a shale shaker 70. Next the cleaned stream is passed to centrifuge tanks 72 from where it passes through centrifuges 74 and finally to the cleaned mud storage tank (not shown).

In FIG. 9b the low efficiency shale shakers 56 of FIG. 9a are replaced with high efficiency shale shakers (five) 76 working with screen meshes typically at up to 200 mesh. This finer screening requires a greater number of shaker machines 9 or alternatively more screen decks within the shale shakers used) but allows the desander and mud cleaner of FIG. 9a to be discarded. The cleaned stream is sent directly to centrifuge tanks 72 for subsequent processing by centrifuges 74. Thus the footprint and complexity of the system has been reduced by the use of high efficiency shale shakers.

FIG. 10 shows an example system of the invention. An apparatus 25 such as described before, operating at up to 400 mesh screen, works together with three high efficiency shale shakers 76 also operating with up to 400 mesh screens to produce cleaned stream C that is further processed by the centrifuges 74. The combination of the apparatus 25 and high efficiency shale shakers 76 can produce a highly screened stream C efficiently with a tower footprint, complexity and capital cost in comparison with those of FIGS. 9a and 9b. it will be understood from the forgoing description that many other apparatus and shale shaker arrangements may be employed in a system, for example shakers with integrated apparatus 25 such as shown in FIG. 4c may be employed.

Figure 11A:
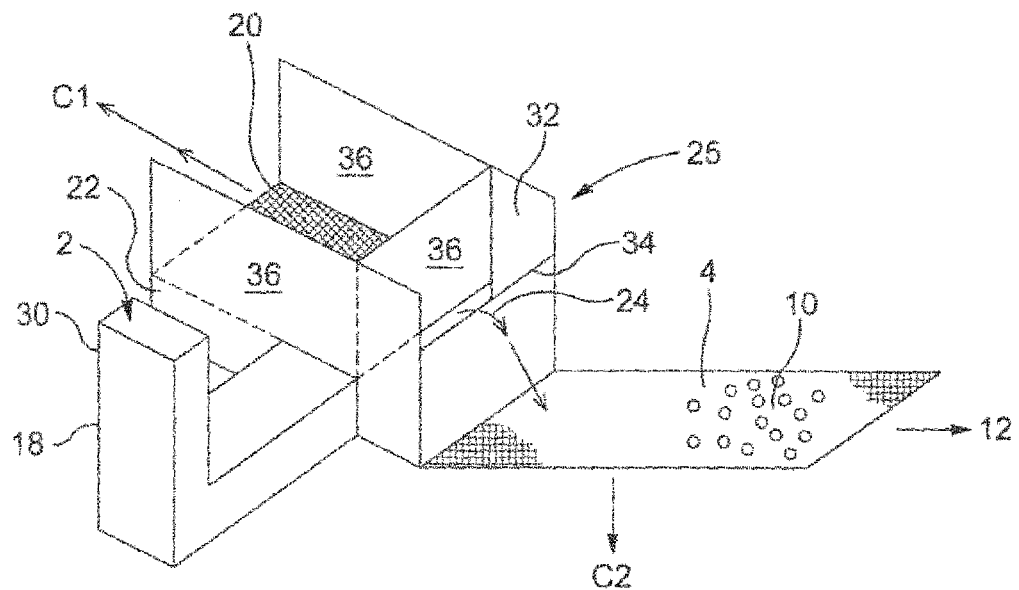
FIG. 11 illustrate schematically an apparatus of the invention integrated with a shale shaker.

FIG. 11a shows in schematic perspective an alternative arrangement to that of FIGS. 3a to 3c. It may be mounted for vibration in a similar fashion to that described for the FIGS. 3a to 3c apparatus. In FIG. 11a apparatus 25 includes a conduit 18 with a vertical inlet end 30 passing the feed 2 down to a generally horizontally disposed, box like, screening portion 22, fitted with mesh 20 for an upwards filtration that produces cleaned first stream C1. The first stream C1 is directed out of the apparatus 25 with the assistance of walls 36. Typically the stream C1 will be fed by gravity and/or by pump to a storage tank for reuse, optionally after further processing.

The second stream 24, concentrated in solids content (solids greater than the size of mesh 20), passes out of outlet end 32, over weir 34, in this example the second stream 24 is then processed further by a vibratory screen or screens indicated by schematic inclined screen 4 in the drawing. Oversize (for screen 4) solids 10 are "walked up" screen 4 by the vibratory action and leave by discharge 12. Cleaned stream C2, passing through screen 4 may be further processed or combined with stream C1 as appropriate.

The arrangement of FIG. 11a, having inlet end 30 at right angles to outlet 32, with the screening portion 22 in between, provides a turbulent flow. The feed 2 flowing into the box like screening portion 22 will swirl as filtration through screen 20 occurs and as the outlet 32 takes the second stream 24 out in a different direction to that of the feed flow.

The arrangement of FIG. 11a may be used in a stand alone module, or as a modular part of a system as discussed above with respect to the arrangement of FIGS. 3a to 3c.

Figure 11B:
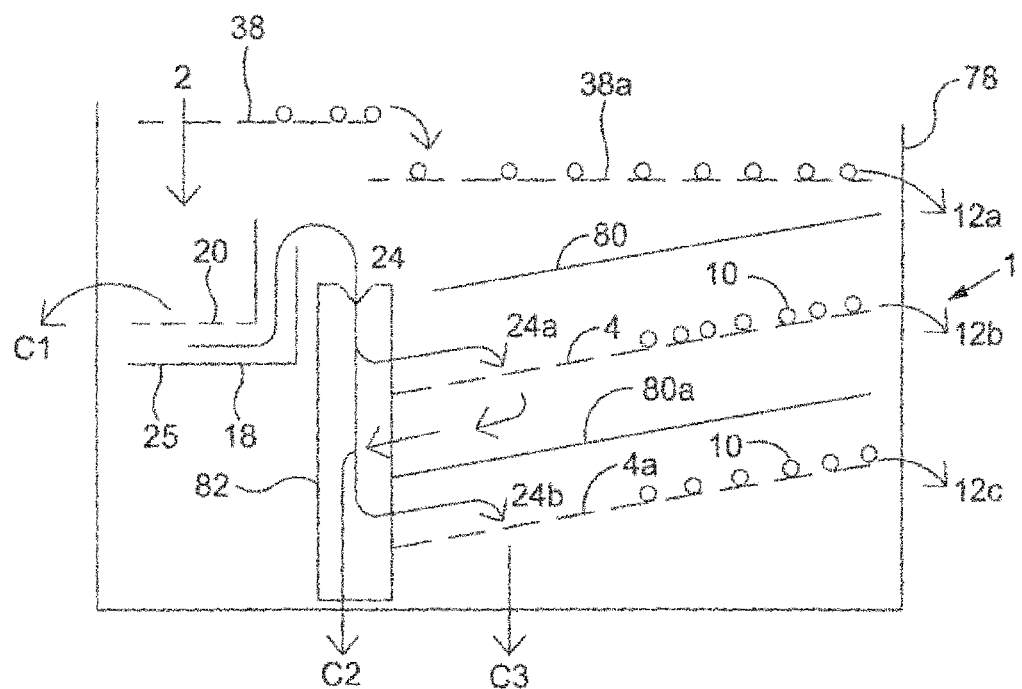

Alternatively and as shown in the schematic elevation of FIG. 11*b* the apparatus 25 may conveniently be provided as an integral part of a vibratory screening machine, in this example a shale shaker 1.

In FIG. 11*b* apparatus 25, for example of the form shown in FIG. 11*a*, is fitted into a basket (indicated schematically by broken line 781 of a shale shaker 1. The basket is subject to vibratory motion in the usual way. The basket includes two scalping screens 38 and 38*a* and two screens 4 and 4*a* for processing solids and liquid mixtures. Flow back pans 80, 80*a* are provided between screens in the stack of screens in the basket, to direct filtrate passing through the screens for onwards processing in the usual way.

A solids and liquid feed 2 such as a used drilling mud including drill cuttings is passed through scalping screen 38 before entering the inlet end (not shown in this drawing, see in FIG. 11*a*) of apparatus 25. The scalping screen 38 removes large particulates such as chunks of drill cuttings that are walked along screen 38 and then 38*a* to discharge 12*a* by the vibratory motion.

The feed 2 is then processed by the apparatus 25, producing first stream C1 for reuse as drilling mud (with or without further processing as appropriate). The concentrated stream 24, passing over the weir 34 is then fed into a flow distributor 82 that may be a switchable flow distributor as described in WO2004/110589 (Axiom Process limited). The flow distributor 82 acts to divide the stream 24 into two parts 24*a* and 24*b* for parallel processing on screens 4 and 4*a* (of the same mesh size) respectively.

Solids 10 filtered off by the screens 4 and 4*a* are walked up the screens and discharged at 12*b* and 12*c* in the usual fashion. The cleaned stream C2 produced from screen 4 is directed by flowback pan 80*a* and flow distributor 82 out of the bottom of basket 78. The cleaned stream C3 passes out of the bottom (sump) of the basket 78. As desired or required the streams C2 and C3 may be combined, in the sump of the basket 78 or elsewhere. They may also be combined with stream C1 to produce a single stream of reuse/recycle.

If a switchable flow distributor 82 is employed then the equipment of FIG. 11*b* may be readily reconfigured to provide series processing; processing all of stream 24 through screen 4 and the resulting filtrate through screen 4*a*. This allows progressive screening through screens of decreasing mesh size (using a screen 4*a* of finer mesh than that of screen 4). If series processing is used the solids from discharge 12*b* may be collected separately from those of the other discharges. These solids have been classified between the mesh sizes of screens 4 and 4*a*. With appropriate choice of mesh sizes the classified solids can comprise e.g. the weighting agent that is a desired component of drilling mud or a "lost circulation material" that is often added to drilling mud to block cracks or other defects in a well bore.

Figure 12:
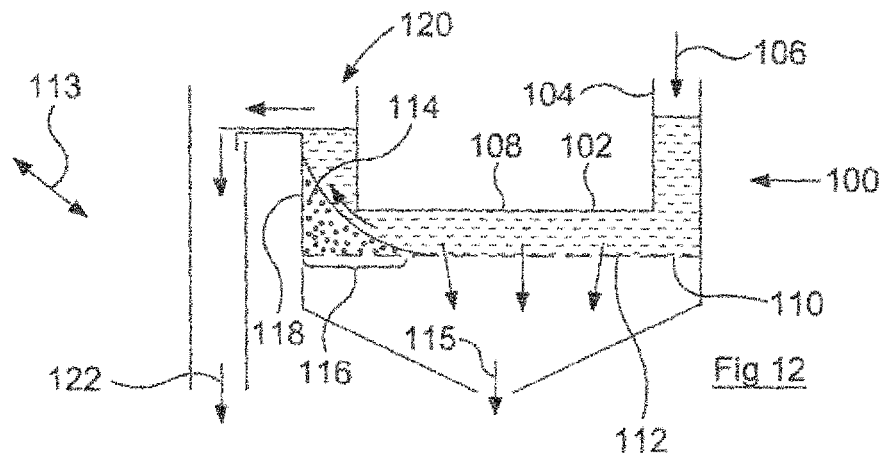
FIGS. 12, 13 and 14 show apparatus including weir assemblies according to the present invention.

FIG. 12 shows in cross section schematic a processing module 100 in accordance with the sixth aspect of the invention, including an apparatus according to the fifth aspect of the invention, in schematic cross section. The module 100 will typically be mounted in the vibrating basket (not shown) of a shale shaker type vibratory screening machine. The module includes a conduit 102 that is a generally U shaped, rectangular in cross section pipe having an inlet end 104 for receiving a solids and liquid mixture feed (such as a used drilling mud) indicated by arrow 106. The horizontally disposed section 108 of conduit 102 has a mesh screen 110 forming substantially its entire bottom wall 112 in this example. The section 108 is thus a screening portion of the conduit. The vibratory action is suggested by double headed arrow 13.

The module 100 will generally be sized, to maximise possible throughput, so that the area of mesh screen 110 will approximate that of a full size conventional screen deck that may be fitted to the basket employed.

Solids 114 retained by the screen 110 (not passing through it in cleaned stream 115) are transported by a combination of fluid flow and vibratory action along the screen face to the discharge end 116 of the screen. At the discharge end 116 of the screen the solids may concentrate until they are transported over the wall 118 of weir assembly 120. If a greater concentration of solids 114 are allowed to collect on top of the screen mesh 110 the abrasive action of the solids can cause premature screen wear and result in premature failure.

Furthermore if the combination of the head pressure from the inlet end 104 and the vibratory action of the vibratory screening machine is insufficient then solids 114 may block the flow of the concentrated stream 122 out of weir assembly 120 and onwards for further processing. A module of the form shown in FIG. 12 has some self clearing action, if a sufficient head can be accommodated in inlet 104 to produce suitable pressure in the flow, to dislodge solids 114, but such increased pressure adds to the stress on the mesh screen 110. Furthermore as the pressure in the inlet feed 106 depends on the height of inlet 104 where higher pressures are required the corresponding inlet height may not be practical, especially where it is desired to accommodate the module 100 in a relatively compact shale shaker.

Figure 12A:
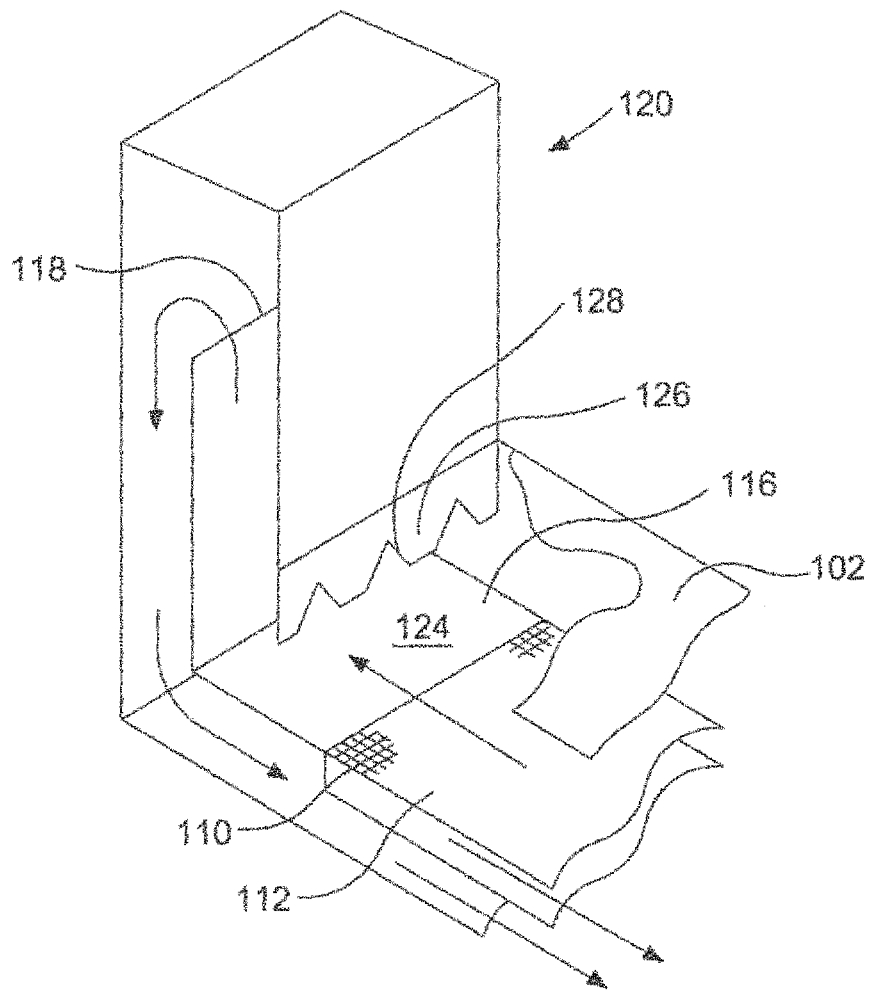

FIG. 12*a* shows in partially cut away schematic perspective view, a detail of a modified module of the same general form as that of FIG. 12. In this example at the discharge end 116 of the conduit 102 the mesh screen 110 of the bottom wall 112 is replaced by a solid plate 124, more capable of withstanding wear due to solids build up and the abrasion caused by the motion of solids. Also shown in this example an optional baffle 126 may be fitted across the flow. The baffle 126 increases turbulence, aided by one or more optional notches 128. A notch allows localised flow through the notch to be maintained when the rest of the flow path may be blocked. As solids build the flow path past the baffle reduces in size and the velocity of fluid passing the notch or notches increases. The increased velocity carries solids forward helping to avoid plugging. The height shape and position of the notch or notches 128 and of the baffle 126 can be varied.

Figure 13:
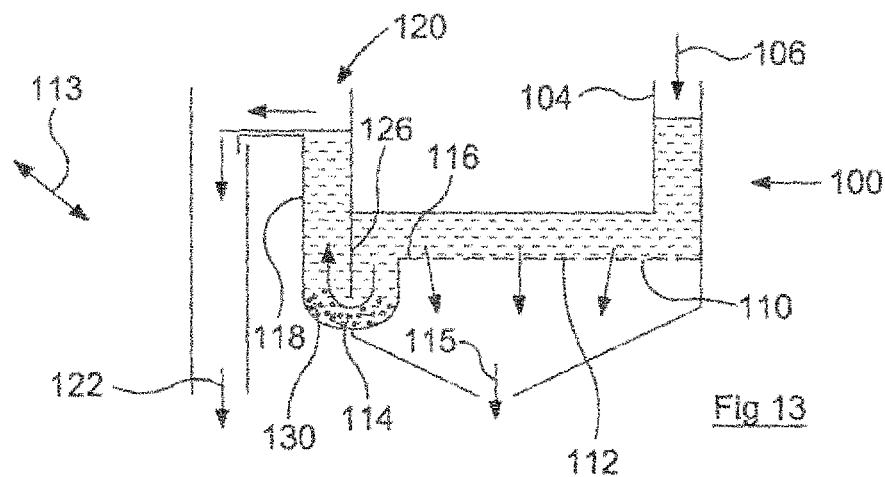

FIG. 13 shows another processing module 100 in accordance with the sixth aspect of the invention in schematic cross section. The arrangement shown is similar to that of FIG. 12 except that the module takes the form of an apparatus according to the third aspect of the invention with a weir assembly 120 in accordance with the fourth aspect of the invention. The weir assembly 120 includes a trough 130 at the discharge end 116 of the screen. The trough 130 has a baffle 126 above and projecting downwards into it (see FIG. 13*a*).

Solids 114 transported to the end of the screen fall into the trough 130 that is located below the level of the screen mesh 110. The baffle 126 projects below the screen level. The flow passing the baffle 126 washes solids 14 in the trough 130 upwards and over the weir outlet wall 118. The cleaned stream 115 passing the weir is required to travel below the level of the screen and in so doing to wash solids 114 over the weir outlet wall 118. With this arrangement solids will not tend to collect on the screen mesh 110 thus avoiding the opportunity for abrasion between the solids and mesh that could cause premature screen failure.

Figure 13A:
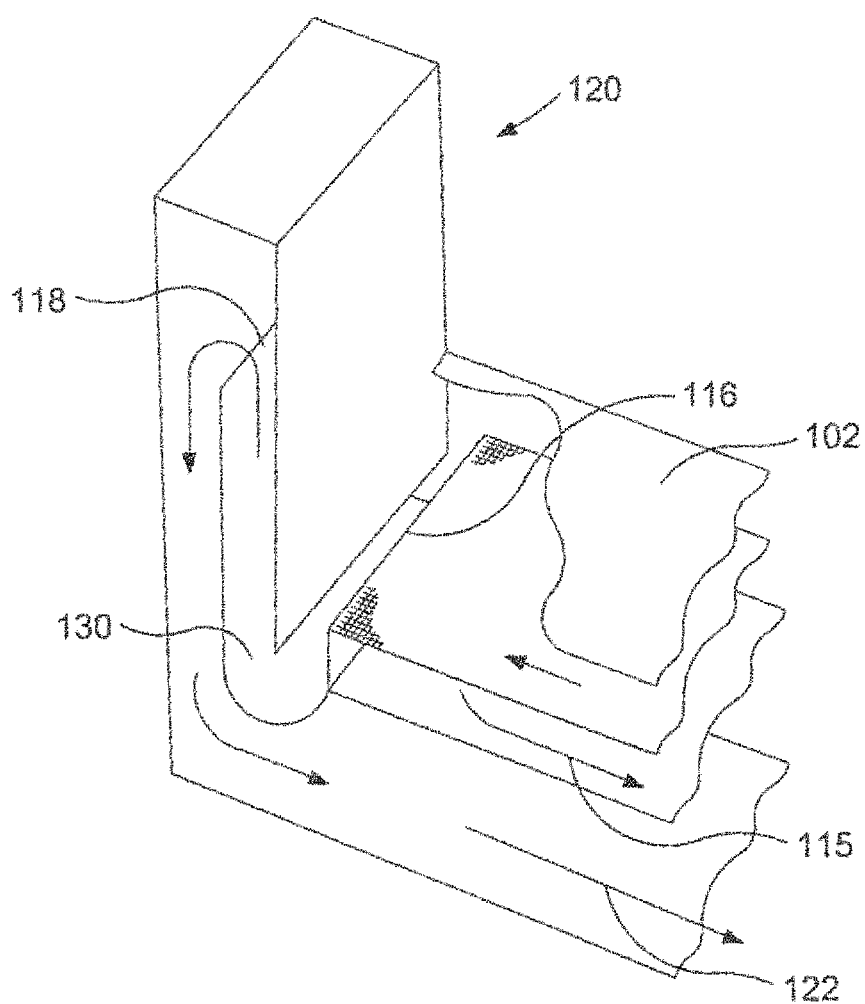
Figure 13B:
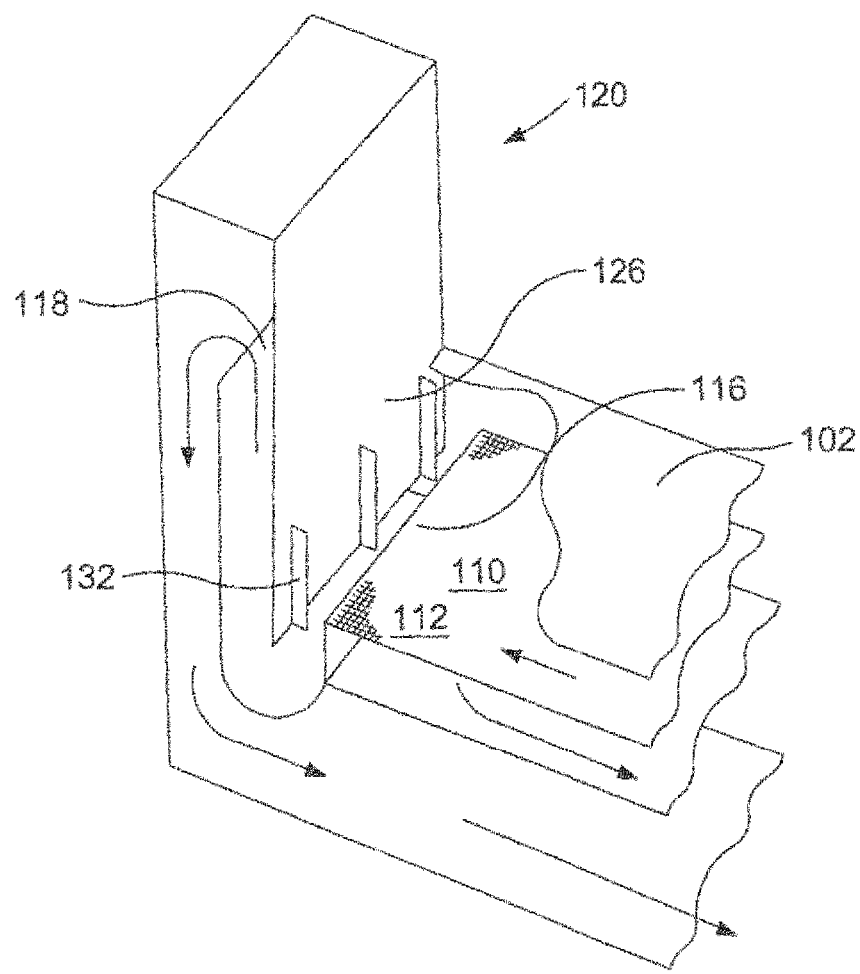

FIG. 13*a* shows in partially cut away schematic perspective view, a detail of the module of FIG. 13, showing especially the weir assembly 120, with its trough 130 at the discharge end 116 of the screening portion of the conduit 102 and a baffle 126 that is a plain sheet across the direction of flow. FIG. 13*b* shows a similar arrangement except that baffle 126 includes activation elements 132, projections that can serve to increase turbulence in the flow around the baffle thereby avoiding build up of solids in the trough 130. FIG. 13*c* shows a yet further similar arrangement to that of FIG. 13*a* except that the baffle 126 has notches 128, in this example a serpentine curve to the bottom edge of the baffle plate, to aid flow and clearance of solids. Alternative notch 28 arrangements are shown in the details of baffles 126 shown in FIG. 13*d*.

Figure 13E:
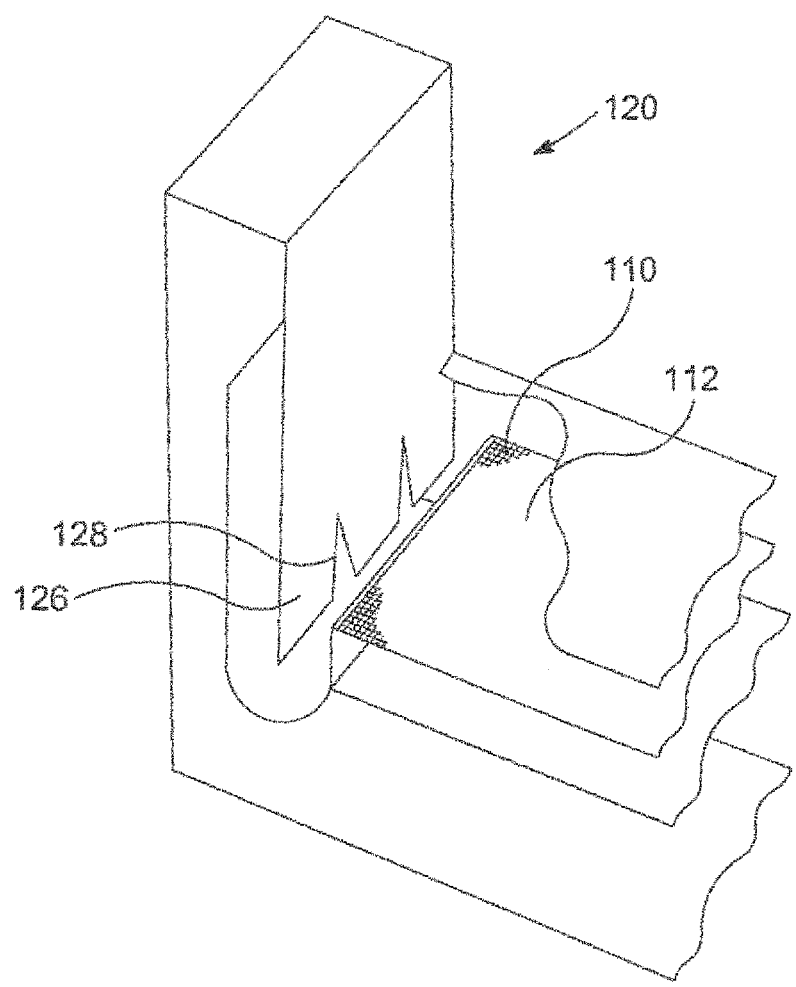
Figure 13F:
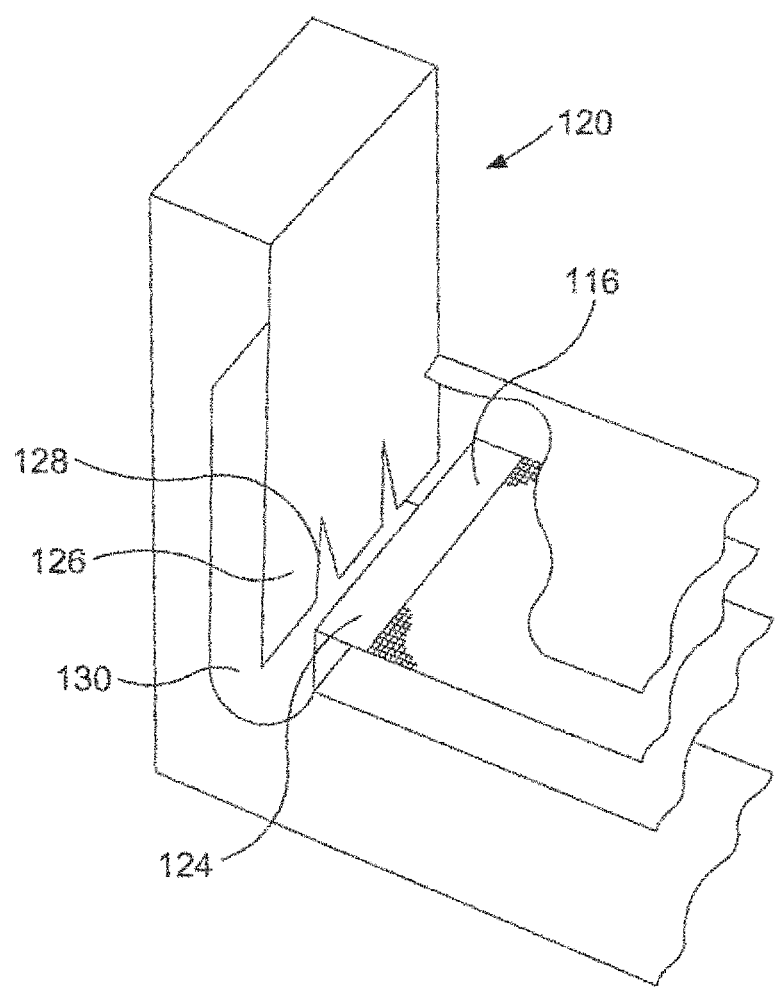

FIGS. 13*e* and 13*f*, show yet further examples of baffle assembly and conduit arrangements. In FIG. 13*e* a baffle 126 with inverted V notches 128 is employed and the screen mesh 110 runs up to the end of bottom wall 112. In FIG. 13*f* the discharge end 116 of conduit 102 includes a plate 124 to avoid wear that may occur in the vicinity of the trough 130 and baffle 126 arrangements.

Figure 14:
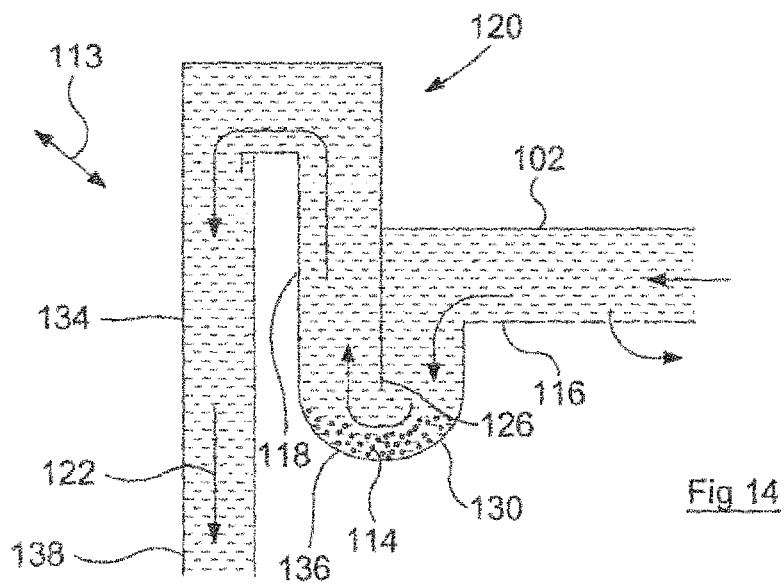

FIG. 14 shows another processing module 100 in accordance with the sixth aspect of the invention in schematic cross section, showing the discharge end 116 of the conduit 102 and a weir assembly similar to that of FIG. 13 but modified to obtain the benefit of a siphon effect. The weir assembly 120 is provided with a closed to atmosphere outlet portion of conduit by the enclosure of the flow of the concentrated stream 122 in pipe 134 as it passes over the weir outlet wall 18 and down below the level of the bottom 136 of trough 130.

When the arrangement shown is flooded with a solids and liquid mixture being processed then a siphon effect may be obtained from discharge end 116, through the trough 130 and up over weir wall 118 to the end 136 of pipe 134. This siphon effect may assist in clearance of a partial blockage caused by build up of solids 114. Such a siphon effect may also be obtained with an apparatus in accord with the fifth aspect of the invention.

Figure 15:
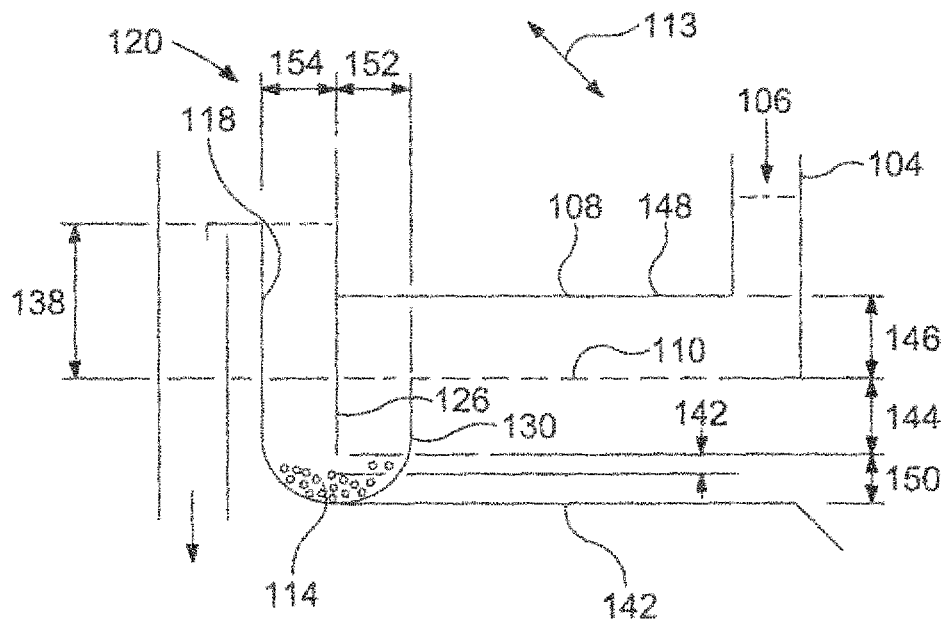
FIGS. 15 and 16 illustrate aspects of the operation of apparatus of the invention.
Figure 16:
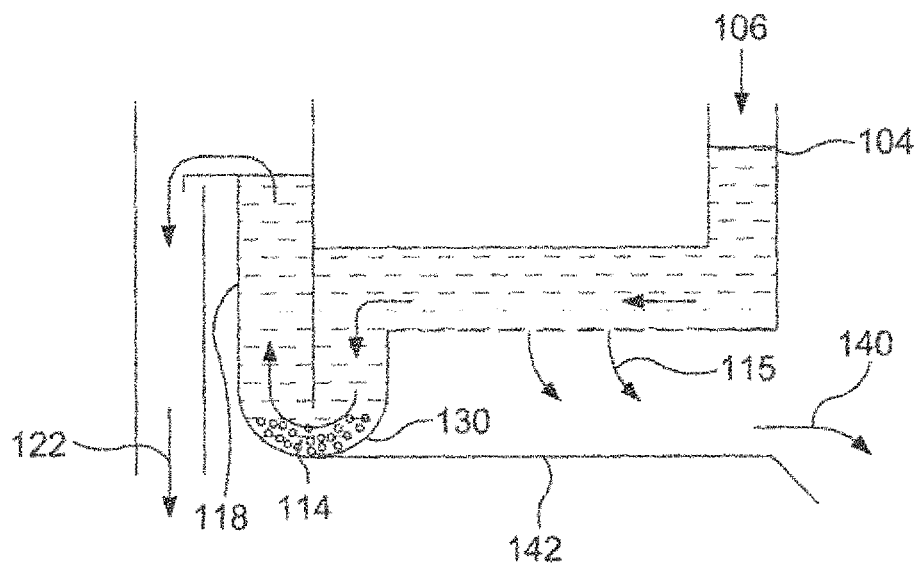

The function of an apparatus similar to that shown in FIG. 13 will now be described in more detail and with reference to FIGS. 15 and 16.

A fluid and solids mixture feed 106 is introduced at inlet end 104. A head of fluid is established above the screen mesh 110 equivalent in height to 138, the level that which the top of weir outlet wall 118 reaches above screen 110. A proportion of fluid passes the screen 110 forming the cleaned stream 115 and exits the module at 140 (FIG. 16) having flowed over flowback pan 142. In this example the flowback pan is at the same height as the bottom of trough 130, a compact in height arrangement.

The volume of fluid passing screen 110 is directly proportional to the head of fluid 138 above screen. Thus as head 138 is increased the process volume of the module increases. Screen 110 retains solids above screen aperture size. Retained solids are transported by a combination of the velocity of fluid passing baffle 126 in weir assembly 120 and the vibratory action of the machine 113. Solids pass from the screen 110 into trough 130, where they collect below the level of screen 110. Fluid passing through trough 130 is directed downwards below the level of screen 110 by the baffle 126. When passing baffle 126 a flow velocity is established that is relative to the width of gap 142 between the solids 114 and baffle 126. As the gap 142 decreases, due to build up of solids 114 the velocity of the fluid passing through gap 142 increases and with increased velocity the solids 114 tend to be transported upwards around the weir assembly 120. The ratio of fluid passing screen 110 and volume of fluid passing baffle 126 varies dependent upon factors such as the input rate, size of screen and screen mesh 110 and height of weir outlet wall 118.

Thus the transport mechanism of solids out of the module is self regulating. The more solids 114 build up the greater the head of fluid at the inlet 104 and the greater the velocity past the baffle 126. These factors act to clear the solids build up in the trough 130. The reduction in solids 114 then reduces the velocity past the baffle 126.

Typically a module of this type will normally be installed in a basket of a vibratory screening machine with or without bypass means (not shown in FIGS. 15, 16) provided to allow the feed to bypass the whole module or, if screening of solids on the screen 110 is desired, the weir assembly 120. A bypass may also be used if the weir assembly of a module of the invention is blocked, allowing at least some processing function to continue whilst remedial action is taken. If the screening operation of a module is not required then the screen 110 may be replaced by or covered by a plate.

Indeed, in general, modules of the invention, or an apparatus of the invention, may be provided with various optional features to increase the functionality of the module/apparatus and/or the vibratory screening machine containing it. Such optional features can include:

A removable weir assembly—

This allows ready access for changing screen 110 as required.

(Alternatively a replaceable screen may be removable from the end of the module distal to a weir assembly which may be fixed or removable.)

This allows the screen 110 to be easily replaced by or overlaid by a solid plate so that all of the feed into the module will flow through the conduit and over the weir, or out via a bypass, without having been divided by a screening portion. In some instances it may be desirable to replace or overlay only part of a screening portion with a plate, to provide a reduced area of screening portion. For example of two thirds or one third the maximum area, when the screening portion is provided by three screens or screen assemblies forming a portion of the bottom wall of the conduit.

This allows the screen 110 to be operated as a conventional screen deck with solids collected on the screen being transported off it at the end normally occupied by the weir.

This allows the weir to be easily cleaned, for example if blocked by solids.

This allows weirs having different outlet height to be fitted. For example, to adjust flow rates. For example, to provide a zero height weir, where the weir outlet is at the same level as the screen. This can be used to minimise impedance to flow of the concentrated stream. A zero height weir is useful for example, when a solid plate replaces the screening portion or overlays the screen, allowing the feed to flow readily through the module.

An adjustable (in height of outlet) weir—

For example, to adjust flow rates. For example, to provide a zero height weir, where the weir outlet is at the same level as the screen. This can be used to minimise impedance to flow of the concentrated stream. A zero height weir is useful for example, when a solid plate replaces the screening portion or overlays the screen, allowing the feed to flow readily through the module.

A weir outlet in the form of an orifice that is adjustable in cross section area—

This allows adjustment of flow rate by adjusting the area of the orifice.

A weir outlet adjustable in width—

This allows control of flow through and out of the conduit.

A conduit supplied with feed via a pump—

This allows adjustment of pressure and hence flow rate within the conduit. This feature may be combined with an adjustable height weir or a weir outlet in the form of an adjustable orifice to provide control over flow velocities and throughput.

A module provided with sight glasses for viewing the interior—

This allows observation of flows, for example sight glasses on a weir assembly can allow observation of blockage and effectiveness of clearing procedures. For example a sight glass or sight gauge may be fitted to allow viewing of the level of fluid in the screening portion of the conduit.

The function of the module is to separate the input feed 6 into two streams. The larger, first, stream 115 being a volume of cleaned fluid and the smaller second stream 122 being concentrated in terms of solids (of above the selected screen size) to fluid content, containing the solids not passing screen 110. This function of concentrating solids into a smaller volume of fluid (stream 122) allows the size and quantity of liquid/solids separation equipment operating downstream of the module to be decreased whilst operating efficiency of such equipment may be increased.

The following are typical values used in module design when use in processing used drilling mud is contemplated. Values are not however, limited to within the ranges quoted.
Input volume between 50 and 2000 US gallons per minute.
Fluid passing screen 10 between 10% and 95% of input volume 6
Fluid passing weir assembly 20 between 5% and 90% of input volume 6
Screen size of screen 10 between 10 mesh and 600 mesh.
Dimension 44—distance of baffle 26 under screen height between 5 and 250 mm.
Dimension 46—height of horizontally disposed screening portion 8 from screen 1 to top wall 48 between 5 and 500 mm.
Dimensions 50, 52 and 54—between 5 and 500 mm
Head of fluid at the outlet 38 between 10 and 2000 mm
The area of screen 10 may be varied between 0.5 and 35 square feet. It will usually be comparable in area to that of a conventional screen deck that may be supplied in the same vibrating basket.
A typical basket size may be of the order of 2000 mm length, 1600 mm high and 1200 mm wide, but can be varied widely to suit the throughput required.
For the modules and machines fitted with the modules of the invention the following may be adjustable or fixed:
Input volume 6.
Head a the outlet 38 (height of weir outlet wall 18 above the screen 10).
Dimension 46
Dimension 50, 52 and 54.
Screen mesh size and screen area.
Vibratory motion and force 13.
Uses of the Modules The module may be used as a stand-alone module ahead of conventional shale shakers. In this role it concentrates the solids above module screen size into a smaller volume of fluid. This reduces the volume of fluid that is required to be processed by downstream liquid solids equipment such as shale shakers and centrifuges allowing this equipment to be operated providing higher efficiency of solids liquid separation.

Example: The effect of installation of a module ahead of a conventional set of shakers reduces the fluid volume to be processed by those shakers. The shakers may be operated with smaller screen sizes increasing the efficiency of liquid/solids separation.

A module may be installed as a constituent part of a shale shaker. In this role it reduces the volume of fluid passed to the lower decks of a shale shaker allowing them to handle finer screens and increase separation efficiency. This is particularly so when a module is employed in a modular vibratory screening machine (shale shaker) in accordance with the fifth aspect of the invention.

The module can provide the ability to process between two and six times the fluid that can be processed by a single conventional screen deck of similar screen area. Where a module is combined with one lower deck screen conventional screen assembly the capacity of the resulting machine is between three and seven times that of the single deck machine for the same footprint. Equally for a two deck machine with the screens running in parallel the capacity after inclusion of the module as part of the stack of processing levels can be between four and eight times that of the two deck machine for the same footprint.

Thus a machine that is substantially smaller in footprint but has a very high screening capacity may be produced. In a preferred configuration (suitable for use in a modular shale shaker of the invention or installed in a conventional machine basket) a stack of the following items is provided, in order from the top of the basket: a scalping screen deck; a processing module 1 in accordance with the fourth aspect of the invention; and a further two screen decks, stacked one above the other and provided with a flow distributor to allow series or parallel processing.

Further Optional Weir Features

Further optional weir assembly arrangements are shown in FIGS. 17a to 17i, in schematic cross section. The features described are not restricted to the embodiments shown but may be applied to weir assemblies in accordance with any aspect of the present invention.

FIG. 17a shows a weir assembly 120, with a trough 130 and baffle 126 as discussed before. The assembly 120 is provided with at least one inlet 156, shown schematically as a 'V' (in this example two are provided) for the injection of fluid (e.g. water or a gas such as air). The point of the 'V' indicates the direction of injection of fluid. In this example the inlets are provided to inject fluid into the trough 130. Such inlets or injection ports can be used to aid passage of solids over the weir and/or to generally keep solids 114 well dispersed in the flow. The inlets 156 can also be used to assist in clearance of a blockage should one occur.

FIG. 17b is a similar arrangement to that of FIG. 17a except that only one inlet 156 is provided, in this case downwardly directed from the baffle 126 into the trough 130. An effective alternative location for fluid inlets is at one or both ends of the trough 130, with the inlet or inlets directing the injected fluid transverse to the direction of flow of the solids and liquid through the trough and over the weir.

FIG. 17c shows an arrangement where the weir assembly 120 does not have a trough or a baffle but has a plate 124 at the discharge end 116 of the module. The inlets 156 injects fluid through the plate 124 to aid in carrying solids 114 over the weir and/or clear blockages or build up of solids.

In FIG. 17d a rotating agitator 158 is fitted to the weir assembly 120, to aid transport of solids 114.

In FIG. 17e a conveyor 160, for example a conveyor belt or bucket chain is used aid transport of solids 114.

In FIG. 17f the wall 118 of weir assembly 120 is moveable about pivot 162 from its normal position to the open position indicted by dashed line 164. This allows solids 114 to be released from the assembly 120, without passing over the weir wall 118 as indicated by arrows 166. This may be done only when a blockage occurs or periodically as a routine procedure in normal processing. An alternative means of releasing solids 114 is shown in FIG. 6g where the weir wall 118 is slideable (upwards) to allow the solids to proceed without passing over the top of wall 118. A downwards slideable weir may be used as an alternative, allowing solids 114 to pass over a reduced height (e.g. zero height with respect to screen 110) wall 118.

Figure 17H:
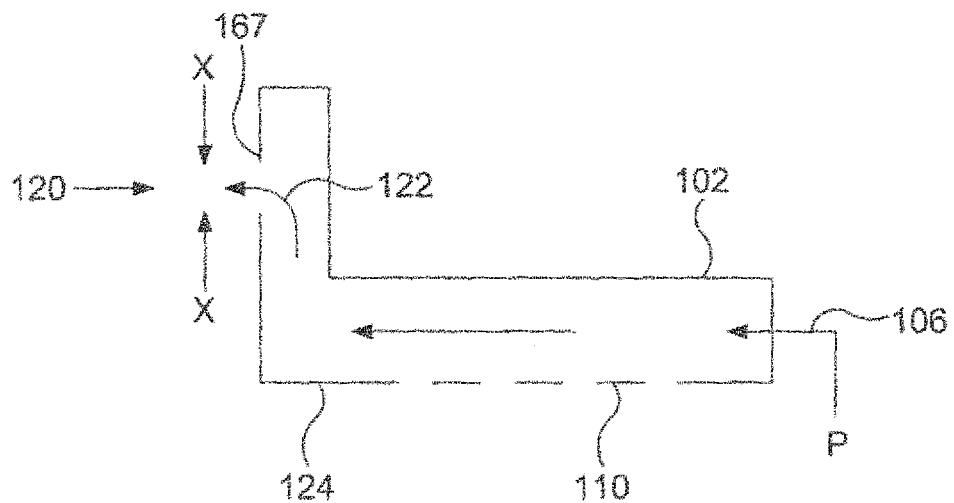
FIG. 17 illustrate different features of weir assemblies.

In FIG. 17h a conduit 102 is supplied with a liquid and solids feed 106 by means of a pump P. The pump can vary the pressure of feed, adjusting the flow rate through the apparatus. In this example the weir has an outlet in the form of an adjustable orifice 167. As suggested by arrows X the orifice 167 may be adjusted in size, e.g. by means of moveable plates (not shown) that reduce the cross section area of the orifice. The variable orifice affects pressure within the conduit 102 and the flow rates through the apparatus. The use of an adjustable pump P and a variable orifice weir outlet 167 in combination allows good control of the flow rates, but it will be understood that these two features may be used independently.

Figure 17I:
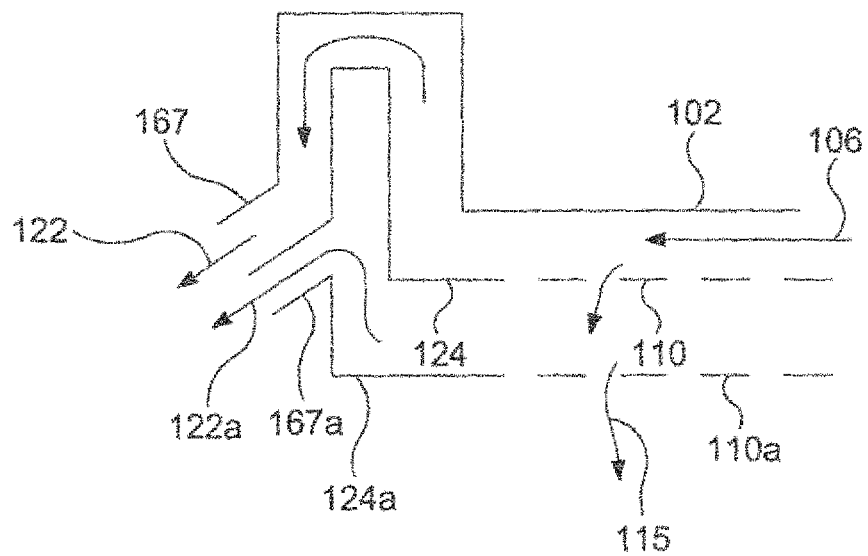

In FIG. 17i a conduit 102 is illustrated that allows successive screening through two meshes 110 and 110a of increasing fineness. In this example cleaned stream 115 has passed through both meshes 110 and 110a, whilst two concentrated streams 122 and 122a are produced, each being directed from a respective weir orifice outlet 167, 167a for recycling, further processing or disposal are desired. The streams 122, 122a may be recombined as they leave the apparatus or dealt with separately, for example if the solids particles in stream 122a are of particular utility. These particles are of a selected size, dependent on the mesh sizes employed in screens 110 and 110a. Successive screening has the additional advantage that coarser screen 110 protects liner screen 110a form damage, leading to a longer life for the finer screen. It will be understood that whilst both streams 122 and 122a are shown passing over weirs in this example, only one weir arrangement may be employed if desired, with the other concentrated stream exiting the apparatus by other means e.g. directly by an orifice at the same height as the corresponding screen.

All of the above options described in FIG. 17 may be operated manually or may be controlled by a control system. The control system may be fully or partially automated. If used the control system would typically comprise sensors. Suitable sensors may include proximity sensors or density sensors that sense the build up of solids, pressure sensors that sense the plugging of the weir and the consequent increase in pressure due to an increase in fluid head prior to the weir, or any other suitable sensor. The sensor will output to a computer, plc or other suitable device that will actuate the necessary response when the build up of solids is detected. The control system could also be a simple timer mechanism that actuates the mechanism on a regular timed basis.

An additional option for apparatus of the invention, in particular modules according to the sixth aspect, is the provision of an interlock, for example as part of the control system mentioned above. The interlock acts between air jets such as shown in FIG. 6a and discussed above and the starter control for the vibratory screening machine. On start up the air jets are activated to ensure a clear path over the weir at or shortly after the fluid/solids mixture being processed is introduced to the module.

Other methods of clearing the weir assemblies described herein include but are not limited to, increased vibration of the screening machine, localised vibration by a vibrator mechanism installed within or as part of the weir or ultrasonic vibrators installed within or as part of the weir.

A Modular Shale Shaker Apparatus

Figure 18:
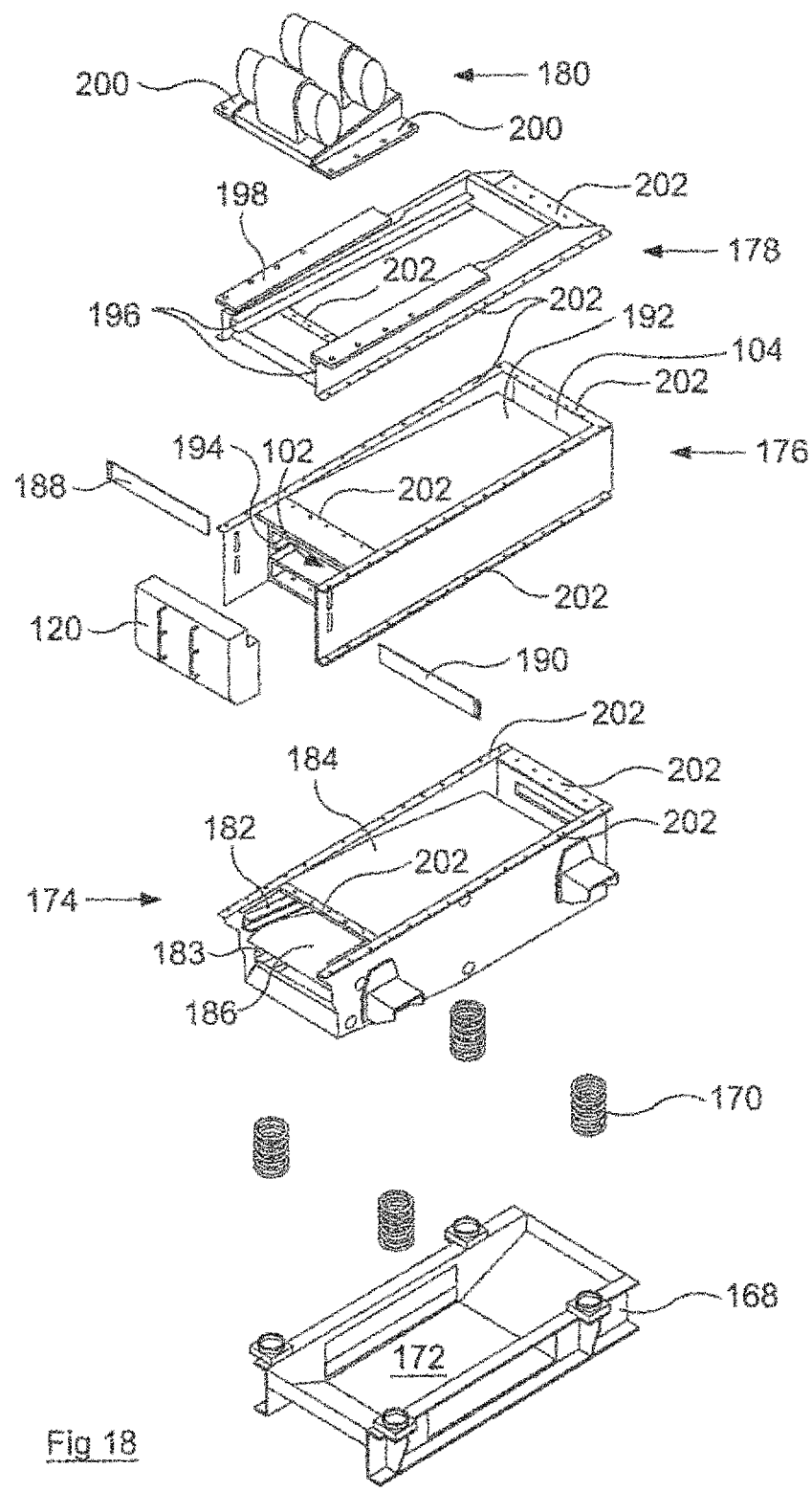
FIG. 18 shows a modular vibratory screening machine.

A modular vibratory screening machine in accordance with the seventh aspect of the invention is shown in schematic perspective exploded view in FIG. 18. Not shown on the figure are items such as optional fume extraction that may be fitted to a vibratory screening machine of the invention.

The machine includes a base 168 for mounting springs 170. The base 168 has an open bottom 172 to allow filtrate that has been processed by the machine to flow to a sump and/or into e.g. a pipe to a holding tank.

In this example the basket of the machine is made up of three screening modules 174, 176, 178 and has a drive assembly 180, of the type typically employed in shale shaker technology to impart vibratory action to a basket. In vibratory screening apparatus as described herein it will be understood that the drive assemblies provide the appropriate vibratory motions for the equipment and materials being processed as is well, known in the art. Advantageously, for versatility, the drive assemblies are adjustable to provide one or more of linear motion, balanced motion, elliptical motion, orbital motion, variable vibration amplitude and variable vibration speed (frequency).

The lower screening module 174 is a two deck arrangement including two sets of rails 182, 183 for fitting screen assemblies (not shown) that typically include a screen mesh mounted on a support frame that slides into position the rails 182 and are clamped and tensioned as required in the known manner for shale shaker screening operations. The module also includes two flowback pans 184, 186. The upper flowback pan 184 is for collecting filtrate from a module above, and directing it to the appropriate end of the screen assembly below (not shown, would be fitted to rails 182). The lower flowback pan 86 typically collects filtrate from a screen assembly fitted to rails 182 and directs it either to an end of a screen assembly fitted to rails 183 or elsewhere (e.g., base bottom 172.

The module 174 is thus a typical shale shaker two deck arrangement that can be used for various screening operations including series screening, firstly through a screen fitted to an assembly on rails 182 and then through a screen of assembly fitted to rails 183. Alternative operations can include parallel processing, with a feed being split and directed to screen assemblies fitted to both decks (onto rails 132 and 183). if desired a flow distributor similar to those described in WO/2004/110589 may be included with this module to allow parallel or series processing as desired (not shown in this diagram).

The module 174 sits on top of springs 170, mounted on base 168 in use.

Module 176 is a module according to the fourth aspect of the present invention, including a (detachable) weir assembly 120, inflatable packer plates 188,190 and a flowback pan to direct feed to inlet end 104 of the conduit 102 within the module. The inflatable packer plates 188,190 are used to retain weir assembly 120 in place and provide fluid sealing. The inflatable packer plates slide through slots in side of module 76. The weir assembly can thus be easily and quickly removed for screen changing, screen inspection, or changing of adjustment of weir. A set of rails 194 are used to fit a screen assembly including a screen (not shown) that functions as the screening portion on the bottom wall of conduit 102. As an alternative to the arrangement shown, for example if the weir assembly is not detachable, the screen of module 176 may be removable via a closable slot or port at the end of the module distal to the weir assembly. In either case screens are conveniently held and sealed in place by inflatable tube sealing arrangements as known in the art.

Module 176 functions as described above, to divide a feed coming from the module above into two streams the stream passing over the weir being directed via flowback pan 184 to the screen decks of module 174.

Module 178 is a scalping screen deck in this example, mounting a scalping screen assembly (not shown) on rails 196. The module 178 includes large flanges 198 for mounting drive unit 180, by bolting through its corresponding flanges 200.

For use the modules 174, 176 and 178 are bolted together at flanges 202 to constitute the shale shaker basket. The basket is mounted on base 168 via springs 170 and the drive unit 80 bolted to module 178. Other components such as a feed chute, to direct a feed to the scalping screen are not shown in this example. In other examples the basket may also include a standard mounting unit, mounted on the springs to which the processing modules such as 174,176 and 178 may be bolted.

The modular shale shaker may be constituted of fewer or different modules as desired. For example it may include a triple deck module or a single deck module in place of the two deck module 174.

Figure 19:
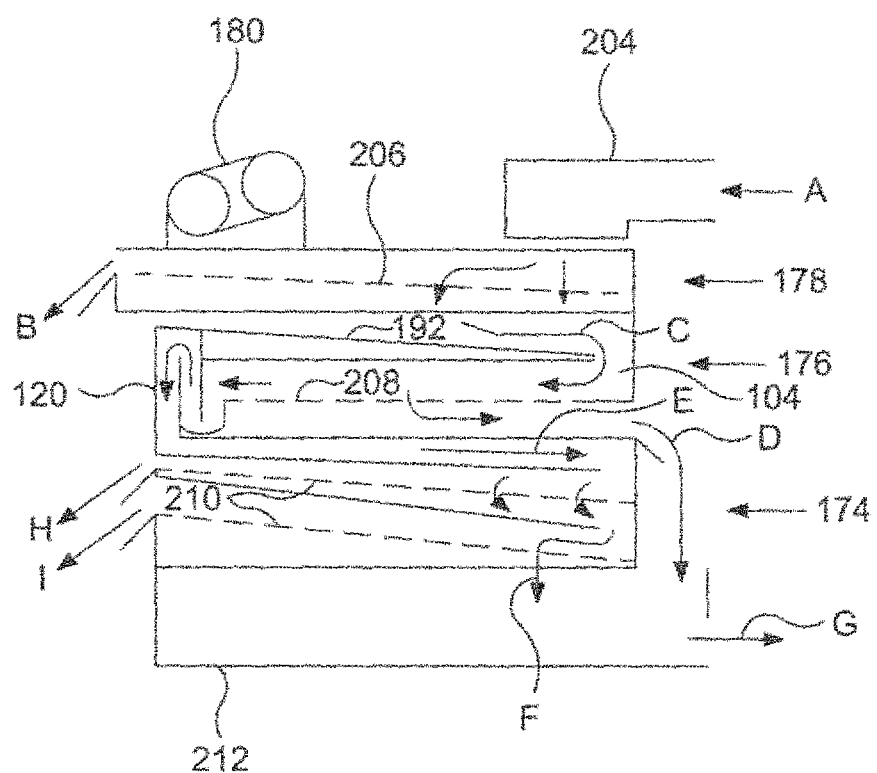
FIG. 19 shows the operation of a modular vibratory screening machine.

The operation of a shale shaker configured as in FIG. 18 is illustrated in FIG. 19. A machine not constructed in modules but having the same set of and ordering of screen decks and process module mounted in a basket i.e. in accordance with the eighth aspect of the invention, may operate in the same fashion. However, without the option to change the configuration and number of modules fitted for a processing operation.

FIG. 19 shows in schematic cross section elevation a modular shale shaker of the type shown in FIG. 18, in use with various flows indicated by letters A to I. The base unit 168 and springs 170 are not shown in this diagram, for clarity. The screens fitted in the modules are indicated by dashed lines 206, 208 and 210.

In operation a used drilling mud feed (or other solids and liquids mixture) A is delivered via feed chute 204 onto scalping screen module 178, Solids not passing screen 206 are collected on top of screen 206 and moved by the vibratory action, delivered by drive unit 180, to exit the scalping screen module 178 as flow B.

The underflow C (filtrate) from the scalping screen module 178 is delivered to the inlet end 104 of the conduit of module 176 via flowback pan 192. A top wall of the module 176 may itself constitute a flowback pan in other examples of modules of the invention. The module 176 divides flow C into two flows. A cleaned stream (fluid and solids passing through screen 208) exits the machine as flow D, whilst the concentrated stream E passes over the weir of weir assembly 120 and proceeds via a flowback pan to the upper of the two screens 210 in module 174.

In this example the module 174 provides series processing through the two screens 210, the lower screen having a finer mesh than the upper, as is typical for shale shaker operations using two screen decks. Parallel processing through two screens 210 of the same mesh size can be operated if desired by dividing flow E into two feeds, one for each screen 210 in the known manner, for example by using a flow distributor such as one of the type described in WO/2004/110589. Such a flow distributor will be fitted at an end 211 of the basket (see FIG. 19*a*).

The filtrate from the module 174, having passed successively through both screens 210 exits as flow F, typically through the base of the machine (see FIG. 18, open bottom 172). The flow F and flow D are combined in this example by collecting in a tank (indicated by line 212) for return to the drilling mud system as combined flow (G A chute (not shown in this example) may be provided to direct flow D onto a tank or a sump as desired.

Solids collected on screens 210 are moved by the vibratory action, delivered by drive unit 180 to all three modules 174, 176, 178, to exit the scalping screen module 174 as flows H and I.

FIG. 19*a* shows in schematic detail a flow distributor 222 fitted to the end 211 of module 174. The distributor may be of the type described in WO/2004/110589. The figure illustrates aspects of parallel processing of flow E, rather than the series processing shown in FIG. 19. Flow E forms a pool or pond, in the usual fashion for an inclined screen operation in a shale shaker, as it collects on the upper of the two screens 210. Here flow E is divided into two streams E1 and E2. Stream E2 is the flow that is filtered on the upper screen 210 with the filtrate passing through the screen and then being directed via the corresponding flow back pan and the distributor 222 (detail of path not shown) to the sump of the machine. Stream E1 is the flow from the pond that passes over weir 224 of the flow distributor 222 and is then directed by appropriately set passages onto the lower of screens 210 for filtration. As flow E arrives at the end of upper screen 210 and flow distributor 222 with some velocity, the flow distributor, especially weir 224 is protected by deflecting baffle 226. This ensures that flow E forms the pond first and is then divided by the weir.

FIG. 19*b* shows in schematic detail a weir assembly 120 that may for example be used in the arrangement of FIG. 19. The weir assembly includes a baffle 126 with an adjustable slide portion 228 that can be moved as indicated by the double headed arrow. Thus the baffle 126 is adjustable in height with respect to the trough in this example, allowing adjustment of flow rate and/or pressure. This mechanism can be used to aid in clearing blockages of solids 114 if they occur.

FIG. 19*c* shows in schematic partial plan, view a modification to the arrangement of FIG. 19 that can be of general benefit when employed in either a modular shale shaker or an apparatus according to the eighth aspect of the invention. FIG. 19*c* shows in plan the inlet end of the conduit 104 and part of the flow back pan 192 overlaying the screening portion of the conduit. The flow back pan 192 (which may be a top wall of the conduit 102) has at least one passage 193 to allow a portion of the flow to pass downwards into the conduit without passing through inlet end 104. If the conduit has a separate top wall as indicated in FIG. 19 then passages 193 will continue through that top wall. The passages 193 increase the flow into the screening portion of the conduit 102 and can help to avoid flooding of a processing stage above the conduit 102 caused by insufficient flow through the inlet end 104. At the same time the flow into the conduit via the passages 193 increases flow therein and can aid in avoiding blockages. Furthermore a higher flow rate is obtained without increasing the footprint of the apparatus e.g. by increasing the cross sectional area of the inlet end 104. Advantageously passages 193 are positioned at an edge of the flow back pan 192 running parallel to the general direction of flow as shown in FIG. 19*c*. This arrangement tends to prevent the flow passing through the passages 193 from hailing directly onto a screen of the screening portion where it may increase wear or cause damage. The flow will tend to run down the sides of the conduit as it mixes with the larger flow from the inlet end 104 and/or will tend to be directed at edges of the screening portion where, typically, screen supports or tensioning devices are located i.e. screening material such as relatively delicate wire meshes are not present.

FIG. 19*d* shows in partial schematic detail a modified feed chute 204 and corresponding scalping module 178 similar to that of FIG. 19 that can be of general benefit when employed in a modular shale shaker, an apparatus according to the eighth aspect of the invention or shale shakers in general. The feed chute 204 is "anti-splash". The chute 204 is provided with an outlet having an outwardly directed flange 205 which is spaced apart from but cooperates with an inwardly directed flange 205a round the top edge of the module 178 (or round the top edge of the basket of a typical shale shaker arrangement). The flange 205 is inside and below the flange 205a. The two flanges combine to prevent splashes of fluid from flow A as it is processed through scalping screen 206 escaping upwards and outwards. In addition the outlet of chute 204 may be sized so as to extend over the area of screen 206 where fluid, as opposed to screened solids, may be expected to be found when typical or even higher than normal flow conditions through screen 206 are present. The flanges 205,205a are spaced apart to avoid transmitting vibration to the feed chute 204 from the vibratory screening machine.

FIGS. 20a to 20g illustrate schematically in elevation some of the available options when making use of a modular shale shaker apparatus.

In these schematic illustrations only drive unit 180, springs 170 and a mounting unit 214 (where fitted) are shown in addition to the different modules fitted for each option, in each case a base unit for mounting the springs will be provided (as in part 168 of FIG. 18). Other items such as the appropriate feed equipment and collection equipment for or solids and fluid flows are not shown for clarity.

The optional mounting unit 214 provides a base with appropriate ability to connect to springs 170, onto which modules may be bolted to form a basket with the desired functionality. Alternatively the lowest module used in a given configuration of the apparatus may have suitable connections for fitting to springs 170.

In FIG. 20a a single deck module such as the scalping deck module 178 shown in FIG. 18 is fitted to a mounting unit 214 on the springs 170. This configuration can screen a solids and liquid feed through a selected mesh size screen.

In FIG. 20b a two deck screening module 216 that may be of the similar form to module A74 of FIG. 18 is fitted below scalping deck module 178. Series processing through one screen then the next (of finer mesh size) is provided by appropriate flow distribution arrangements.

FIG. 20c has the same two deck arrangement 216 as in FIG. 20b but with flow distribution arranged to give parallel processing, simultaneous processing of a feed divided between both screen decks, fitted with screens having the same mesh size.

FIG. 20d has the same two deck arrangement as in FIG. 20b but with a flow distributor fitted that allows switching between series and parallel processing. This arrangement can be used to carry out processing as with the apparatus of either FIG. 20b or FIG. 20c.

FIG. 20e shows a triple deck module 218 fitted below scalping deck 178. The triple deck module 218 may be fitted with a flow distributor that can allow various series or parallel operations, including for example parallel through all three screens at once, series through all three screens and through the top screen of the three, followed by parallel processing through the lower two screens.

FIG. 20f shows an arrangement similar to that of FIG. 18, with a scalping deck module 168 followed by a module 176 containing a conduit and weir arrangement. The lowest module 220 in the stack may however take the form of any single or multiple deck arrangement discussed above, or may be of some other form, e.g. a four deck arrangement.

FIG. 20g shows an arrangement having only a module 176 as in FIG. 18 fitted. Optionally a scalping deck arrangement may be fitted above it.

It will be understood that the present invention has been described above purely by way of example, and modifications of detail can be made with the cope of the invention.

Each feature disclosed in the description, and (where appropriate) the claims and drawings may be provided independently or in any appropriate combination.

The invention claimed is:

1. A modular vibratory screening machine having a basket formed and arranged for mounting one or more processing modules, or a basket constructed from one or more processing modules, said modular vibratory screening machine comprising:
   a) a processing module having an apparatus including a conduit, that includes a screening portion and formed and arranged to divide a liquid and solids mixture feed flowing through the conduit into a first, cleaned stream having liquid and solid particles of below a selected size limit, and a second, concentrated, stream having liquid, and solid particles above the selected size limit;
wherein an outlet for the second concentrated stream from the screening portion is in the form of a weir assembly;
the weir assembly comprising:
   a trough in fluid communication with said screening portion and having a bottom wall disposed at a lower height than the bottom wall of the screening portion; and
   an outlet over which the second concentrated stream flows in use;
said modular vibratory screening machine optionally having one or more the following modules:
   b) a top screen or scalping deck;
   c) a conventional single deck screening module;
   d) a dual deck screen module;
   e) a dual deck screen module with a flow distribution system allowing parallel or series processing on the two screens;
   f) a dual deck screen module with a flow distribution system switchable between allowing parallel or series processing on the two screens;
   g) a multiple deck screen module having three or more screens in a stack;
   h) a multiple deck screen module having three or more screens in a stack with flow distribution system; and
   i) a flow distribution module for fluid interconnection between screen decks and/or between modules.

2. A modular vibratory screening machine having a basket formed and arranged for mounting one or more processing modules, or a basket constructed from one or more processing modules, said modular vibratory screening machine comprising:
   a processing module having a generally rectangular in cross-section section of conduit including a downwards directed inlet end followed by a generally horizontally disposed screening portion that has a screen mesh replacing a portion of the bottom wall, said section of conduit being substantially closed or closed apart from the inlet end, the screen mesh and an outlet end that comprises a weir; and
said modular vibratory screening machine optionally having one or more of the following modules:
   a) a processing module having an apparatus including a conduit, that includes a screening portion and formed and arranged to divide a liquid and solids mixture feed flowing through the conduit into a first, cleaned stream having liquid and solid particles of below a selected size limit, and a second, concentrated, stream having liquid, and solid particles above the selected size limit;
wherein an outlet for the second concentrated stream from the screening portion is in the form of a weir assembly;
the weir assembly comprising:
a trough in fluid communication with said screening portion and having a bottom wall disposed at a lower height than the bottom wall of the screening portion;
an outlet over which the second concentrated stream flows in use:
b) a top screen or scalping deck;
c) a conventional single deck screening module;
d) a dual deck screen module;
e) a dual deck screen module with a flow distribution system allowing parallel or series processing on the two screens;
f) a dual deck screen module with a flow distribution system switchable between allowing parallel or series processing on the two screens;
g) a multiple deck screen module having three or more screens in a stack;
h) a multiple deck screen module having three or more screens in a stack with flow distribution system; and
i) a flow distribution module for fluid interconnection between screen decks and/or between modules.

3. The modular vibratory screening machine according to claim 1 wherein the modules are demountable and interchangeable by means of releasable fastenings provided between the vibratory basket and a selected module.

4. The modular vibratory screening machine according to claim 3 wherein the basket is provided with flanges running along the side of its walls onto which corresponding flanges of a module sit and the corresponding pairs of flanges are bolted together or otherwise secured by releasable fastenings.

5. The modular vibratory screening machine according to claim 1 wherein the basket is made up of one or more modules, stacked one above the other, selected for the intended use.

6. The modular vibratory screening machine according to claim 5 wherein the modules are fixed together by bolting or otherwise securing corresponding flanges, running along the sides of module walls.

7. The modular vibratory screening machine according to claim 5 wherein the vibratory drive unit is bolted onto the topmost module.

8. A modular vibratory screening machine comprising a basket formed and arranged for mounting one or more processing modules, or a basket constructed from one or more processing modules;
wherein said modular vibratory screening machine has a flow distribution module for fluid interconnection between screen decks and/or between modules, said flow distribution module including a weir at one end of an inclined upper screen deck for dividing a flow of solids and liquid for parallel processing with one portion of the flow passing over the weir and directed to a lower screen deck and the other portion of the flow remaining for filtration through the upper screen deck;
said modular vibratory screening machine optionally having one or more of the following modules;
a) a processing module comprising an apparatus including a conduit, that includes a screening portion and formed and arranged to divide a liquid and solids mixture feed flowing through the conduit into a first, cleaned stream comprising liquid and solid particles of below a selected size limit, and a second, concentrated, stream comprising liquid, and solid particles above the selected size limit;
wherein an outlet for the second concentrated stream from the screening portion is in the form of a weir assembly;
the weir assembly comprising:
a trough in fluid communication with said screening portion and having a bottom wall disposed at a lower height than the bottom wall of the screening portion;
an outlet over which the second concentrated stream flows in use:
b) a top screen or scalping deck;
c) a conventional single deck screening module;
d) a dual deck screen module;
e) a dual deck screen module with a flow distribution system allowing parallel or series processing on the two screens;
f) a dual deck screen module with a flow distribution system switchable between allowing parallel or series processing on the two screens;
g) a multiple deck screen module having three or more screens in a stack;
h) a multiple deck screen module having three or more screens in a stack with flow distribution system; and
i) a flow distribution module for fluid interconnection between screen decks and/or between modules.

9. The modular vibratory screening machine according to claim 2 wherein the modules are demountable and interchangeable by means of releasable fastenings provided between the vibratory basket and a selected module.

10. The modular vibratory screening machine according to claim 9 wherein the basket is provided with flanges running along the side of its walls onto which corresponding flanges of a module sit and the corresponding pairs of flanges are bolted together or otherwise secured by releasable fastenings.

11. The modular vibratory screening machine according to claim 2 wherein the basket is made up of one or more modules, stacked one above the other, selected for the intended use.

12. The modular vibratory screening machine according to claim 11 wherein the modules are fixed together by bolting or otherwise securing corresponding flanges, running along the sides of module walls.

13. The modular vibratory screening machine according to claim 11 wherein the vibratory drive unit is bolted onto the topmost module.

14. The modular vibratory screening machine according to claim 8 wherein the modules are demountable and interchangeable by means of releasable fastenings provided between the vibratory basket and a selected module.

15. The modular vibratory screening machine according to claim 14 wherein the basket is provided with flanges running along the side of its walls onto which corresponding flanges of a module sit and the corresponding pairs of flanges are bolted together or otherwise secured by releasable fastenings.

16. The modular vibratory screening machine according to claim 8 wherein the basket is made up of one or more modules, stacked one above the other, selected for the intended use.

17. The modular vibratory screening machine according to claim 16 wherein the modules are fixed together by bolting or otherwise securing corresponding flanges, running along the sides of module walls.

18. The modular vibratory screening machine according to claim 16 wherein the vibratory drive unit is bolted onto the topmost module.

* * * * *